US012554065B2

(12) United States Patent
Menard et al.

(10) Patent No.: US 12,554,065 B2
(45) Date of Patent: Feb. 17, 2026

(54) STRUCTURES AND METHODS FOR STRESS AND GAP MITIGATION IN INTEGRATED OPTICS MICROELECTROMECHANICAL SYSTEMS

(71) Applicants: Francois Menard, Trois-Rivieres (CA); Jonathan Briere, Terrebonne (CA); Martin Berard, Repentigny (CA); Mael Bruder, Montreal (CA); Frederic Nabki, Montreal (CA); Michael Menard, Verdun (CA); Mohannad Elsayed, Verdun (CA); Suraj Sharma, Montreal (CA); Damien Michel, Bromont (CA)

(72) Inventors: Francois Menard, Trois-Rivieres (CA); Jonathan Briere, Terrebonne (CA); Martin Berard, Repentigny (CA); Mael Bruder, Montreal (CA); Frederic Nabki, Montreal (CA); Michael Menard, Verdun (CA); Mohannad Elsayed, Verdun (CA); Suraj Sharma, Montreal (CA); Damien Michel, Bromont (CA)

( * ) Notice: Subject to any disclaimer, the term of this patent is extended or adjusted under 35 U.S.C. 154(b) by 1319 days.

(21) Appl. No.: 17/309,230

(22) PCT Filed: Nov. 8, 2019

(86) PCT No.: PCT/CA2019/000156
§ 371 (c)(1),
(2) Date: May 10, 2021

(87) PCT Pub. No.: WO2020/093136
PCT Pub. Date: May 14, 2020

(65) Prior Publication Data
US 2025/0334743 A1 Oct. 30, 2025

Related U.S. Application Data

(60) Provisional application No. 62/757,317, filed on Nov. 8, 2018.

(51) Int. Cl.
*G02B 6/13* (2006.01)
*G02B 6/126* (2006.01)
(Continued)

(52) U.S. Cl.
CPC ............. *G02B 6/132* (2013.01); *G02B 6/126* (2013.01); *G02B 2006/12038* (2013.01);
(Continued)

(58) Field of Classification Search
CPC .................... G02B 6/132; G02B 6/126; G02B 2006/12038; G02B 2006/12061;
(Continued)

(56) References Cited

U.S. PATENT DOCUMENTS

2010/0260462 A1* 10/2010 Zhang .................... G02B 6/132
427/163.2

\* cited by examiner

*Primary Examiner* — Jerry M Blevins
(74) *Attorney, Agent, or Firm* — Rosenberg, Klein & Lee

(57) ABSTRACT

Silicon Photonics is a candidate technology for adding integrated optics functionality, either passive or active optical waveguides) to integrated circuits by leveraging the economies of scale of the CMOS microelectronics industry and using materials for the waveguide core such as silicon nitride ($Si_xN_y$) and silicon oxynitride ($SiO_xN_{1-x}$) for example. Microelectromechanical systems (MEMS) provide for movable platforms relative to the substrate allowing additional functionality to be added to a silicon circuit but also Silicon Photonics. Accordingly, by combining "fixed" waveguides formed upon the substrate with "movable" waveguides formed upon one or more movable platforms the inventors have established a series of Integrated Optics (Continued)

MEMS (IO-MEMS) based on Silicon Photonics. Such IO-MEMS include optical switches, optical attenuators, optical gates, optical switch matrices, configurable wavelength division multiplexer/demultiplexer devices, etc. exploiting both platforms and deformable beams.

10 Claims, 43 Drawing Sheets

(51) Int. Cl.
    *G02B 6/132*     (2006.01)
    *G02B 6/12*     (2006.01)

(52) U.S. Cl.
    CPC .............. *G02B 2006/12061* (2013.01); *G02B 2006/121* (2013.01); *G02B 2006/12145* (2013.01); *G02B 2006/12164* (2013.01); *G02B 2006/12169* (2013.01); *G02B 2006/12176* (2013.01)

(58) Field of Classification Search
    CPC .... G02B 2006/121; G02B 2006/12145; G02B 2006/12164; G02B 2006/12169; G02B 2006/12176
    USPC .......................................................... 385/14
    See application file for complete search history.

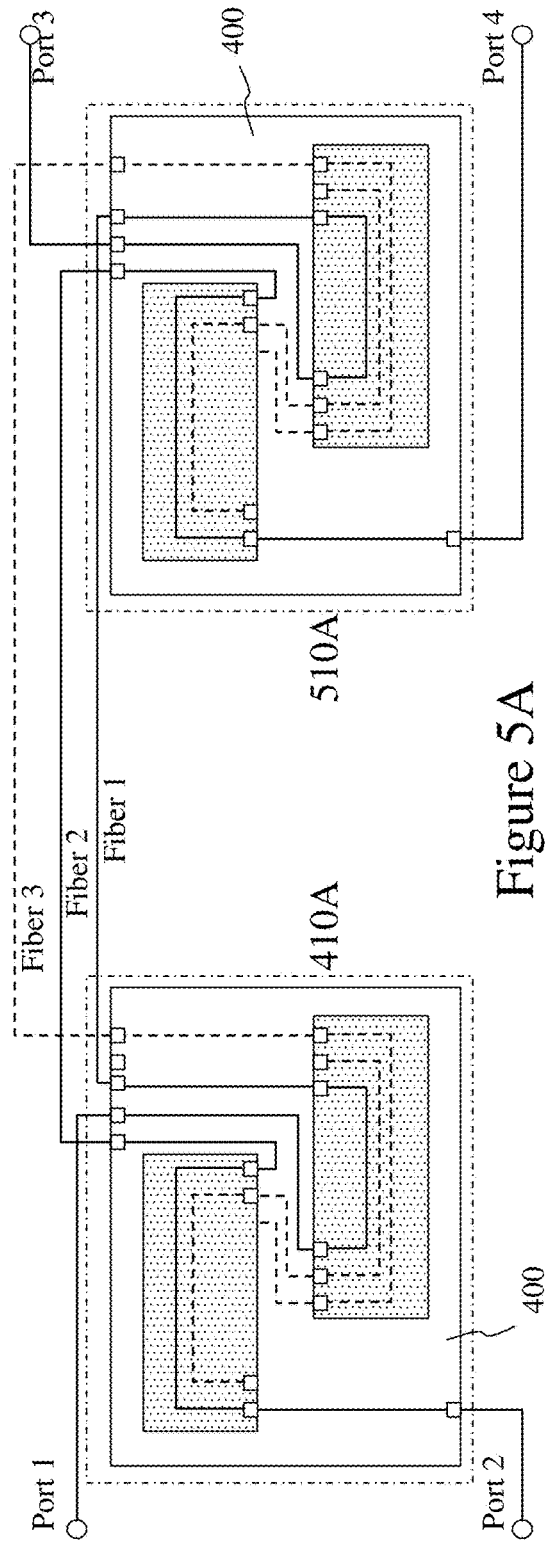
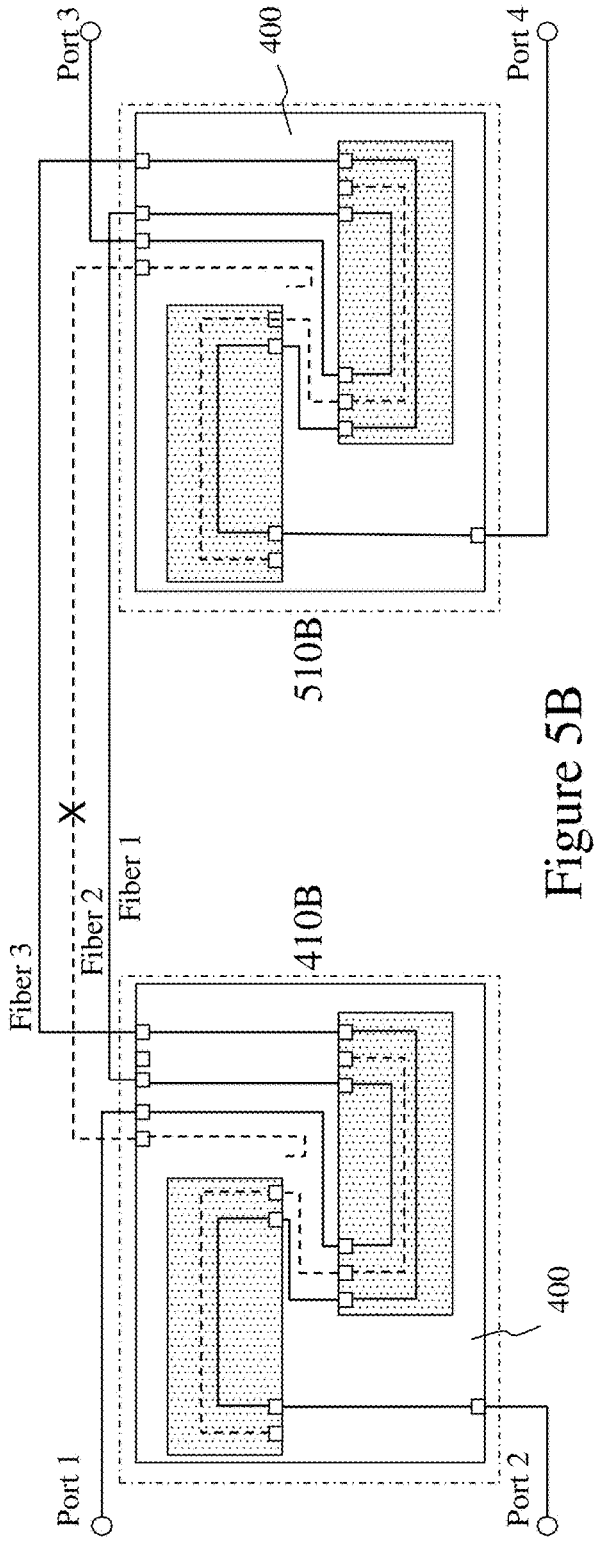
Figure 5A
Figure 5B

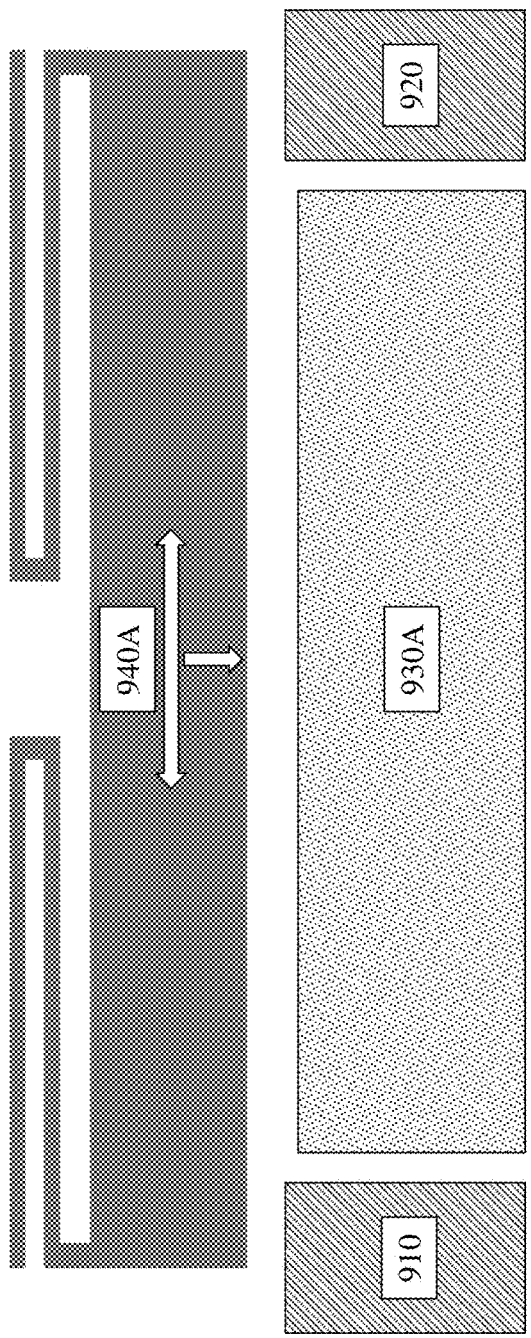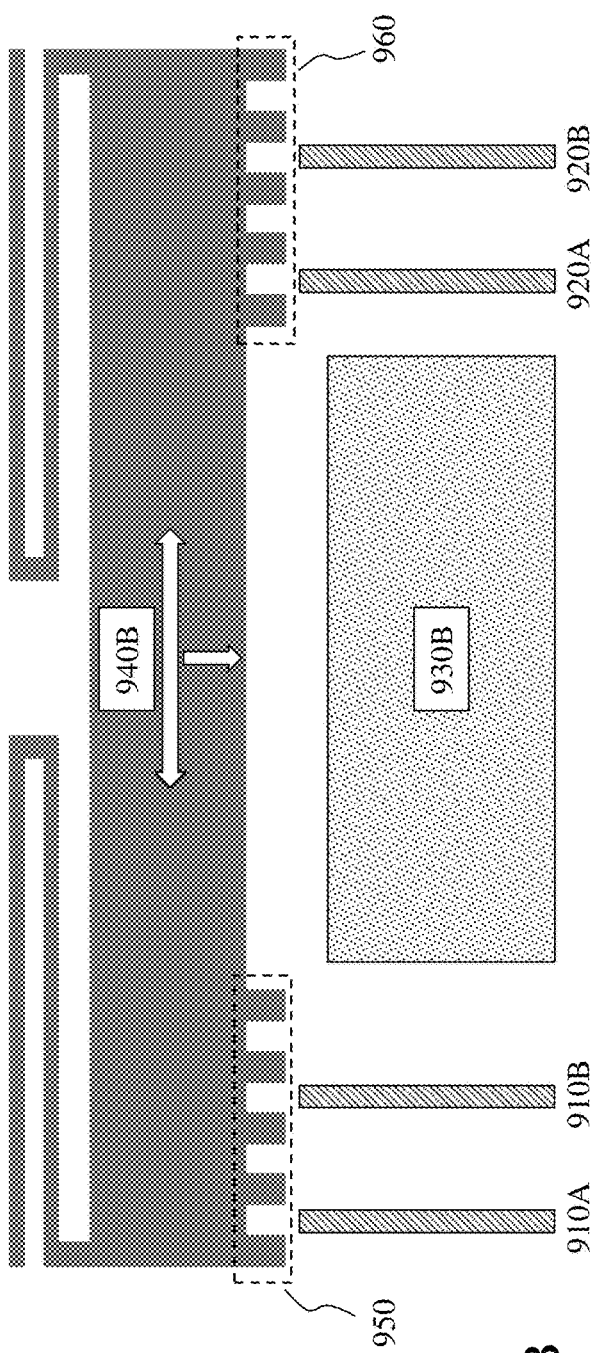
Figure 9A
Figure 9B

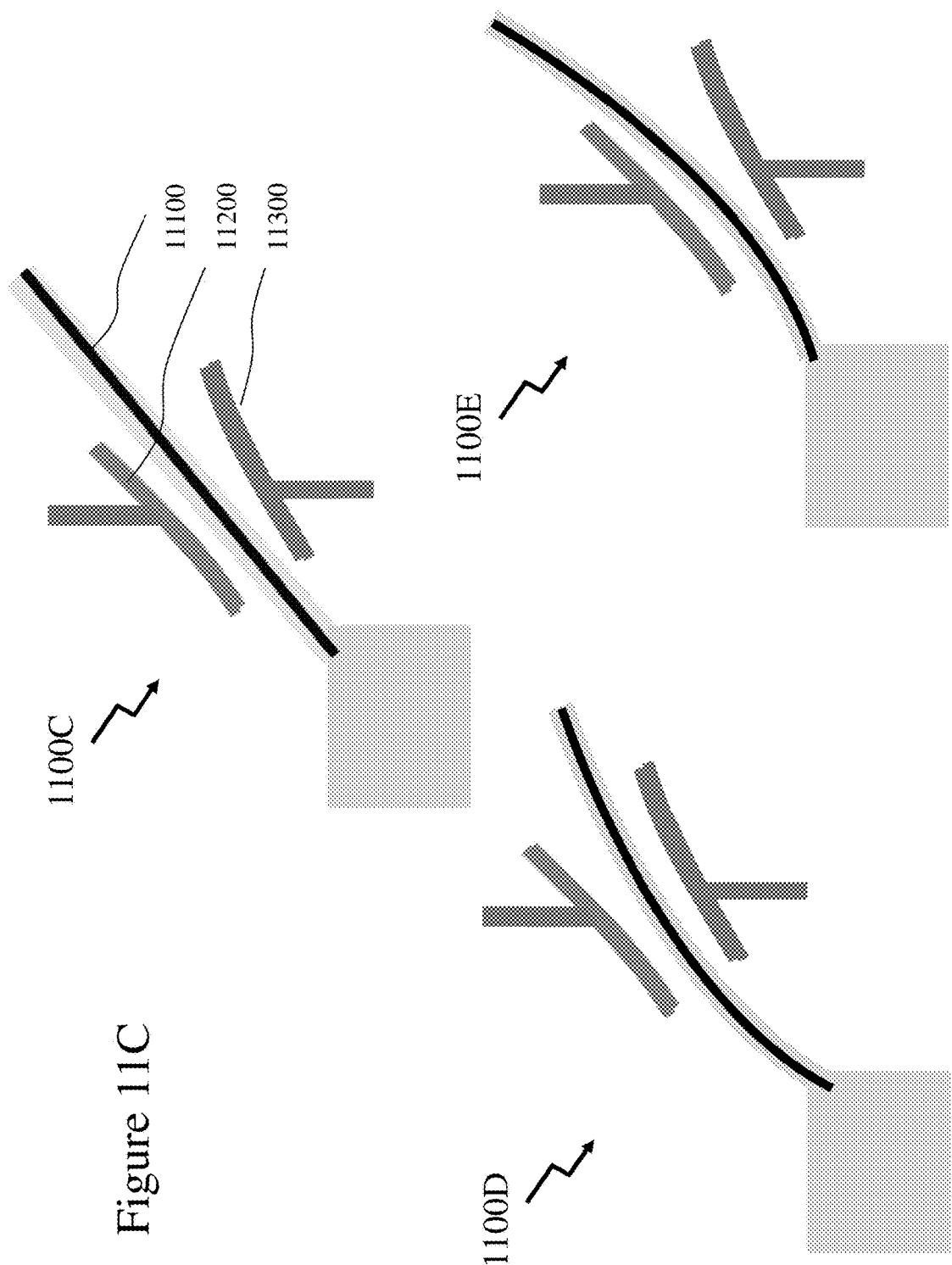

STRUCTURES AND METHODS FOR STRESS AND GAP MITIGATION IN INTEGRATED OPTICS MICROELECTROMECHANICAL SYSTEMS

CROSS-REFERENCE TO RELATED APPLICATIONS

This application claims the benefit of priority as a 371 National Phase entry application of PCT/CA2019/000,156 filed Nov. 8, 2019 entitled "Structures and Methods for Stress and Gap Mitigation in Integrated Optics Microelectromechanical Systems", which itself claims the benefit of priority from U.S. Provisional Patent No. 62/757,317 filed Nov. 8, 2018 entitled "Structures and Methods for Stress and Gap Mitigation in Integrated Optics Microelectromechanical Systems", the entire contents of which are incorporated herein by reference.

FIELD OF THE INVENTION

This invention is directed to integrated optic MEMS (IO-MEMS) concepts and more particular to establishing structures and methods for mitigating the effect of stress in the butt coupling and gap closing of waveguides in IO-MEMS. This invention improves upon the state of the art for the designs of optical switches, optical component packaging, optical coupling and stress compensated component manufacturing.

BACKGROUND OF THE INVENTION

Silicon Photonics is a promising technology for adding integrated optics functionality to integrated circuits by leveraging the economies of scale of the CMOS microelectronics industry. Some variants of Silicon Photonics may use other materials as the waveguide core such as silicon nitride ($Si_xN_y$) and silicon oxynitride ($SiO_xN_{1-x}$) for example.

Microelectromechanical systems (MEMS) are small integrated devices or systems that combine electrical and mechanical functionality within a silicon integrated circuit, although other material systems may be employed. MEMS can range in size from the sub-micrometer level to the millimeter level, and there can be any number, from one, to few, to potentially thousands or millions, in a particular system. Historically, MEMS devices have leveraged and extended the fabrication techniques developed for the silicon integrated circuit industry, namely thin film deposition, lithography, etching, etc. to add mechanical elements such as beams, gears, diaphragms, and springs to silicon circuits either as discrete devices or in combination with silicon electronics. Examples of MEMS device applications today include inkjet-printer cartridges, accelerometers, miniature robots, micro-engines, locks, inertial sensors, micro-drives, micro-mirrors, micro actuators, optical scanners, fluid pumps, transducers, chemical sensors, pressure sensors, and flow sensors. These MEMS systems can sense, control, and activate mechanical processes on the micro scale, and function individually or in arrays to generate effects on the macro scale and have become a successful actuating technology.

MEMS as structures for altering the path of light in free space are commonly referred to as conventional Micro-Opto-Electro-Mechanical-Systems (MOEMS). On the other hand, Integrated Optics MEMS or IO-MEMS, leverage recent developments by MEMS-enabling integrated optics integrated circuits (IC's) based on Silicon Photonics. Prior to the present invention introducing gap closing waveguides enabling butt coupling, IO-MEMS have been restricted to horizontally or vertically actuated, air cladded waveguides, coupling evanescently or adiabatically to fixed waveguides.

Accordingly, there exists a requirement for MEMS actuated gap closing and butt coupling of integrated optics waveguides to provide more efficient, broadband and polarization insensitive optical coupling between integrated optics dielectric cladded waveguides that are MEMS actuated and the anchored waveguides located on the same chip. Given that the material serving as the dielectric cladding and as the waveguide core can induce significant stress within the MEMS structures supporting the waveguides, and hence deformation of MEMS structures, the inventors have had to devise two different microfabrication processes classes of IO-MEMS; firstly a design dependent process, of which exemplary embodiments of the invention are described in FIGS. 16-22 for multiple variants of stress mitigation and secondly a design independent process, of which exemplary embodiments of the invention are described in FIGS. 23-25. Additionally, leveraging these process classes according to embodiments of the invention is extended by the inventors with new IO-MEMS designs leveraging the two aforementioned process classes and capable of minimizing optical misalignment upon gap closing and butt coupling.

Accordingly, it would be desirable to provide circuit designers and production teams with circuit design methodologies that are device design independent such that complex expensive production tuning of manufacturing processes to a specific design is eliminated and a wide variety of devices can be manufactured using a single manufacturing process/recipe as available in silicon electronics.

Further, within the optical devices it would be beneficial to exploit IO-MEMS for active functions such as switching and provide circuit designers with building blocks, e.g. optical switch unitary cells, that can exploit IO-MEMS based configuration with or without intermediate optical circuitry between the IO-MEMS elements and that can be optically interconnected in both small and a large arrays to implement small radix optical protection circuit switches or large radix strictly non-blocking or rearrangeably non-blocking optical switching fabrics.

Finally, to date, packaging of IO-MEMS with standard single mode glass optical fibers with a standard glass cladding diameter of 125 microns, when employing butt coupling rather than surface gratings, have required the active alignment of the optical fibers. Active alignment is both cumbersome and expensive, as requiring tracking the coupling efficiency dynamically with light and photodetectors when performing the alignment. Surface gratings are bandwidth limited and polarization sensitive devices and are not desirable for high-performance coupling of optical fibers to photonic integrated circuits.

Accordingly, it would be desirable to establish passive packaging of standard diameter single mode fibers to IO-MEMS via butt coupling, both with individual fibers but also with multiple optical fiber assemblies, also known as fiber ribbons, with typically 12 or more fibers held together by a polymer coating surrounding their 125 micron diameter glass cladding.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to conventional microoptoelectromechanical systems (MOEMS) by integrated optics MEMS (IO-MEMS) concepts and more particular to establishing butt coupling and gap closing of waveguides in IO-MEMS to improve upon the state of the art for the designs of optical switches, optical component packaging, optical coupling and stress compensated component manufacturing.

In accordance with an embodiment of the invention there is provided a method of fabricating an optical channel waveguide comprising:
- depositing a lower cladding comprising a first silicon dioxide layer of a first predetermined thickness upon a substrate;
- depositing and patterning a core of the optical channel waveguide comprising silicon nitride of a second predetermined thickness and a first predetermined width upon the lower cladding;
- depositing an upper cladding comprising a second silicon dioxide layer of a third predetermined thickness atop the core and lower cladding; and
- annealing the resulting structure within a nitrogen environment under first predetermined conditions.

In accordance with an embodiment of the invention there is provided an optical device comprising:
- an input waveguide formed upon a substrate having a first end at a first predetermined location upon a first facet formed in the substrate;
- an output waveguide formed upon the substrate having a first end at a second predetermined location upon the first facet formed in the substrate;
- a moveable platform comprising a second facet formed in the moveable platform disposed opposite the first facet;
- a gate waveguide formed upon a movable platform suspended relative to the substrate having a first end at a first predetermined location upon the second facet and a distal second end at a second predetermined location upon the second facet; and
- a microelectromechanical systems (MEMS) actuator coupled to the movable platform; wherein
- the MEMS actuator in a first position moves the movable platform such that the first facet and the second facet are separated by a gap between the first facet and the second facet such that optical signals propagating within the input waveguide are either minimally coupled to the output waveguide via the gate waveguide or are coupled with a predetermined attenuation and;
- the MEMS actuator in a second position moves the movable platform such that the first facet and the second facet are in contact with one another and optical signals propagating within the input waveguide are coupled to the output waveguide via the gate waveguide.

In accordance with an embodiment of the invention there is provided a device comprising:
- a first integrated optics microelectromechanical system (IO-MEMS) element comprising a plurality of first optical waveguides each linking a first predetermined port of a plurality of ports on one side of the MOEMS element to a second predetermined port of the plurality of ports on same side of the IO-MEMS element;
- a linear microelectromechanical systems (MEMS) translator coupled to the IO-MEMS element for moving the IO-MEMS element;
- a plurality of second optical waveguides defined upon a substrate upon which the IO-MEMS element is also formed; wherein
- in a first position the IO-MEMS element couples a third predetermined subset of the plurality of ports to a first predetermined subset of the plurality of second optical waveguides and a fourth predetermined subset of the plurality of ports to a second predetermined subset of the plurality of second optical waveguides; and
- in a second position the IO-MEMS element couples a fifth predetermined subset of the plurality of ports to a third predetermined subset of the plurality of second optical waveguides and a sixth predetermined subset of the plurality of ports to a fourth predetermined subset of the plurality of second optical waveguides; wherein
- the IO-MEMS element also includes a gap closing functionality.

In accordance with an embodiment of the invention there is provided a device comprising:
- a first integrated optics microelectromechanical system (IO-MEMS) element comprising a plurality of first optical waveguides each linking a first predetermined port of a plurality of ports on one side of the IO-MEMS element to a second predetermined port of the plurality of ports on same side of the IO-MEMS element;
- a first linear microelectromechanical systems (MEMS) actuator coupled to the IO-MEMS element for moving the IO-MEMS element along a first axis parallel to side of the IO-MEMS element with the plurality of ports;
- a second linear MEMS actuator coupled to the IO-MEMS element for moving the IO-MEMS element along a second axis perpendicular to the first axis;
- a plurality of second optical waveguides defined upon a substrate upon which the IO-MEMS element is also formed having first ends disposed proximate the side of the IO-MEMS element with the plurality of ports; wherein
- the second linear MEMS actuator moves the IO-MEMS element from a first position with a first predetermined gap between the first ends of the plurality of second optical waveguides and the side of the IO-MEMS element with the plurality of ports to a second position with a second predetermined gap smaller than the first gap.
- the first linear MEMS actuator moves the IO-MEMS when the second linear MEMS actuator is in the second position from a first position to a second position such that:
- in the first position the IO-MEMS element couples a third predetermined subset of the plurality of ports to a first predetermined subset of the plurality of second optical waveguides and a fourth predetermined subset of the plurality of ports to a second predetermined subset of the plurality of second optical waveguides; and
- in a second position the IO-MEMS element couples a fifth predetermined subset of the plurality of ports to a third predetermined subset of the plurality of second optical waveguides and a sixth predetermined subset of the plurality of ports to a fourth predetermined subset of the plurality of second optical waveguides.

In accordance with an embodiment of the invention there is provided a microelectromechanical (MEMS) element comprising:
- a first portion defining a first profile along an axis of the first portion;
- a second portion defining a second profile along the axis of the first portion; and
- a plurality of electrostatic actuators disposed along the second portion to move the second portion in a direction perpendicular to the axis of the first portion between at least a first position and a second position; wherein in the first position motion of a MEMS structure mechanically coupled to either the first portion or the second portion is limited to a first predetermined position along the axis of the first portion by one or more first gap stopping features; and in the second position motion of the MEMS structure mechanically coupled to the one of the first portion or the second portion is limited to a second predetermined position along the axis of the first portion by one or more second gap stopping features.

In accordance with an embodiment of the invention there is provided an optical interface comprising:

a first waveguide on a first portion of an integrated optics microelectromechanical system (IO-MEMS) device disposed on one side of a gap;

a second waveguide on a second portion of the IO-MEMS device disposed on the other side of the gap; wherein the first waveguide is coupled to a first predetermined portion of a mode expansion structure comprising one of an inverted taper and a multimode interference (MMI) structure; and the second waveguide is coupled to a second predetermined portion of a mode expansion structure comprising one of an inverted taper and a multimode interference (MMI) structure; and when the first and second predetermined portions of the mode expansion structure are aligned and upon gap closure and optical signals are coupled from the first waveguide to the second waveguide.

In accordance with an embodiment of the invention there is provided a device comprising:

a first integrated optics microelectromechanical system (IO-MEMS) element comprising an anchor mechanically coupled to a substrate and a beam mechanically coupled to the anchor at one end;

a first optical waveguide disposed along the beam and anchor terminating at a predetermined point on the end of the beam distal to the anchor;

a microelectromechanical (MEMS) actuator disposed at a predetermined point along the beam; and a plurality of second optical waveguides mechanically coupled to the substrate; wherein actuation of the MEMS actuator moves the results in deformation of the beam between a first deformation and a second deformation such that upon gap closure, the first optical waveguide is coupled from a first second optical waveguide of the plurality of second optical waveguides to a second optical waveguide of the plurality of second optical waveguides.

In accordance with an embodiment of the invention there is provided a device comprising:

four integrated optics microelectromechanical system (IO-MEMS) elements each comprising:
an anchor mechanically coupled to a substrate;
a beam mechanically coupled to the anchor at one end;
a first optical waveguide disposed upon the beam and anchor terminating at a predetermined point on the end of the beam distal to the anchor; and
a microelectromechanical (MEMS) actuator disposed at a predetermined point along the beam; and
a plurality of second optical waveguides mechanically coupled to the substrate; and a waveguide crossing on the fixed portion of the IO-MEMS; wherein actuation of the MEMS actuator within each IO-MEMS element results in deformation of the beam between a first deformation and a second deformation such that the first optical waveguide is coupled upon gap closure, from a first second optical waveguide of the plurality of second optical waveguides to a second optical waveguide of the plurality of second optical waveguides;

in a first configuration a first predetermined voltage is applied to each MEMS actuator results in the first deformation of the beam such that a first pair of IO-MEMS elements are coupled to opposite ends of a first second optical waveguide of the plurality of second optical waveguides and a second pair of IO-MEMS elements are coupled to opposite ends of a second optical waveguide of the plurality of second optical waveguides; and in a second configuration a second predetermined voltage is applied to each MEMS actuator results in the second deformation of the beam such that an IO-MEMS element of the first pair of IO-MEMS elements is coupled to one end of a third second optical waveguide of the plurality of second optical waveguides and a IO-MEMS element of the second pair of IO-MEMS elements is coupled to the other end of the third second optical waveguide of the plurality of second optical waveguides and the other IO-MEMS element of the first pair of IO-MEMS elements is coupled to one end of a fourth second optical waveguide of the plurality of second optical waveguides and the other IO-MEMS element of the second pair of IO-MEMS elements is coupled to the other end of the fourth second optical waveguide of the plurality of second optical waveguides; and the waveguide crossing is implemented within either the first second optical waveguide of the plurality of second optical waveguides and the second second optical waveguide of the plurality of second optical waveguides or the third second optical waveguide of the plurality of second optical waveguides and the fourth second optical waveguide of the plurality of second optical waveguides.

In accordance with an embodiment of the invention there is provided a device comprising:

four integrated optics microelectromechanical system (IO-MEMS) elements each comprising:
an anchor mechanically coupled to a substrate;
a beam mechanically coupled to the anchor at one end;
a first optical waveguide disposed upon the beam and anchor terminating at a predetermined point on the end of the beam distal to the anchor; and
a microelectromechanical (MEMS) actuator disposed at a predetermined point along the beam; wherein actuation of the MEMS actuator within each IO-MEMS element results in deformation of the beam between a first deformation and a second deformation; and in a first configuration a first predetermined voltage is applied to each MEMS actuator results in the first deformation of the beam wherein the first optical waveguides on a first pair of IO-MEMS elements are coupled to each other and the first optical waveguides on a second pair of IO-MEMS elements are coupled to each other;

in a second configuration a second predetermined voltage is applied to each MEMS actuator results in the second deformation of the beam; wherein the first optical waveguide of an IO-MEMS element of the first pair of IO-MEMS elements is coupled to the optical waveguide of an IO-MEMS element of the second pair of IO-MEMS elements; and the first optical waveguide of the other IO-MEMS element of the first pair of IO-MEMS elements is coupled the optical waveguide of the other IO-MEMS element of the second pair of IO-MEMS elements.

In accordance with an embodiment of the invention there is provided a fiber interface comprising:
a suspended platform comprising a first portion of an optical waveguide along an axis of the suspended platform;
a flexible beam coupled to the suspended platform supporting a second portion of the optical waveguide; and
a groove formed with a substrate having an axis along the axis of the suspended platform; wherein
the suspended platform can move along the axis of the suspended platform in response to pressure resulting from contact with an optical fiber inserted into the groove and moved along the groove towards the suspended platform.

In accordance with an embodiment of the invention there is provided a method comprising;
providing a plurality of vias etched from the bottom of the substrate up to the bottom portion of the silicon device layer of the silicon layer of a silicon-on-insulator (SOI) structure; wherein
the plurality of vias allow the mechanical element of the MEMS or IO-MEMS to be released from the box and the substrate of the SOI structure.

In accordance with an embodiment of the invention there is provided a method comprising:
providing an integrated optics microelectromechanical system (IO-MEMS) device comprising:
an optical waveguide stack comprising at least a bottom cladding layer and a core layer for forming one or more optical waveguides deposited on top of a silicon layer of a silicon-on-insulator (SOI) structure upon a substrate;
a plurality of vias etched through the substrate to the bottom of the silicon device layer of the SOI structure serving as the mechanical element of the MEMS or IO-MEMS;
wherein
the thickness of the silicon device layer of the SOI structure is defined by the diameter of an optical fiber to be inserted into a groove formed by etching through the silicon device layer and the thickness of the optical waveguide stack from the top of the silicon layer of the SOI structure to the middle of the core layer of the optical waveguide stack.

In accordance with the embodiment of the invention as described there is further provided within the method of providing an integrated optics microelectromechanical system (IO-MEMS) device comprising an optical stack and a plurality of vias there is provided the additional step of:
selectively removing the optical stack in predetermined locations allowing for mitigation of a stress resulting from at least one of the optical stack and the silicon layer of the SOI structure to minimize at least one of distortion to a suspended portion of the IO-MEMS and a bow of the SOI wafer.

In accordance with an embodiment of the invention there is provided a method comprising:
providing an integrated optics microelectromechanical system (IO-MEMS) device comprising;
an optical waveguide stack comprising at least a bottom cladding layer and a core layer for forming one or more optical waveguides deposited on top of a silicon layer of a silicon-on-insulator (SOI) structure upon a substrate; and
a plurality of vias etched through the substrate to the bottom of the silicon device layer of the SOI structure serving as the mechanical element of the MEMS or IO-MEMS;
depositing a stress compensation stack comprising one or more materials deposited through the plurality of vias and having at least one of the same structure as the optical waveguide stack and an equivalent stress value as that of the optical stack; wherein
at least one of the stress compensation stack is patterned to match the pattern of the first optical waveguide stack above via of the plurality of vias and the optical waveguide stack is selectively removed in predetermined locations allowing for mitigation of a stress resulting from at least one of the optical waveguide stack and the silicon layer of the SOI structure to minimize a bow of the SOI substrate; wherein
the thickness of the silicon device layer of the SOI structure is defined by the diameter of an optical fiber to be inserted into a groove formed by etching through the silicon device layer and the thickness of the optical waveguide stack from the top of the silicon layer of the SOI structure to the middle of the core layer of the optical waveguide stack.

In accordance with an embodiment of the invention there is provided a method comprising:
providing an integrated optics microelectromechanical system (IO-MEMS) device comprising an optical waveguide structure having a core layer formed from a piezoelectric material; and
dynamically compensating for stress within the optical waveguide structure by piezoelectric actuation of the piezoelectrically actuatable core.

In accordance with an embodiment of the invention there is provided an integrated optics microelectromechanical system (IO-MEMS) device comprising:
an optical waveguide stack comprising at least a bottom cladding layer and a core layer for forming one or more optical waveguides deposited on top of a silicon layer of a silicon-on-insulator (SOI) structure upon a substrate; wherein
the substrate has one or more cavities of a predetermined depth less than the thickness of the substrate formed under those regions of the silicon layer of the SOI structure which form at least one of an IO-MEMS element and microelectromechanical systems (MEMS) element of the IO-MEMS device; wherein
selectively removing the optical waveguide stack in predetermined locations allowing for mitigation of a stress resulting from at least one of the optical waveguide stack and the silicon layer of the SOI structure to minimize at least one of distortion to a suspended portion of the IO-MEMS and a bow of the SOI wafer;
the thickness of the silicon device layer of the SOI structure is defined by the diameter of an optical fiber to be inserted into a groove formed by etching through the silicon device layer and the thickness of the optical waveguide stack from the top of the silicon layer of the SOI structure to the middle of the core layer of the optical waveguide stack.

In accordance with an embodiment of the invention there is provided an integrated optics microelectromechanical system (IO-MEMS) device comprising:
an optical waveguide stack comprising at least a bottom cladding layer and a core layer for forming one or more optical waveguides deposited on top of a silicon layer of a silicon-on-insulator (SOI) structure upon a substrate; wherein
a stress compensation stack deposited and patterned on a bottom of the silicon layer of the SOI structure within a cavity formed within the SOI structure having a stress to mitigate the stress of the optical waveguide stack on the top of the silicon layer of the SOI structure wherein selectively removing the optical waveguide stack in predetermined locations allowing for mitigation of a stress resulting from at least one of the optical waveguide stack and the silicon layer of the SOI structure to minimize at least one of distortion to a suspended portion of the IO-MEMS and a bow of the SOI wafer;
the thickness of the silicon device layer of the SOI structure is defined by the diameter of an optical fiber to be inserted into a groove formed by etching through the silicon device layer and the thickness of the optical waveguide stack from the top of the silicon layer of the SOI structure to the middle of the core layer of the optical waveguide stack; and In accordance with an embodiment of the invention there is provided an integrated optics microelectromechanical system (IO-MEMS) device comprising:
a layered structure patterned to form one or more optical waveguides comprising a bottom cladding, a core layer and a top cladding, disposed between a first silicon device layer of a first silicon-on-insulator (SOI) structure having a first predetermined thickness and a second silicon device layer of a second silicon-on-insulator structure having a second predetermined thickness; wherein
the layered structure has symmetrical stress centered on the core layer of the layered structure;
the silicon device layers of the first and second SOI structures of the layered structure are connected through an electrically conductive via formed across the layered structure allowing both silicon device layers to form a single MEMS element actuated with an electrical signal coupled to both the silicon device layer to which it is initially coupled and the other silicon device layer via the via; and
one of the first SOI structure and second SOI structure is mechanically coupled to a substrate and the silicon device layer thickness of the one of the first SOI structure and second SOI structure is defined by the diameter of an optical fiber to be inserted into a groove formed by etching through the device layer of the bottom cap SOI structure and the thickness of the layer structure up to the middle of the core layer of the layered structure.

In accordance with an embodiment of the invention there is provided a method comprising:
providing an integrated optics microelectromechanical system (IO-MEMS) device comprising:
an optical stack of materials patterned to form one or more optical waveguides, composed of a bottom cladding, a core layer and a top cladding, disposed upon a silicon device layer of a first silicon-on-insulator (SOI) structure having a first predetermined thickness; wherein
the optical stack provides a symmetrical level of stress centered on the core layer thereby eliminating the need for removing the optical waveguide materials set where there are no patterned waveguides as well as foregoing the need for adding a stress compensating stack on the suspended portion of the IO-MEMS; wherein
the first SOI structure with the optical stack is bonded face down onto the top device layer of a double SOI structure with a cavity incorporating a stress compensation material set below the device layer silicon covering the cavity;
an IO-MEMS element is formed from the stress compensation material below the device layer of the double SOI structure with cavity, the top device layer of the double SOI structure with cavity, the optical stack disposed upon the device layer of the first SOI structure, the device layer of the first SOI structure and the buried oxide of the first SOI structure;
the thickness of the first device layer of the double SOI structure with cavity is defined by the diameter of an optical fiber to be inserted into a groove formed by opening a cavity without need for stress compensation below the device layer silicon covering the cavity and by the thickness of the above layer structure up to the middle of the core layer of the optical stack; and
the IO-MEMS is symmetrical vertically with respect to stress with the device layer of the first SOI structure having the same thickness as the device layer of the double SOI structure.

In accordance with an embodiment of the invention there is provided a method comprising:
providing an integrated optics microelectromechanical system (IO-MEMS) device comprising:
an optical stack of materials patterned to form one or more optical waveguides, composed of a bottom cladding, a core layer and a top cladding, disposed upon a silicon device layer of a first silicon-on-insulator (SOI) structure having a first predetermined thickness; wherein
the optical stack provides a symmetrical level of stress centered on the core layer thereby eliminating the need for removing the optical waveguide materials set where there are no patterned waveguides as well as foregoing the need for adding a stress compensating stack on the suspended portion of the IO-MEMS;
providing an electrically conductive via formed between the device layer of the first SOI structure through the optical stack material set disposed upon it and connecting the device layer of a second SOI structure having an opening formed within thereby allowing common actuation for the IO-MEMS; and
attaching an optical fiber aligned with an optical waveguide of the one of more optical waveguides is enabled by the opening; wherein
the first SOI structure with the optical stack is bonded face down onto the top device layer of a double SOI structure with a cavity incorporating a stress compensation material set below the device layer silicon covering the cavity;
an IO-MEMS element is formed from the stress compensation material below the device layer of the double SOI structure with cavity, the top device layer of the double SOI structure with cavity, the optical stack disposed upon the device layer of the first SOI structure, the device layer of the first SOI structure and the buried oxide of the first SOI structure;

the thickness of the first device layer of the double SOI structure with cavity is defined by the diameter of an optical fiber to be inserted into a groove formed by opening a cavity without need for stress compensation below the device layer silicon covering the cavity and by the thickness of the above layer structure up to the middle of the core layer of the optical stack; and the IO-MEMS is symmetrical vertically with respect to stress with the device layer of the first SOI structure having the same thickness as the device layer of the double SOI structure.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5A depicts the normal configuration mode for a dual fiber optical link with single protection fiber exploiting a pair of IO-MEMS based 2×3 optical switches implemented according to embodiments of the invention exploiting 90-degree turning mirrors rather than waveguide bends;

FIGS. 5B and 5C depict the two different "fail" protection modes for a dual fiber optical link with single protection fiber exploiting a pair of IO-MEMS based 2×3 optical switches implemented according to embodiments of the invention exploiting 90-degree turning mirrors;

FIGS. 9A to 9C depict exemplary designs for stoppers for gap closers within MEMS based optical switches according to an embodiment of the invention;

FIG. 11C depicts actuator configurations for a 2×2 MEMS optical switch according to an embodiment of the invention with "blocked" power fail state and driven "cross" and "bar" states;

DETAILED DESCRIPTION

Figure 1:
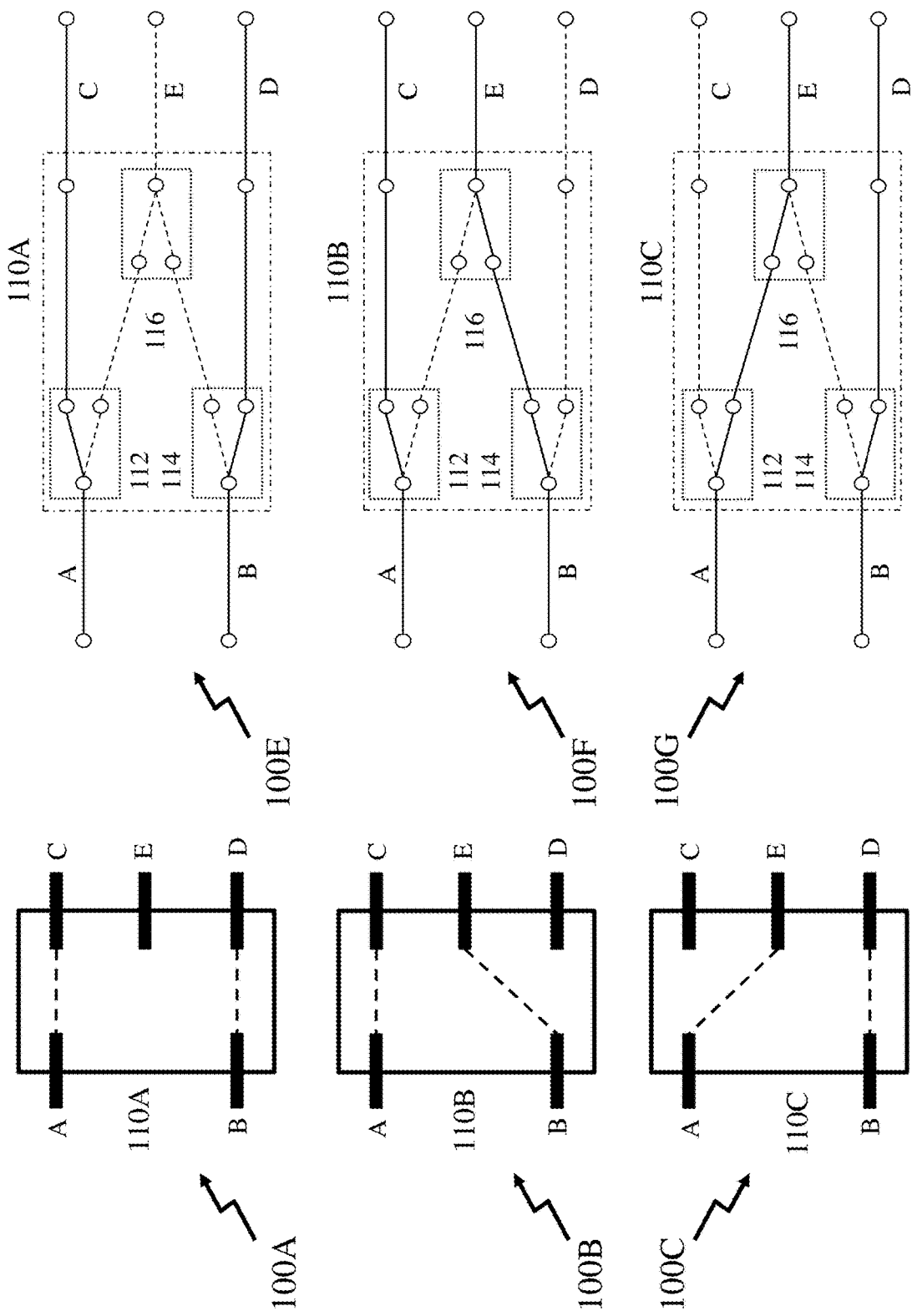
FIG. 1 depicts the implementation of a 2×3 optical switch for dual fiber optical links protected with a third optical fiber providing normal and "fail" protection states/internal interconnections implemented using conventional IO-MEMS 1×2 switch elements.

The present invention is directed to conventional integrated optics microelectromechanical systems (IO-MEMS) by integrated optics MEMS (IO-MEMS) concepts and more particular to establishing butt coupling and gap closing of waveguides in IO-MEMS to improve upon the state of the art for the designs of optical switches, optical component packaging, optical coupling and stress compensated component manufacturing.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional elements.

Duplex communication over a pair of optical fibers is a common feature of many optical communication networks. For example, these may be what are referred to as "up"/"down" links between two elements of an optical network, e.g. a remote node and a central office, or they may be what are referred to as "east"/"west" links such as between nodes on a ring-based network. Generally, these two optical fibers are routed differently physically, e.g. different optical fiber cables, different geographic routes, etc. so that a fallback fiber, a third fiber, can provide backup in the event that either of the two fibers fails. Co-locating the pair of fibers increases the likelihood that both will fail at the same time and hence both must be backed up. Accordingly, different physical routing is common with the third fiber taking a different physical path to either of the other pair of optical fibers.

Referring to FIG. 1 there are depicted first to sixth images 100A to 100G respectively with respect to the implementation of a 2×3 optical switch for dual fiber optical link protection using 1×2 switch elements implemented using conventional prior art IO-MEMS 1×2 switch elements. Accordingly, first to third images 100A to 100C depict the block circuit diagram for the three 2×3 switch configurations in "normal" and first and second "fail-over" configurations respectively. Fourth to sixth images 100D to 100F depict the 2×3 optical switch constructed with three 1×2 optical switches 112, 114 and 116. The configuration of each of these three 1×2 switches 112, 114 and 116 within the 2×3 optical switch depicted in the "normal" and first and second "fail-over" configurations respectively in first to third switches 110A to 110C respectively in fourth to sixth images 100D to 100F respectively wherein solid lines represent connections that are "made" or active and dashed lines represent connections are "not made" or inactive in each switch configuration.

Accordingly, the inventors have established based upon the fact that there is no need to ever connect A to D or B to C that it is possible to redesign the switch to employ a 1×2 and 2×2. Accordingly, referring to FIG. 2 there are depicted first to sixth images 200A to 200F respectively with respect to the implementation of a 2×3 optical switch for dual fiber optical link protection using 1×2 switch elements implemented using conventional prior art 1×2 and 2×2 IO-MEMS switch elements. Accordingly, first to third images 200A to 200C depict the block circuit diagram for the three 2×3 switch configurations such as discussed supra in respect of FIG. 1. Fourth to sixth images 200D to 200F depict the 2×3 optical switch constructed with 1×2 optical switch 214 and 2×2 optical switch 212. The configuration of these switches within the 2×3 optical switch being depicted by first to third switches 210A to 210C respectively in fourth to sixth images 200D to 200F respectively wherein solid lines represent connections that are "made", or active and dashed lines represent connections are "not made" or inactive.

Figure 3:
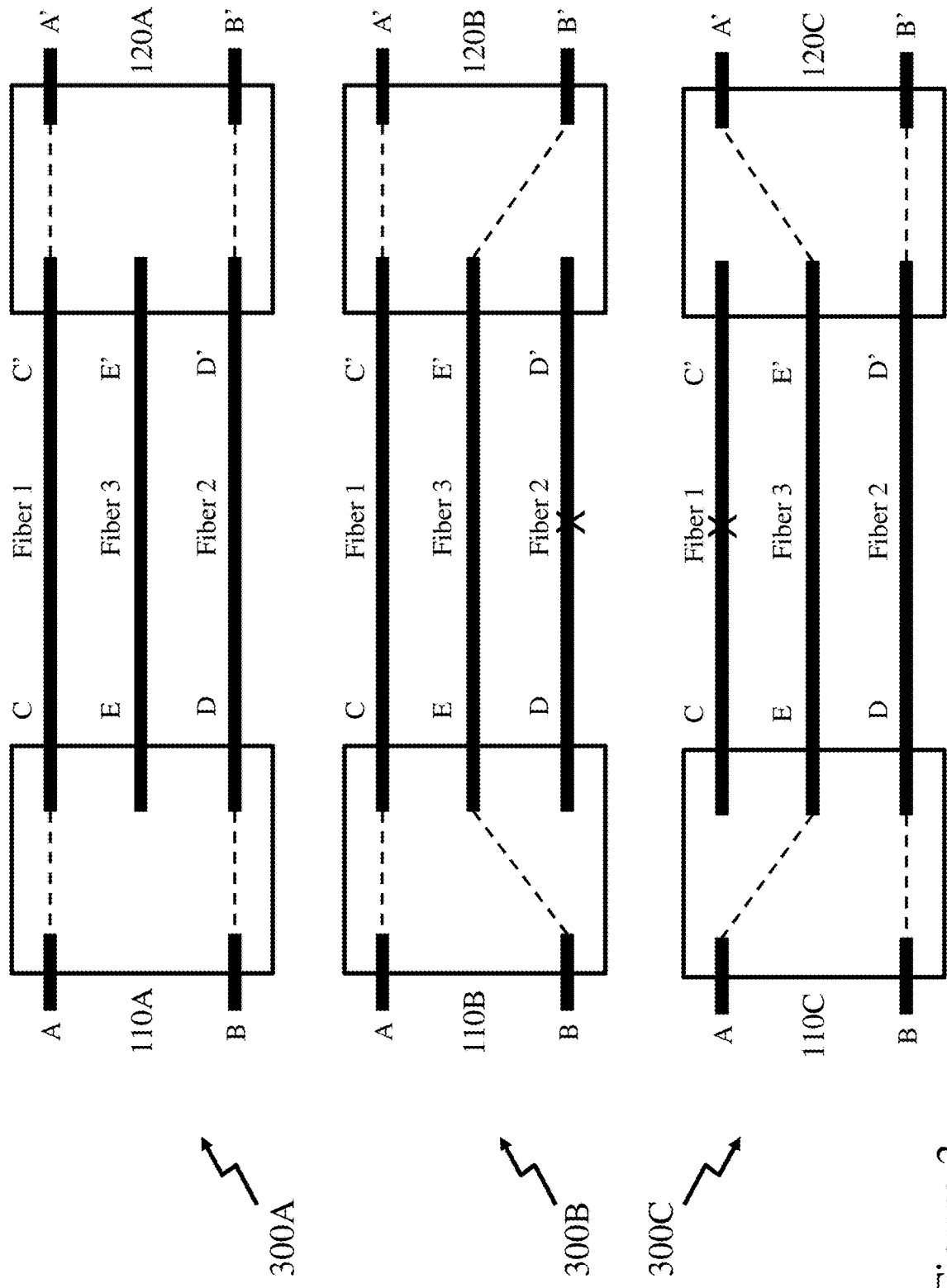
FIG. 3 depicts the normal and "fail" protection modes for a dual fiber optical communications link protected by a third optical fiber, exploiting a pair of identical 2×3 IO-MEMS optical switches according to an embodiment of the invention.

Now referring to FIG. 3 there are depicted first to third image 300A to 300C respectively depicting the normal and "fail-over" protection modes for a dual fiber optical communications link protected by a third optical fiber, exploiting a pair of identical 2×3 optical switches on both ends of the optical link comprising first and second fibers Fiber 1 and Fiber 2 respectively together with the protection "fail-over" optical fiber, Fiber 3. In first image 300A the normal operation of the link is depicted showing the first optical switch in state 110A and second optical switch in state 120A wherein traffic is carried from port A to port A' (or vice-versa) by Fiber 1 and second traffic is carried from port B to port B' (or vice-versa) by Fiber 2. First states 110A and 120A are a common switch state for the pair of 2×3 optical switches. Subsequently, upon traffic upon Fiber 2 being disrupted a reconfiguration of the two optical switches re-routes the second traffic on Fiber 2 to Fiber 3. This is being depicted in second image 300B wherein the first optical switch is now in state 110B whilst the second optical switch is in state 120B, these states 110B and 120B being another common state of the pair of 2×3 optical switches. Accordingly, should traffic be disrupted on Fiber 2, then the traffic would be switched onto Fiber 3. Accordingly, on the first switch the traffic to/from ports A and B are routed from/to ports C and E respectively whereas on the second switch the traffic to/from ports C' and E' are routed from/to ports A' and B' respectively. Alternatively, in an alternate fail-over the traffic on Fiber 1 is disrupted and reconfiguration of the two optical switches would be configured together to switch the traffic from Fiber 1 onto Fiber 3.

This being depicted in third image 300C wherein the first optical switch is now in state 110C whilst the second optical switch is in state 120C, these states 110C and 120C being another common state of the pair of 2×3 optical switches. Accordingly, with traffic disrupted on Fiber 1 the traffic is routed to Fiber 3 which is implemented on the first switch such that the traffic to/from ports A and B are routed from/to ports E and D respectively whereas on the second switch the traffic to/from ports E' and D' are routed from/to ports A' and B' respectively. These configurations being listed in Tables 1 to 3 respectively below.

TABLE 1

| Normal Mode | | | |
|---|---|---|---|
| Left Switch | | Right Switch | |
| Input Port | Connected To | Output Port | Connected To |
| A | C | A' | C' |
| B | D | B' | D' |

TABLE 2

| Protection for Fiber 2 Failure | | | |
|---|---|---|---|
| Left Switch | | Right Switch | |
| Input Port | Connected To | Output Port | Connected To |
| A | C | A' | C' |
| B | E | B' | E' |

TABLE 3

| Protection for Fiber 1 Failure | | | |
|---|---|---|---|
| Left Switch | | Right Switch | |
| Input Port | Connected To | Output Port | Connected To |
| A | E | A' | E' |
| B | D | B' | D' |

Referring back to FIG. 2 and the 2×2 optical switch 212 within fourth to sixth images 200D to 200F respectively for the "normal" operating mode and the two "fail-over conditions" then it is evident that whilst it is configured in both of, what are commonly referred to as, the "bar state" and "cross state" configurations but that there is no requirement for both "cross" paths to be employed in any configuration. Accordingly, the inventors have established that a IO-MEMS based design where the first IO-MEMS is used only as a 1×2 switch element and the second IO-MEMS 212 is only used for the functionality of "simple" crossbar switch element rather than a full 2×2 doesn't need can be implemented with a second IO-MEMS 212 in the form of a crossbar rather a 2×2. Accordingly, referring to FIG. 4 there is depicted according to an embodiment of the invention an implementation of a 2×3 optical switch for dual fiber optical link protection implemented using an IO-MEMS based "horseshoe" configuration optical switch according to an embodiment of the invention. The inventors referring to the IO-MEMS design as "horseshoe" as each optical path within the IO-MEMS elements loops back, as does a horseshoe, wherein the horseshow can either implement 1×2 or crossbar functionality.

Figure 2:
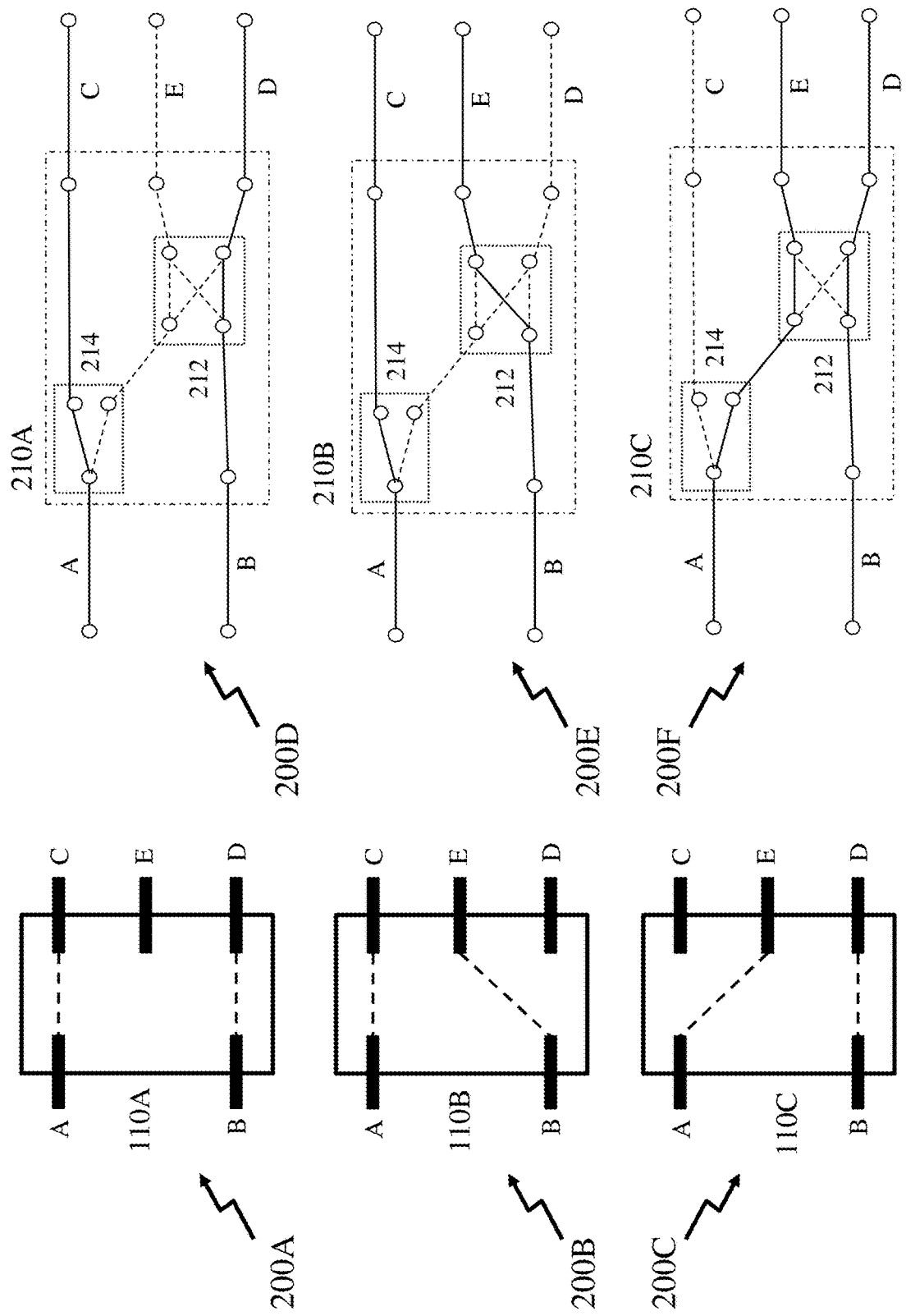
FIG. 2 depicts the implementation of a 2×3 optical switch for dual fiber optical links protected with a third optical fiber, with normal and "fail" states/internal interconnections implemented using conventional IO-MEMS 1×2 and 2×2 switch elements.
Figure 4:
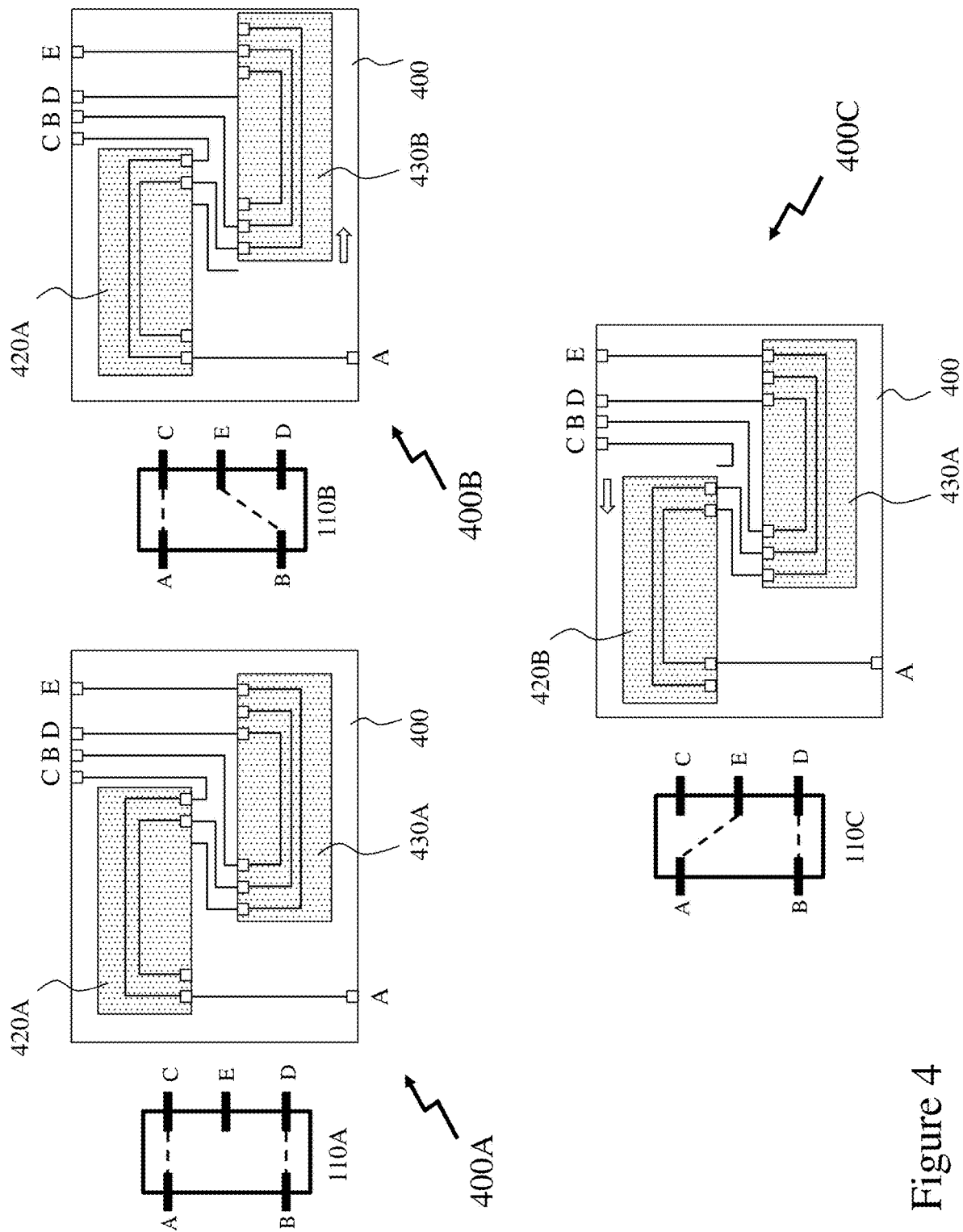
FIG. 4 depicts the internal implementation of a 2×3 optical switch exploiting IO-MEMS concepts according to an embodiment of the invention for dual fiber optical links exploiting 90-degree turning mirrors.

Accordingly, FIG. 4 depicts the internal implementation of a 2×3 optical switch "horseshoe" IO-MEMS (2×3 HS-IO-MEMS) circuit 400 for dual fiber optical link protection via a third optical fiber, wherein the 2×3 optical switch circuit 400 is composed of two IO-MEMS elements, a first IO-MEMS element 420A providing the 1×2 switch functionality, equivalent to 1×2 switch 214 in fourth to sixth images 200D to 200F respectively in FIG. 2, and a second IO-MEMS element 430B providing the required functionality of the crossbar switch, thus allowing the circuit 400 to replace the 2×2 switch 212 in fourth to sixth images 200D to 200F respectively in FIG. 2. Accordingly, these are depicted in first to third images 400A to 400C in FIG. 4 for the "normal" state 110A and the two protected states 110B and 110C respectively. In first image 400A the first and second IO-MEMS elements are depicted as first IO-MEMS 420A and second IO-MEMS 430A which represent the first and second IO-MEMS elements in non-actuated state. In second image 400B the first IO-MEMS element is still in its non-actuated state, depicted as first IO-MEMS 420A, whilst the second IO-MEMS element is in an actuated state, depicted as third IO-MEMS 430B. In third image 400C the first IO-MEMS element is now in its actuated state, depicted as fourth IO-MEMS 420B whilst second IO-MEMS element is in its non-actuated state 430A. Accordingly, as evident in first to third images 400A to 400C respectively there are no waveguide crossings within the 2×3 switch optical switch circuit 400 which arises from the limited active optical path configurations of the crossbar optical switches 430A and 420B.

Accordingly, within first to third images 400A to 400C of the 2×3 HS-IO-MEMS in the three switch configurations. First image 400A depicts the 2×3 HS-IO-MEMS in the normal configuration with ports A and B coupled to ports C and D respectively and Fiber 1/Fiber 2 active. Accordingly, the 2×3 HS-IO-MEMS comprises a substrate with a plurality of three-dimensional (3D) optical waveguides from ports denoted A, B, C, D, and E which are coupled to the first and second IO-MEMS elements which are themselves interconnected via appropriate waveguide routing while exploiting 3D optical waveguides. Within this embodiment the waveguides exploit 90 degree turning mirrors rather than waveguide bends, but such 3D waveguides could exploit waveguide bends. Further, such waveguides could be routed and/or implemented at any arbitrary angle at the interface between the fixed and suspended portions of the IO-MEMS as will be further explained later in FIG. 7. In second image 400B the first IO-MEMS element is maintained in the same configuration, but the second IO-MEMS element has been moved right one "stop" such that the second IO-MEMS element is coupled to a different subset of the plurality of 3D optical waveguides on the substrate such that the 2×3 HS-IO-MEMS provides the appropriate routing of port A to port C and port B to port E.

In third image 400C the first IO-MEMS element has now been moved left one "stop" but second IO-MEMS element 420A is in its original configuration as in first image 400A. Accordingly, the first IO-MEMS element is coupled to a different subset of the plurality of 3D optical waveguides on the substrate such that the 2×3 HS-IO-MEMS provides the appropriate routing of port A to port E and port B to port D. Accordingly, the 2×3 HS-IO-MEMS is configured solely based upon lateral motion of the first and second IO-MEMS elements.

Figure 5C:
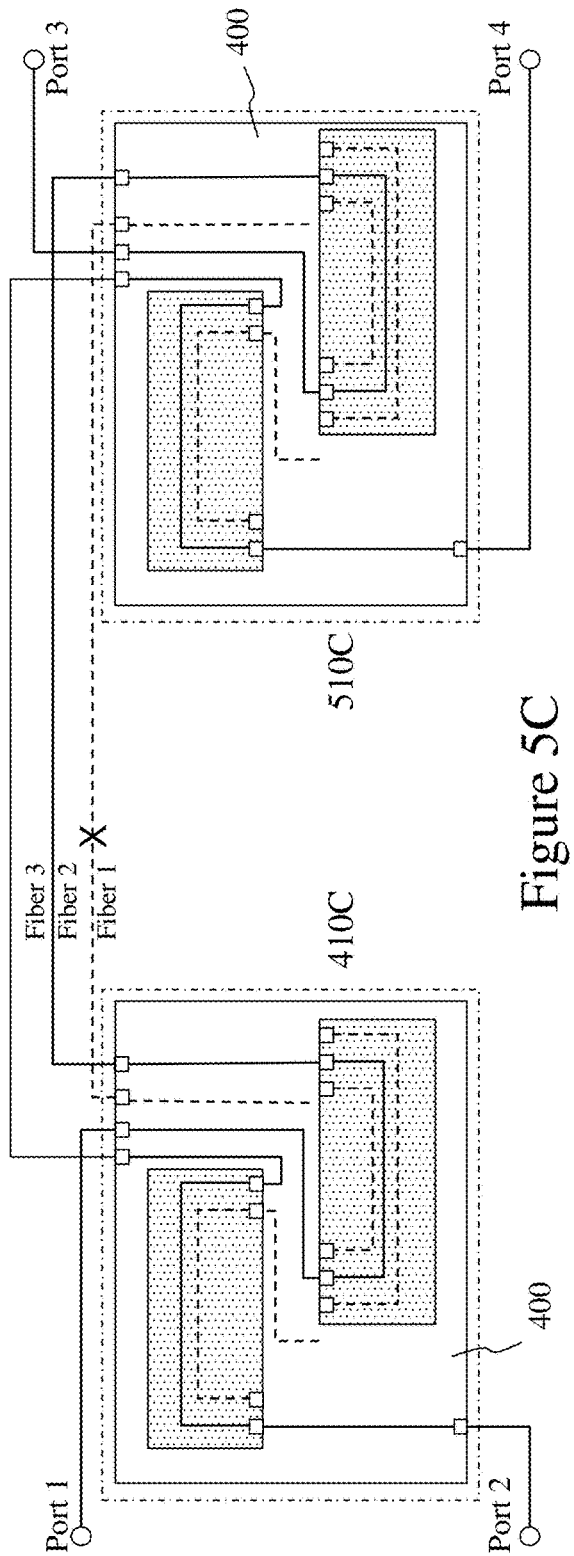

Now referring to FIGS. 5A to 5C respectively there are depicted the normal mode and the two "fail-over" protection modes for a dual fiber optical communications link protected by a third optical fiber, exploiting identical 2×3 HS-IO-MEMS 400 on both ends of the link sharing a common state in each mode of operation. Considering FIG. 5A for the normal operation of the link (state 410A for the left switch and state 510A for the right switch) each 2×3 HS-IO-MEMS is configured as depicted in first image 400A of FIG. 4, i.e. each IO-MEMS element is non-actuated. Accordingly, the optical signals from Ports 1 and 2 are routed to/from Ports 3 and 4 via Fiber 1 and Fiber 2.

In FIG. 5B a first fail-over mode is depicted wherein each 2×3 HS-IO-MEMS is configured as depicted in second image 400B of FIG. 4, i.e. the first IO-MEMS element has been actuated whilst the second IO-MEMS element is non-actuated. Accordingly, the optical signals from Ports 1 and 2 are routed to/from Ports 3 and 4 via Fiber 1 and Fiber 3 respectively. In FIG. 5C a second fail-over mode is depicted wherein each 2×3 HS-IO-MEMS is configured as depicted in second image 400C of FIG. 4, i.e. the first IO-MEMS element is non-actuated whilst the second IO-MEMS element is actuated. Accordingly, the optical signals from Ports 1 and 2 are routed to/from Ports 3 and 4 via Fiber 2 and Fiber 3 respectively.

Figure 6B:
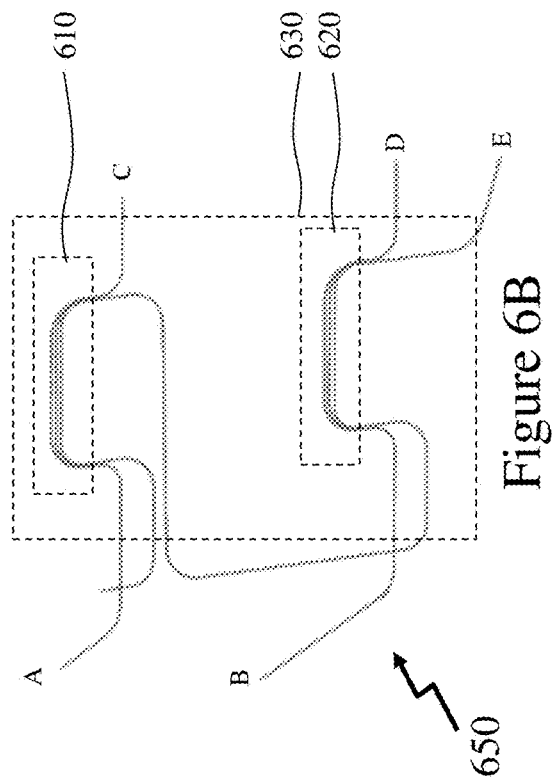
FIG. 6B depicts an exemplary configuration for connecting a first crossbar switching cell to a second crossbar switching cell such that unit cells can be within embodiments of the invention in an array of M×N instances to create larger switching matrices (arrays) exploiting waveguide bends rather than turning mirrors.
Figure 6A:
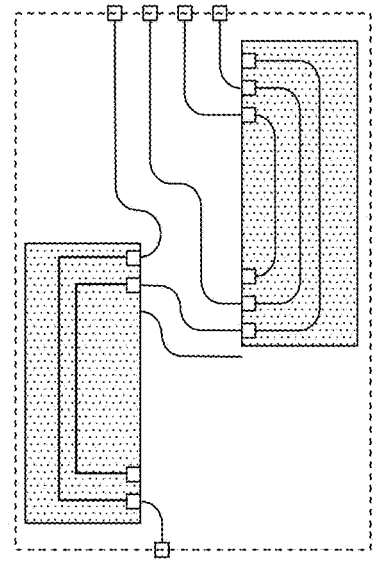
FIG. 6A depicts an exemplary alternate configuration for a 2×3 optical switch for dual fiber optical link protection implemented using a pair of IO-MEMS based "horseshoe" configuration optical switches according to an embodiment of the invention exploiting waveguide bends rather than turning mirrors.

Referring to FIGS. 6A and 6B there are depicted first and second alternate configurations 600 and 650 for a 2×3 HS-IO-MEMS optical switch according to an embodiment of the invention exploiting waveguide bends rather than turning mirrors. The exact design of the waveguide bends may vary in dependence upon factors such as geometrical constraints and waveguide index contrast. Waveguide index contrast of the 3D optical waveguides can vary from low contrast (low confinement), such as SiO2-Si3N4-SiO2, to higher contrast (higher confinement) stemming from use of a rectangular waveguide core or further through high index contrast materials selection such Si core with SiO2 cladding (typical of conventional silicon photonics platforms). As index contrast and confinement increased tighter lower radius bends can be employed within the 3D optical waveguides. Within first image 600 the IO-MEMS elements are configured in common with those depicted in FIGS. 4 and 5. However, in second image 650 the first and second IO-MEMS elements 610 and 620 are orientated vertically in the same orientation upon a substrate 610 and similarly exploit waveguide bends rather than turning mirrors such as depicted in FIG. 4. Finally, such waveguides could be routed implemented at any arbitrary angle at the interface between the fixed and suspended portions of the IO-MEMS as will be further explained later in FIG. 7.

Referring to FIG. 6B, there is depicted a waveguide routing arrangement between two instances of the HS-IO-MEMS enabling the routing of the optical switch in a manner which allows the duplication of this arrangement in a large M×N array enabling the use of the HS-IO-MEMS in a larger scale matrix optical switch may further conform to a path independent loss topology by placing waveguide crossings between HS-IO-MEMS instances.

Now referring to FIG. 7 there is depicted an exemplary die layout for a 1×4 optical switch exploiting a HS-IO-MEMS optical switch according to an embodiment of the invention. Accordingly, as the HS-IO-MEMS comprises:

Substrate 710;
Input waveguide 720;
Output waveguides 730;
  Shuttle 740, upon which the waveguide layout to connect the input waveguide to each output of the output waveguides 740 when it moves laterally and/or vertically, wherein the waveguides on the Shuttle 740 have been omitted for clarity and can be routed and/or implemented at any arbitrary angle to match the angles of the Input waveguides 720 and Output waveguides 730, enabling for instance the reduction of the waveguide bend on the shuttle 740;
Gap closer MEMS spring 750 to move the shuttle 740 away from the waveguides during reconfiguration and towards the waveguides after reconfiguration is complete, this being under electrostatic action from gap closer 780;
First and second lateral MEMS actuators 760A and 760B to move the shuttle laterally under electrostatic action; and
First and second stop actuators 770A and 770B which define the limit of lateral motion for the different configurations, under electrostatic action As depicted the 1×4 HS-IO-MEMS has a series of pads for application of the appropriate electrical voltages to provide the target electrostatic action, these being, in addition to ground (GND):

VDD directional displacement voltage;
GC gap closer voltage;
STO3 3 μm stopper actuation; and
STO6 6 μm stopper actuation.

Accordingly, if STO3 is applied the first and second stop actuators 770A and 770B allow a lateral motion of 3 μm from the initial displacement position of the shuttle 740 when VDD=0V. If STO6 is applied the first and second stop actuators 770A and 770B allow a lateral motion of 6 μm from the initial displacement position of the shuttle 740 when VDD=0V. If neither STO3 or STO6 are applied the first and second stop actuators 770A and 770B allow a lateral motion of 9 μm from the initial displacement position of the shuttle 740 when VDD=0V. The shuttle 740 motion being unidirectional to the left from its initial position.

Figure 7A:
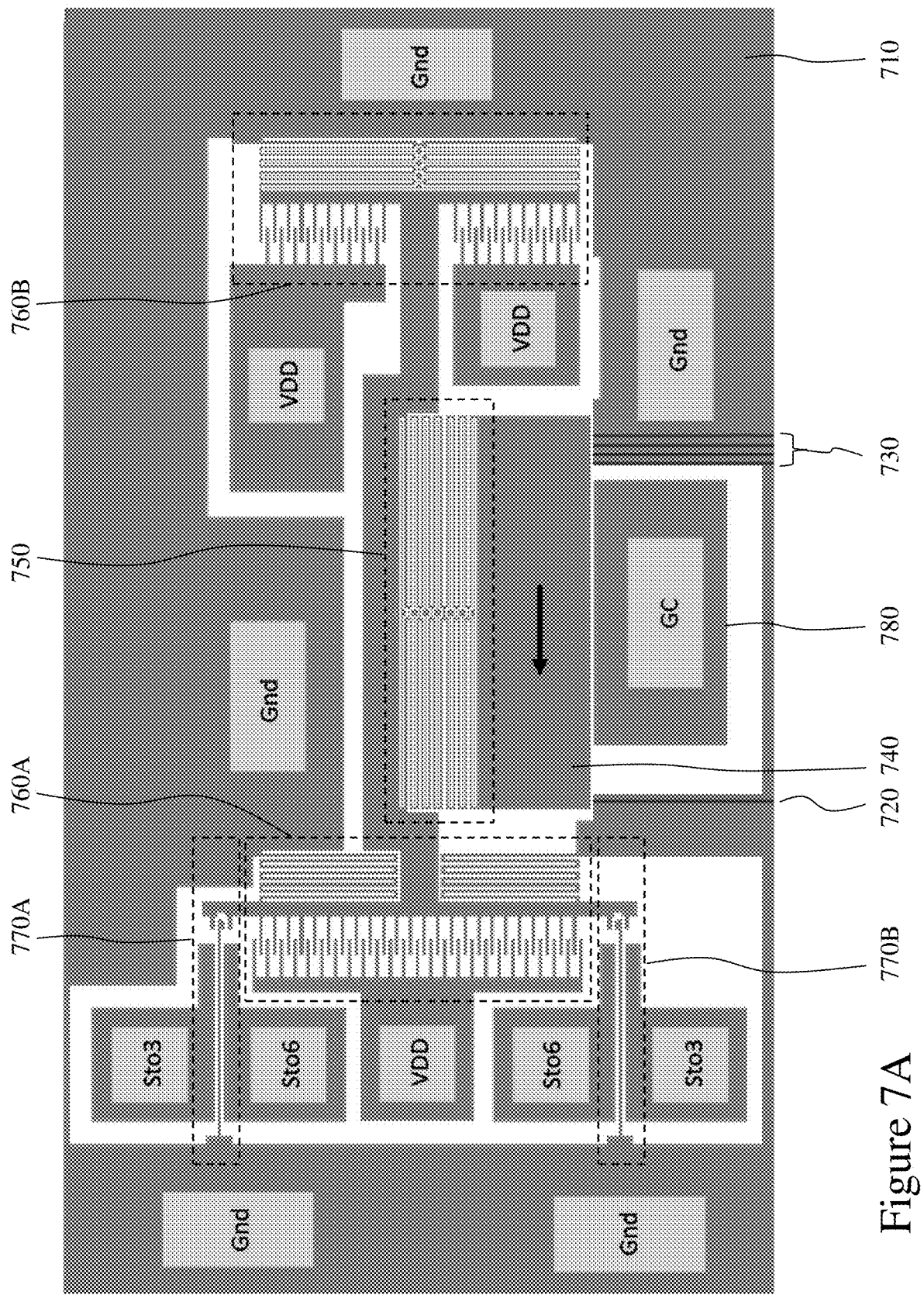
FIGS. 7A and 7B depict exemplary die layouts for a 1×4 optical switch exploiting the IO-MEMS based "horseshoe" configuration optical switch according to an embodiment of the invention where the waveguides on the suspended platform are omitted for clarity and which can exploit either 90-degree turning mirrors or waveguide bends.
Figure 7B:
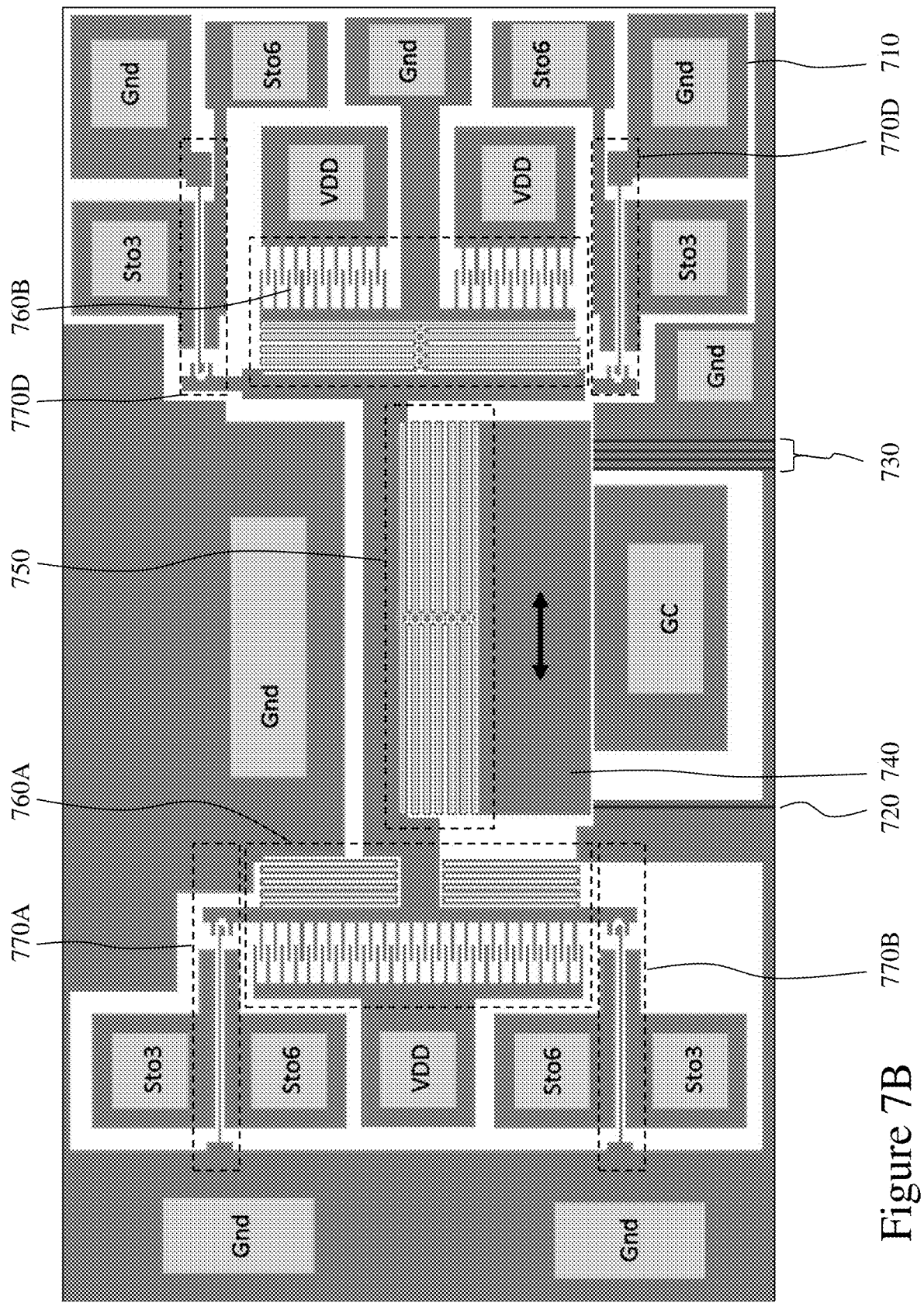

However, in FIG. 7B a variant 1×4 HS-IO-MEMS is depicted wherein bidirectional motion of the shuttle 740 is provided as the second lateral MEMS actuator 760B is "reversed" relative to the first lateral MEMS actuator 760A such that application of a VDD signal to the associated with second lateral MEMS actuator 760B rather than those associated with first lateral MEMS actuator 760A results in motion in the other direction. Also associated with the reversal of the second MEMS actuator 760B are third and fourth stop actuators 770C and 770D respectively which provide stops for motion of the shuttle in the other direction at the same motion limits (although different motion limits may be established for left and right motion if appropriate.

Figure 8:
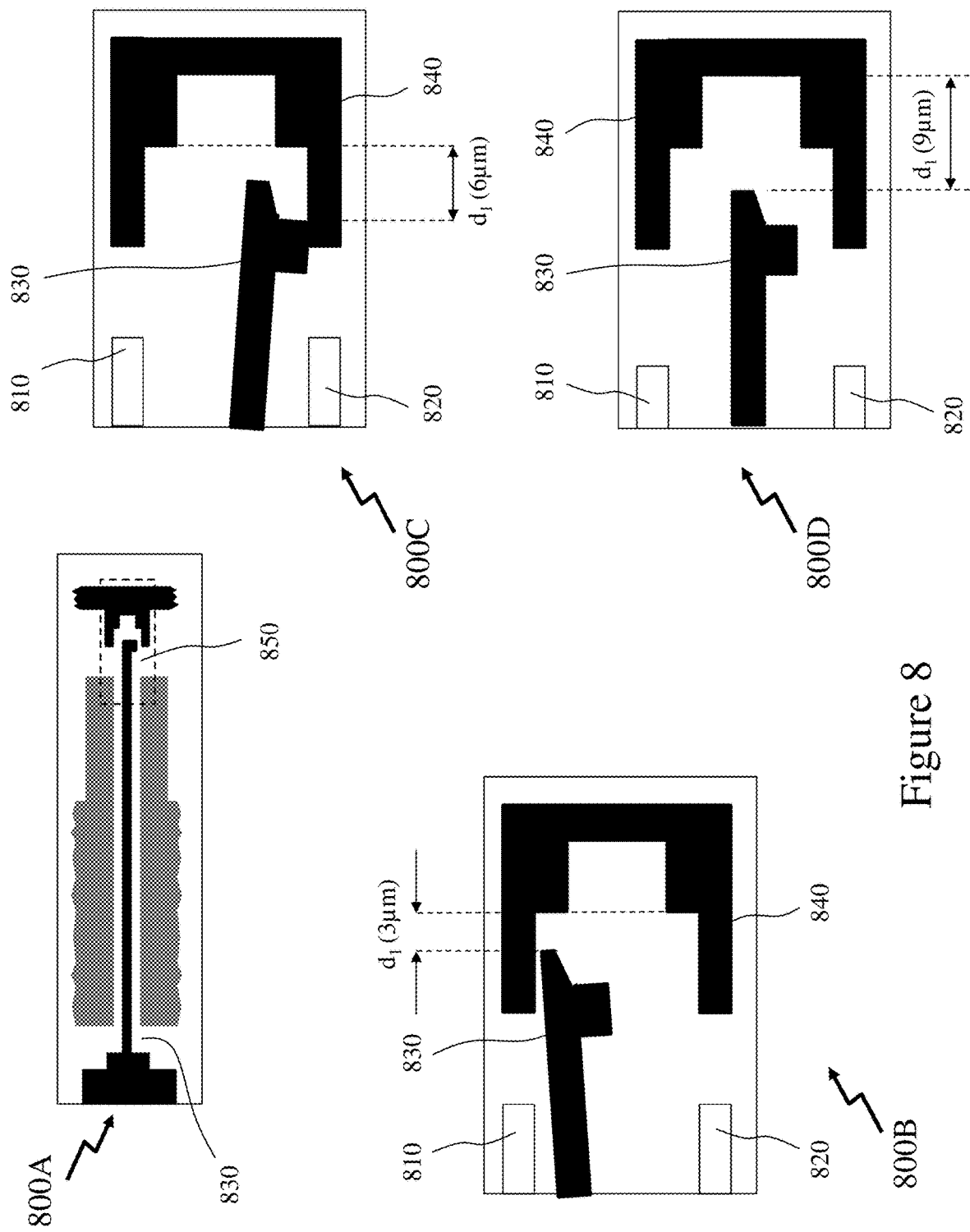
FIG. 8 depicts an exemplary design for a programmable switch state stopper for a MEMS based optical switch exploiting the "horseshoe" configuration according to an embodiment of the invention.

Referring to FIG. 8 there is depicted an exemplary design for a programmable switch state stopper for a MEMS based device such as first and second stop actuators 770 and 770B respectively in FIG. 7A and first to fourth stop actuators 770A to 770D respectively in FIG. 7B. First image 800A depicts the stop actuator with its tip 850 and beam 830. Second to fourth images 800B to 800D respectively depict the stop actuator when actuated for 3 μm and 6 μm motion and unactuated for 9 μm using the configuration described and depicted within FIGS. 7A and 7B respectively. In each there are depicted first and second side electrodes 810 and 820 which are depicted in first image 800A running along the length of the beam 830, beam 830 with shaped tip, and stop contact 840 which as depicted in FIGS. 7A and 7B is connected to ground. First side electrode 810 being coupled to STO3 such that when the actuation voltage is applied to the STO3 pad the beam 830 is attracted electrostatically to the first side electrode 810. Second side electrode 820 being coupled to STO6 such that when the actuation voltage is applied to the STO6 pad the beam 830 is attracted electrostatically to the second side electrode 820. When no voltage is applied to either first side electrode 810 and second side electrode 820 then the beam is in the middle not attracted to either.

Accordingly, depending upon whether the beam is in the middle or attracted up/down then a different portion of the beam 830 at its tip will contact the stop contact 840 as the shuttle 740 is moved laterally. Whilst discrete electrostatic actuation with two electrodes is depicted in FIGS. 7A to 8 respectively it would be evident that within other embodiments of the invention that the number of stops may be increased by increasing the number of steps in the stop actuator tip and/or stop contact in conjunction with multiple actuator voltages or that multiple actuators may be employed each offering, for example a first stop with actuation of the upper electrode, a second stop with actuation of the lower electrode and unrestricted motion with neither actuated. Alternatively, multiple stop actuator along a single common beam mean be employed which are individually actuated. Optionally, rather than discrete "on/off" actuators such as those depicted in FIGS. 7A to 8 a tunable actuator, e.g. an electrostatic linear comb drive for example, may be employed wherein tolerance on the voltage to the comb drive for each stop is provided through the overlap between the actuator elements. For example, considering second image 800B in FIG. 8 then once a predetermined voltage is exceeded the beam 830 engages the stop contact 840 and increasing the voltage whilst further pulling the beam 830 does not adjust the action of the stop actuator.

Within the embodiments of the invention described and depicted in respect of FIGS. 4 to 8 the optical waveguides are non-overlapping and each couple a first port of a plurality of ports on one side of the shuttle to a second port of the plurality of ports on the same side of the shuttle. However, within other embodiments of the invention the optical waveguides in order to provide the required optical functionality may overlap (i.e. cross one another) or they may route to the other side of the shuttle distal to the side they originate on (or vice-versa terminate on). Accordingly, different programmable optical interconnects may be implemented. It would be further evident that whilst the embodiments of the invention described and depicted in respect of FIGS. 4 to 8 exploit a pair of shuttles that other designs, such as a simple optical 1×N switch may exploit a single shuttle whilst others may exploit 3, 4, or more with different interconnections (mappings) between the multiple shuttles.

Figure 9C:
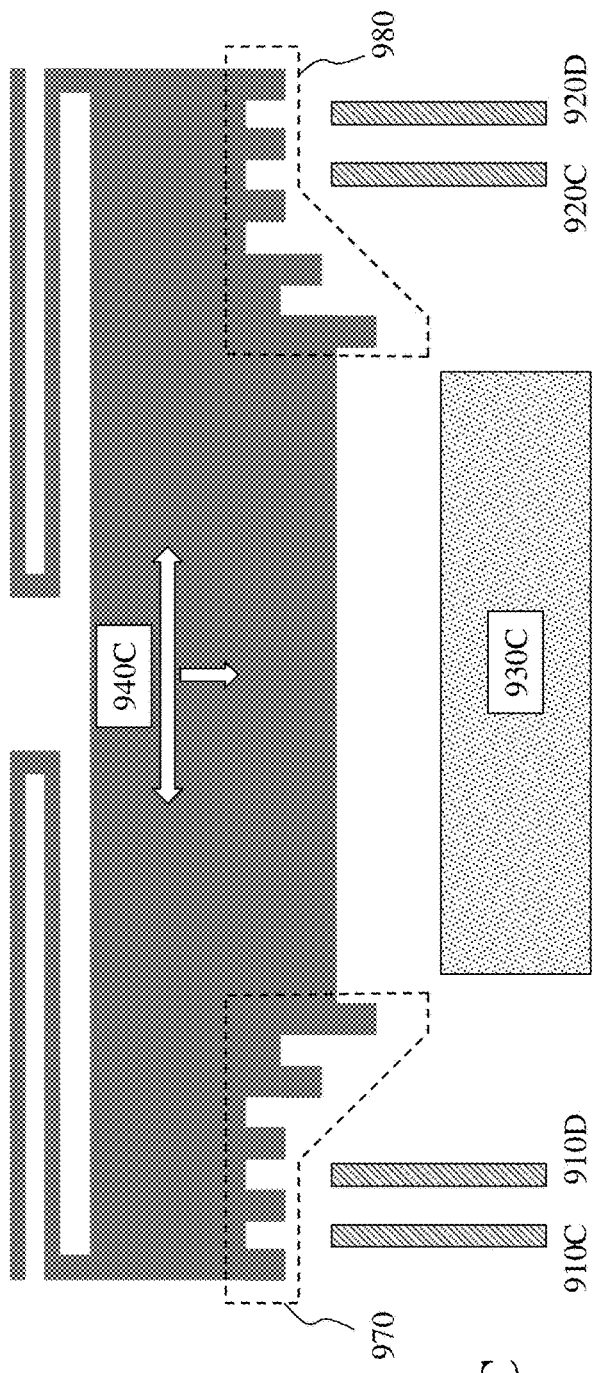

FIGS. 7A to 8 describe and depict stops for lateral motion of the shuttle 740 during its movement. Now referring to FIGS. 9A to 9C there are depicted exemplary designs for stoppers for defining the gap under closure of the gap closers within MEMS based optical switches according to an embodiment of the invention. FIG. 9A depicts the configuration shown in FIGS. 7A and 7B wherein the shuttle under action of the gap closer 780 moves either towards the gap closer 780 when electrostatic attraction exists or is pulled back under action of the gap closer MEMS spring 750. Accordingly, the waveguides are formed onto the stoppers at either side, Stopper 1 910 and Stopper 2 920 whilst the Shuttle 940A is moved towards these under electrostatic attraction arising from the Gap Closer 930A. In order that the Stopper 1 910 and Stopper 2 920 define the limit of the Shuttle 940A under action of the Gap Closer 930A the Gap Closer 930A is "recessed" away such that it cannot contact the Shuttle 940A.

Alternatively, in FIG. 9B an alternate design is employed wherein first and second pairs of stoppers 910A/910B and 920A/920B are depicted and engage against stops 950 upon the shuttle 940B with the Gap Closer 930B recessed again. Whilst the first and second pairs of stoppers 910A/910B and 920A/920B and stops 950 are depicted as square in FIG. 9B it would be evident that within other embodiments of the invention the designs for these may vary to include other geometries. Optionally, within another embodiment of the invention the stops and stoppers may be tapered such that the shuttle 940B is aligned to the stops in a form of "self-aligning" so that as the gap closer closes the gap the shuttle 940B engages the stoppers and "aligns" via the stops 950. Optionally, within other embodiments of the invention the stoppers may be movable rather than fixed using actuators such as, for example, parallel plate actuators, comb drive actuators etc. Optionally, multiple stoppers may be moved together or independently from one another. As the stoppers will, typically, have the optical waveguides upon them to butt couple to optical waveguides upon the shuttle 940B then within other embodiments of the invention the stoppers may be movable, and the shuttle fixed, or both the stoppers and the shuttle may be movable.

Within FIG. 9C an alternate design is depicted wherein first and second pairs of stoppers 910C/910D and 920C/920D are depicted together with first and second stops 970 and 980 which now are at varying offsets from the gap closer 930C. Accordingly, the stops define different stop positions for the shuttle 940C when it moves laterally with respect to the stops. Whilst the stops are depicted parallel to the stoppers in FIG. 9C within other embodiments of the invention one or more of the stoppers may be orientated at an angle relative to the motion of the shuttle 940C with laterally under action of the first and second lateral MEMS actuators 760A and 760B respectively or relative to the motion of the shuttle 940C under the action of the gap closer 930B. Optionally, within another embodiment of the invention the stops and stoppers may be tapered such that the shuttle 940C is aligned to the stops in a form of "self-aligning" so that as the gap closer closes the gap the shuttle 940C engages the stoppers and "aligns" via the stops 970. Optionally, within other embodiments of the invention the stoppers may be movable rather than fixed using actuators such as, for example, parallel plate actuators, comb drive actuators etc. Optionally, multiple stoppers may be moved together or independently from one another. As the stoppers will, typically, have the optical waveguides upon them to butt couple to optical waveguides upon the shuttle 940B then within other embodiments of the invention the stoppers may be movable, and the shuttle fixed, or both the stoppers and the shuttle may be movable.

Within the embodiments of the invention described and depicted with respect to FIGS. 4A to 9C the 3D optical waveguides on the fixed portion of the IO-MEMS "butt-couple" to the 3D optical waveguides on the moving portion of the IO-MEMS. Butt-coupling being where the two optical waveguides "butt" against each other although the term is also used to refer to optical coupling between two optical waveguides with a small gap between them. Within embodiments of the invention the stoppers may define a predetermined gap or no gap to be between the 3D optical waveguides when the gap closer brings the moving portion of the IO-MEMS to the fixed portion of the IO-MEMS. Optionally, the 3D optical waveguides may exploit optical tapers or multi-mode interferometers (MMIs) to expand the optical mode size at the interfaces thereby improving coupling tolerances and/or reducing coupling losses. Optionally, the waveguides may exploit micro-lenses fused onto or formed from the end faces of the 3D optical waveguides through a process such as a laser-based process, for example.

Figure 10:
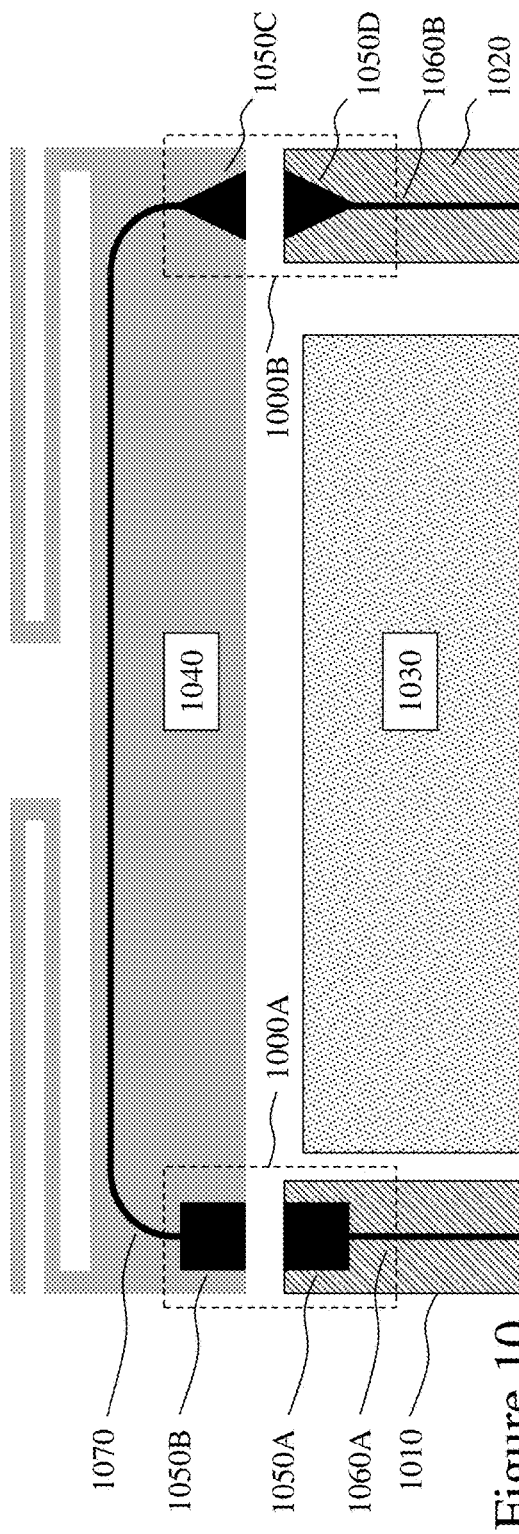
FIG. 10 depicts an optical coupling between MEMS sections of MEMS optical switches according to embodiments of the invention exploiting waveguide inverse tapers and/or and multimode interference couplers for mode size adaptation at the IO-MEMS interfaces.

Referring to FIG. 10 there are depicted exemplary optical interfaces between a static portion of an IO-MEMS circuit and the moveable MEMS element forming part of the IO-MEMS circuit. As depicted a movable MEMS element 1040 has a 3D optical waveguide 1070 disposed upon it which is coupled to first and second optical waveguides 1060A and 1060B respectively upon first and second static elements 1010 and 1020 of the IO-MEMS circuit. First optical interface 1000A couples the first optical waveguide 1060A upon first static element 1010 to the 3D optical waveguide 1070 via an MMI coupler comprising first and second portions 1050A and 1050B wherein when these abut each other under action of the MEMS actuator closing the gap between the first and second static elements 1010 and 1020 with movable MEMS element 1040 they form the MMI such that optical signals are coupled to/from the 3D optical waveguide 1070 from/to the optical waveguide 1060A. In contrast in second optical interface 1000B the second optical waveguide 1060B is coupled to the 3D optical waveguide 1070 via first and second optical waveguide tapers 1050C and 1050D respectively.

Within the embodiments of the invention described and depicted in respect of FIGS. 4A to 10 IO-MEMS devices supporting reconfiguration of the optical connectivity have been described exploiting fixed portions and a movable portion wherein the movable portion has 3D optical waveguides upon it such that the motion of the movable portion relative to the fixed positions results in the connectivity changes. However, within other embodiments of the invention the moving portion of the IO-MEMS is a flexible waveguide which moves from a first position to a second position such that it couples to different 3D optical waveguides upon another fixed portion of the IO-MEMS. An exemplary embodiment of the invention is described and depicted in FIGS. 11A and 11B with respect to a 2×2 IO-MEMS switch.

Figure 11A:
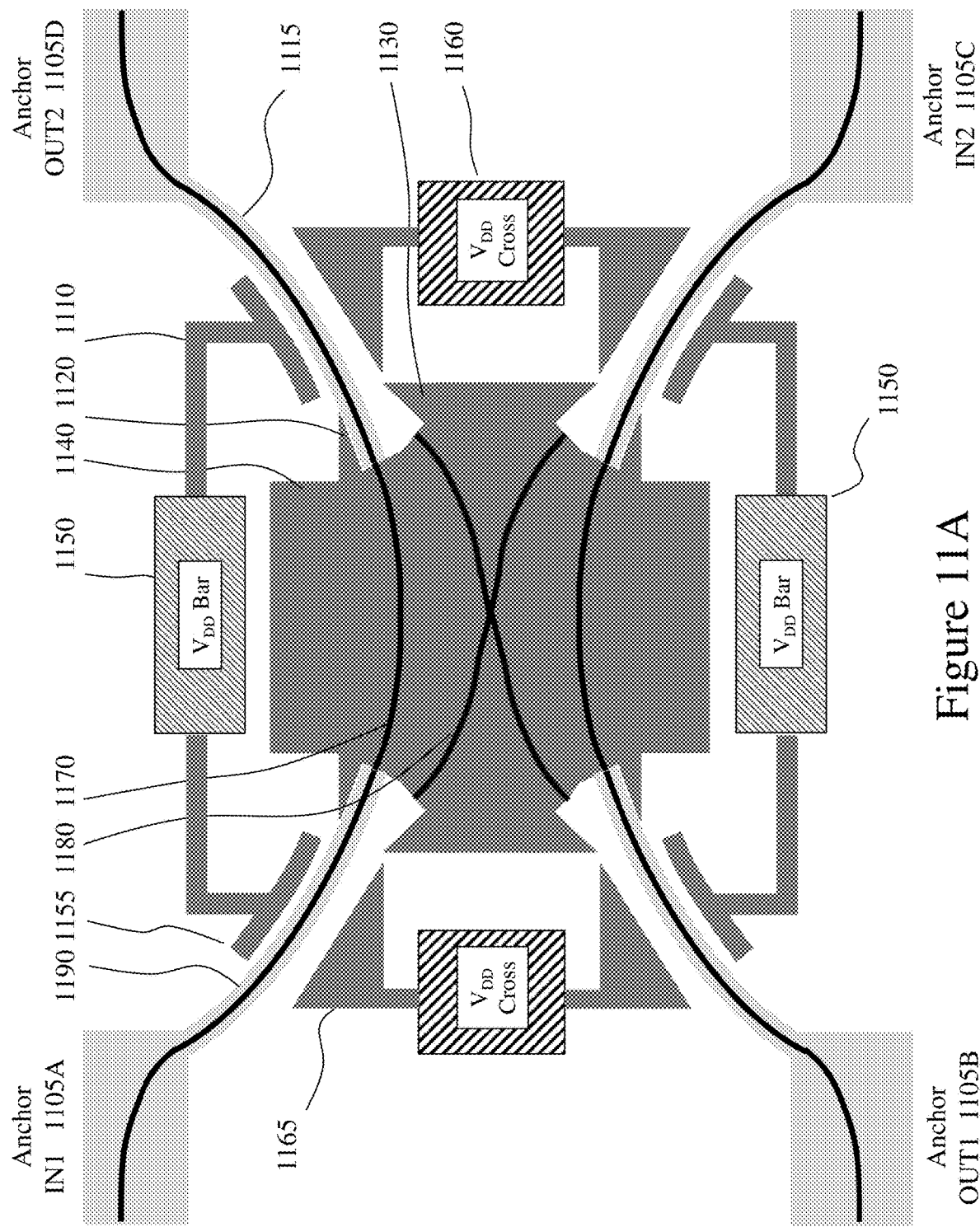
FIG. 11A depicts a bar state configuration for a 2×2 MEMS optical switch according to an embodiment of the invention.
Figure 11B:
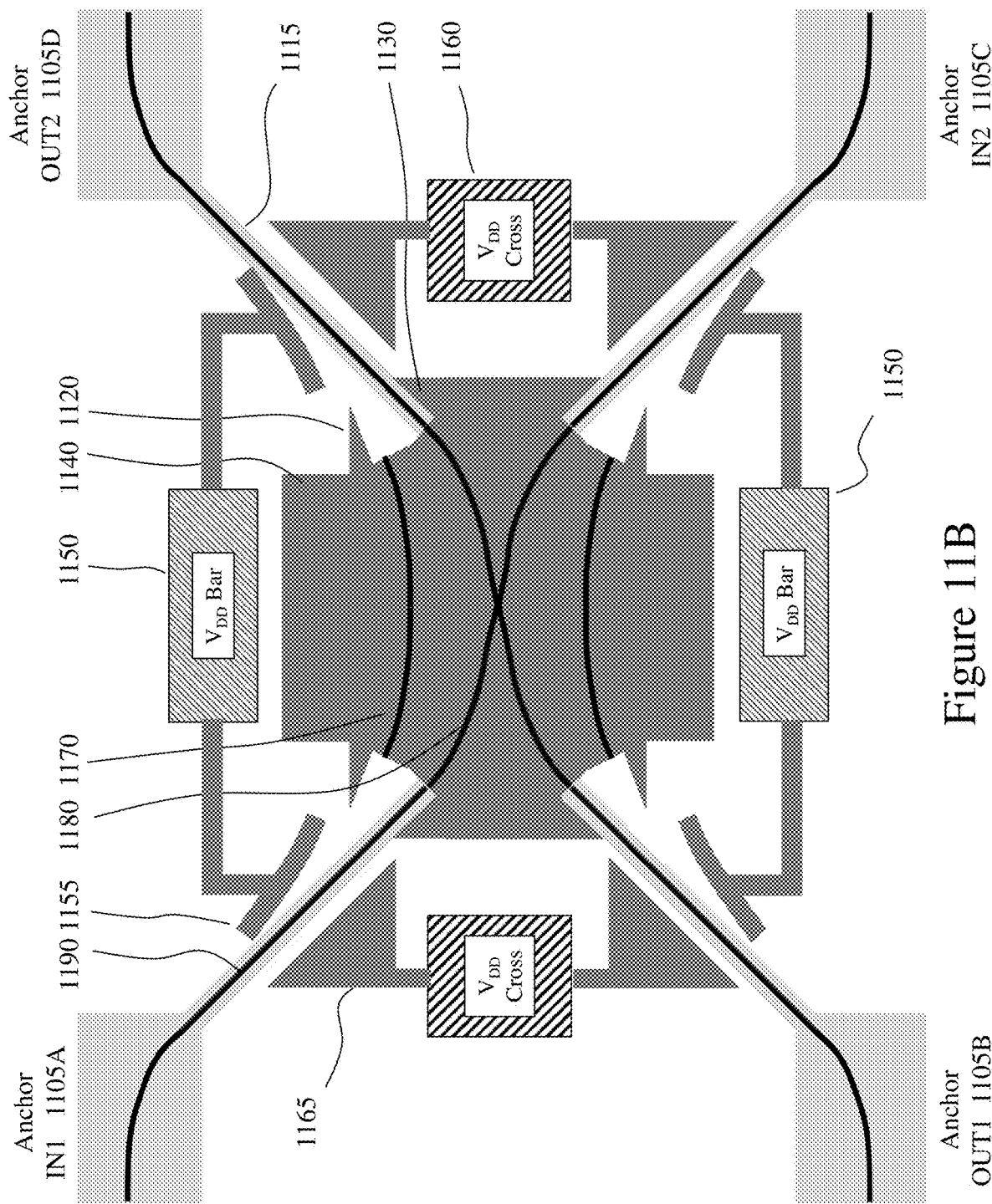
FIG. 11B depicts a cross state configuration for a 2×2 MEMS optical switch according to an embodiment of the invention.

Accordingly, referring to FIG. 11A there is depicted a 2×2 IO-MEMS switch according to an embodiment of the invention in a bar state exploiting what the inventors refer to as Thin Beam Unsupported Waveguide (THAW) IO-MEMS actuators. Accordingly, are depicted four anchors, IN1 1105A, OUT1 1105B, IN2 1105C, and OUT2 1105D. Each of these extends with a MEMS beam 1115 which is coupled to a MEMS actuator 1110 and supports a 3D optical waveguide 1190. Disposed centrally to the four anchors is a fixed portion 1140 of the IO-MEMS comprising a pair of bar waveguides 1170 and a pair of cross waveguides 1180. At each corner of the fixed portion 1140 of the IO-MEMS are first and second stops 1120 and 1130 together with bar electrode 1155 and cross electrode 1165. The bar electrodes 1155 are connected to the electrode pads VDD Bar 1150 and the cross electrodes 1165 are connected to the electrode pads VDD Cross 1160. As depicted in FIG. 11A drive voltages are applied to electrode pads VDD Bar 1150 such that the MEMS beams 1115 are electrostatically attracted to the bar electrodes 1155 and against first stops 1120 such that the 3D optical waveguides 1190 are coupled to the bar waveguides 1170. In FIG. 11B the drive voltages are applied to the electrode pads VDD Cross 1160 such that the MEMS beams 1115 are electrostatically attracted to the cross electrodes 1165 and against second stops 1130 such that the 3D optical waveguides 1190 are coupled to the cross waveguides 1180.

Alternatively, FIG. 11C depicts actuator configurations for a 2×2 IO-MEMS optical switch according to an embodiment of the invention with "blocked" power fail state (or default MEMS state) and driven "cross" and "bar" states. In this configuration the initial or non-actuated position for the THAW IO-MEMS actuators with a 3D optical waveguide. Accordingly, first to third images 1100C to 1100E depict a MEMS beam 11100 with optical waveguide, first electrode 11200 and second electrode 11300. In first image 1100C no voltage is applied to either the first electrode 11200 or the second electrode 11200 such that the MEMS beam 11100 is not deformed. In second image 1100D the drive voltage is applied to the second electrode 11300 such that the MEMS beam 11100 is deformed by electrostatic attraction to the second electrode 11300. In third image 1100E the drive voltage is applied to the first electrode 11200 such that the MEMS beam 11100 is deformed by electrostatic attraction to the first electrode 11200. Accordingly, where this actuation scheme is employed with a 2×2 IO-MEMS the first image 1100C represents no optical coupling between the optical waveguide on the MEMS beam 11100 to any waveguides of the IO-MEMS. In contrast in second and third images 1100D and 1100E the optical waveguide on the MEMS beam 11100 to waveguides of the IO-MEMS, such as bar waveguides 1170 and cross waveguides 1180 as depicted in FIGS. 11A and 11B respectively.

It would be evident that within other embodiments of the invention that the initial THAW IO-MEMS actuator position and hence that also the power fail state may be in a defined switch state or coupling condition for the THAW IO-MEMS actuator. Considering FIGS. 11A and 11B then the cross state condition of the switch may be established if the THAW IO-MEMS actuator is aligned to the cross waveguide 1180 without any applied voltage, e.g. VDD Cross=0V. Accordingly, the switch only requires activation for implementing the bar state. Alternatively, the THAW IO-MEMS actuator may be initially fabricated to align with the bar waveguide 1170 such that activation is only required for the cross state. It would be evident that in other embodiments of the invention different configurations of THAW IO-MEMS actuator may be employed such that, for example, the THAW IO-MEMS actuators associated with IN1 1105A and IN2 1105C are aligned in one position with respect to bar and cross waveguides 1170 and 1180 respectively whilst the OUT1 1105B and OUT2 1105D THAW IO-MEMS actuators are aligned to a different position.

It would be evident that different optical devices may be implemented using the THAW IO-MEMS actuators in conjunction with or without mechanical stops. Optical devices may also exploit different numbers and combinations of THAW IO-MEMS actuators. Further THAW IO-MEMS actuators within the same optical device may provide different "functions" in combination with the optical waveguides to which they couple such as attenuator, on-off switch, and route selector with 2, 3, 4 or more routes for example. Whilst electrostatic actuation for low complexity THAW IO-MEMS actuators has been described and depicted it would be evident that other actuation means may be employed for the THAW IO-MEMS actuators such as thermal actuation, rotational electrostatic comb drive and rotational electrostatic comb drive, and circular electrostatic comb drive for example.

Figure 12A:
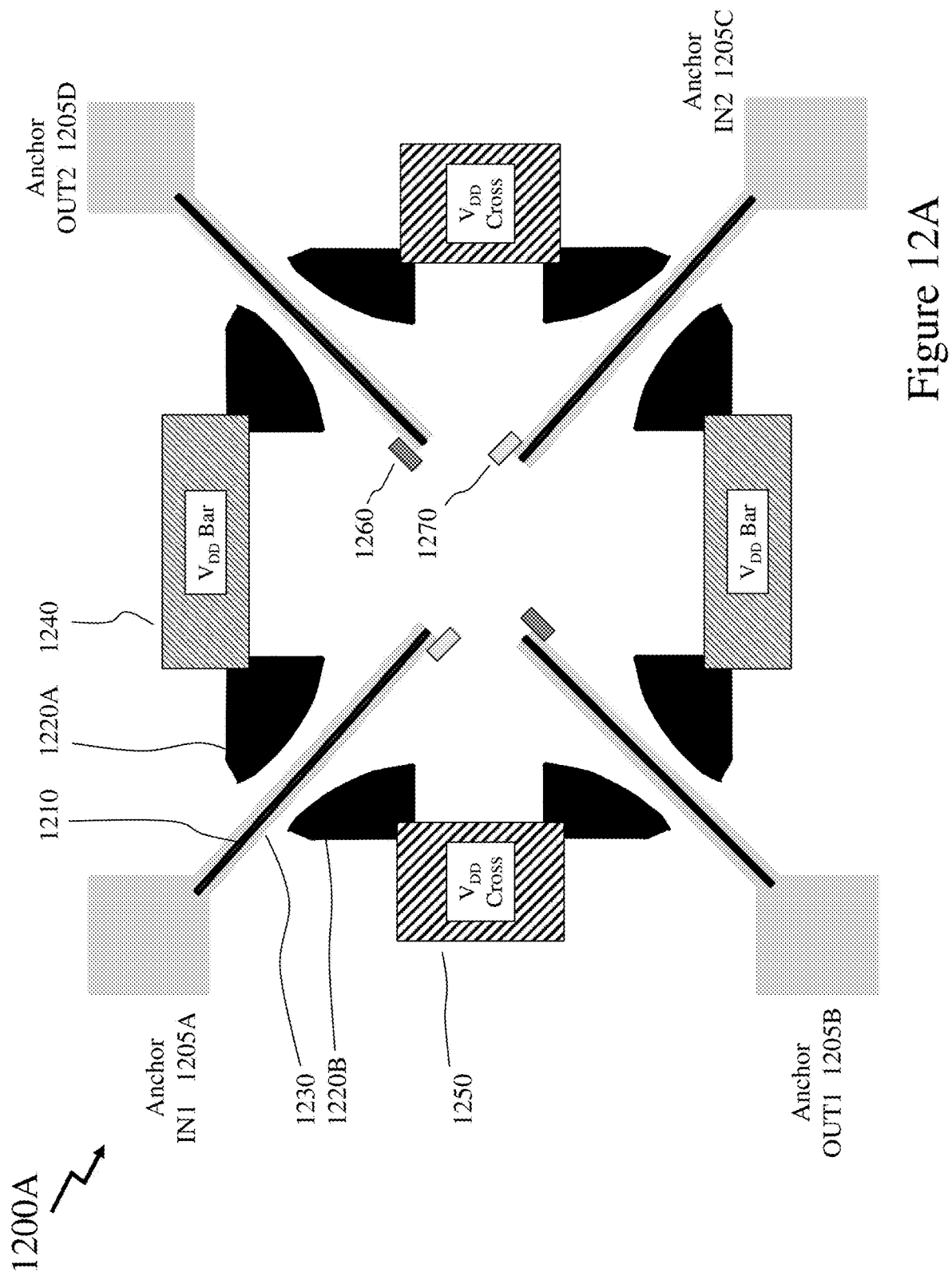
FIG. 12A depicts an unpowered, non-deformed, configuration for a 2×2 MEMS optical switch with direct deformable arm positioning according to an embodiment of the invention.
Figure 12B:
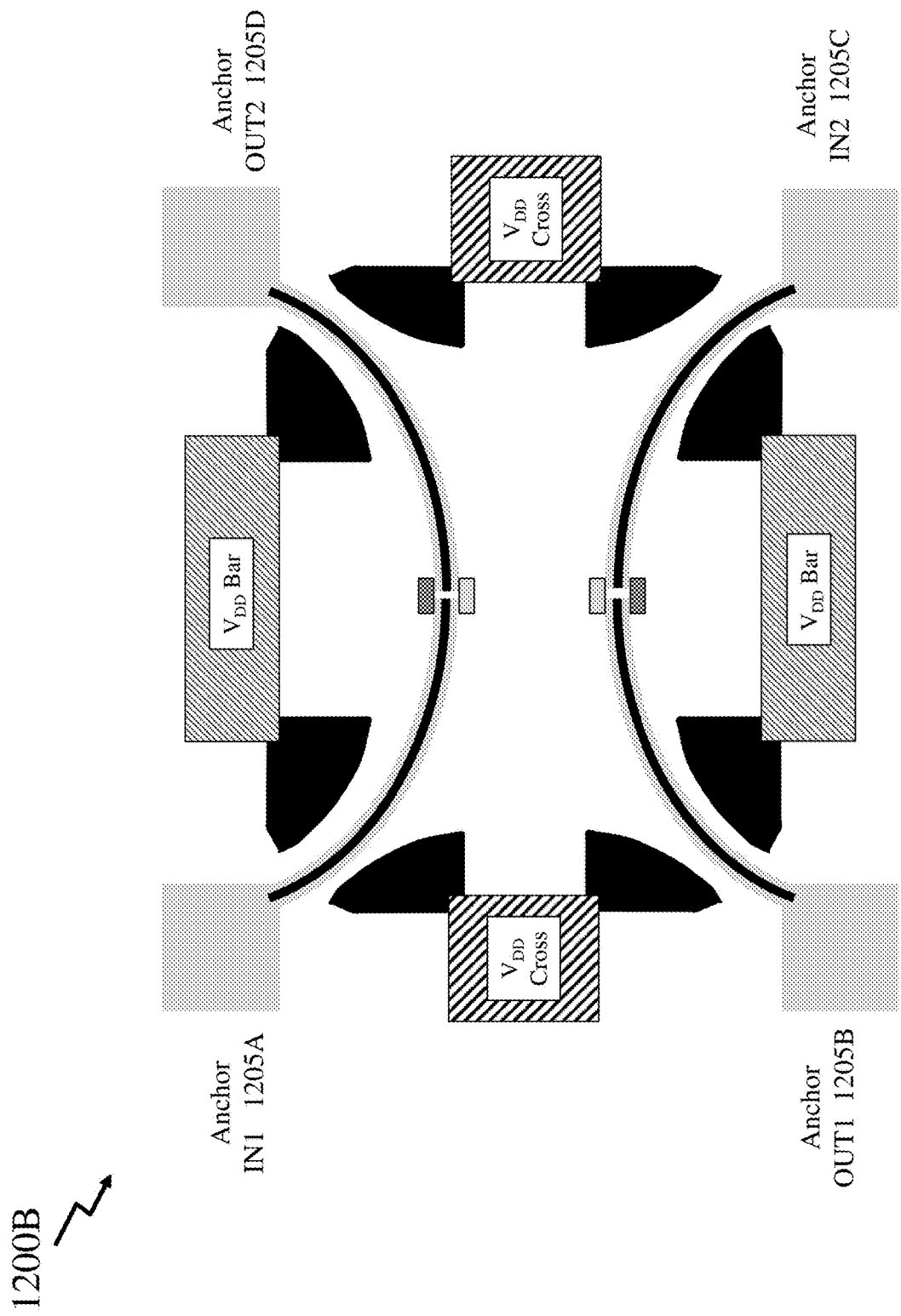
FIG. 12B depicts a powered bar state configuration for a 2×2 MEMS optical switch with direct deformable arm positioning according to an embodiment of the invention.
Figure 12C:
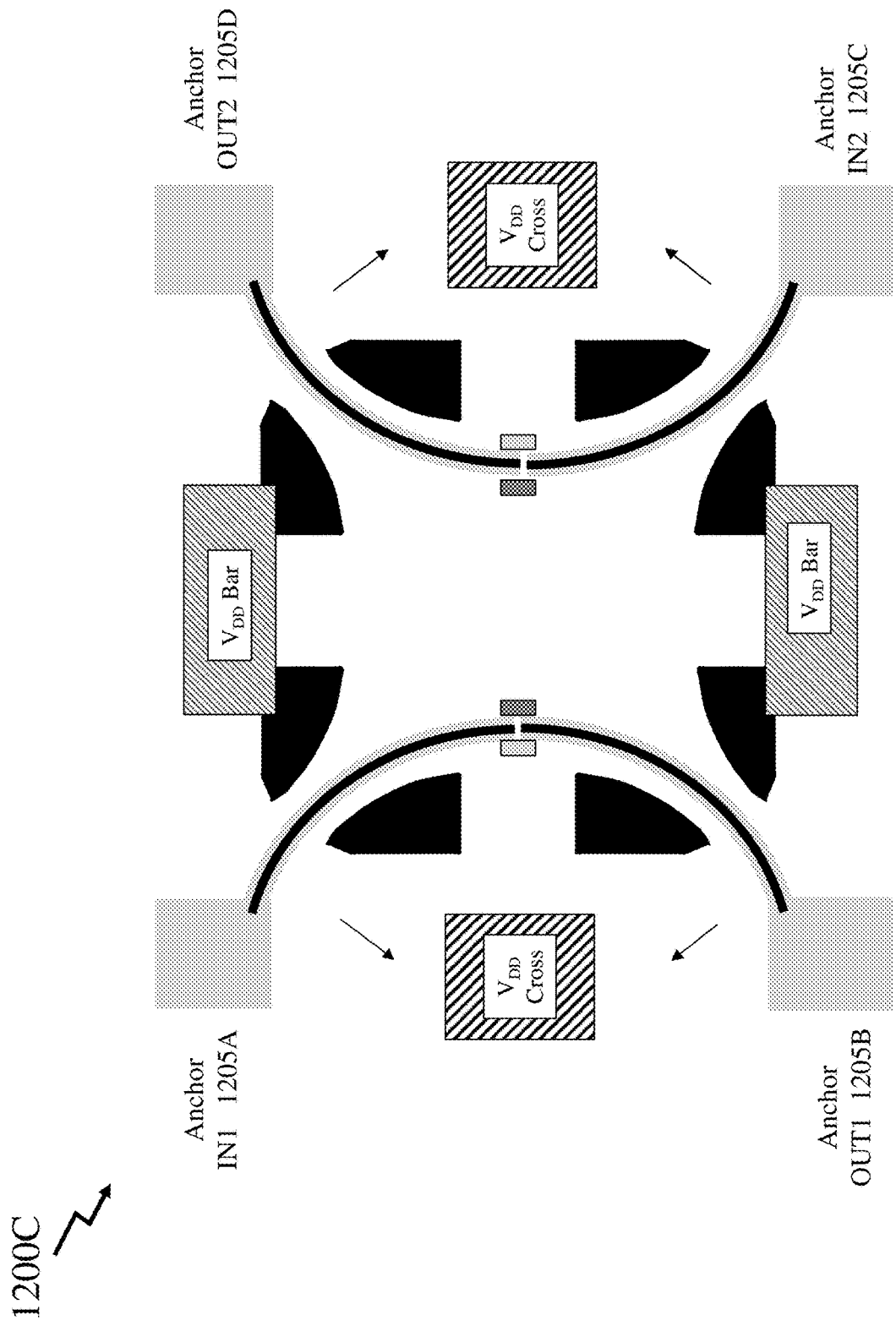
FIG. 12C depicts a powered cross state configuration for a 2×2 MEMS optical switch with direct deformable arm positioning according to an embodiment of the invention.

Now referring to FIG. 12A there is depict an unpowered, non-deformed, configuration for a 2×2 MEMS optical switch exploiting THAW IO-MEMS actuators with direct deformable arm positioning according to an embodiment of the invention without intermediate 3D optical waveguides that are fixed. Accordingly, are depicted four anchors, IN1 1205A, OUT1 1205B, IN2 1205C, and OUT2 1205D. Each of these extends with a MEMS beam 1230 which is coupled to a MEMS actuator 1220 and supports a 3D optical waveguide 1210. At the ends of each beam 1230 coupled to the IN1 1205A and IN2 1205C anchors there is a first stop 1260 disposed whilst at the ends of each beam 1230 coupled to the OUT1 1205B and OUT2 1205D anchors there is disposed a second stop 1270. Disposed to either side of each MEMS beam 1230 are bar electrode 1220A and cross electrode 1220B which are coupled to bar electrode pads 1240 and cross electrode pads 1250 respectively. Accordingly, as depicted in FIG. 12B the appropriate drive voltage, VDD Bar, is applied to the bar electrode pads 1240 wherein the MEMS beam 1230 is electrostatically attracted to the bar electrode 1220A in each instance. As the MEMS beams 1230 flex then the tips orientate with respect to each other through the first stop 1260 and second stop 1270. Similarly, in FIG. 12C the appropriate drive voltage, VDD Cross, is applied to the bar electrode pads 1250 wherein the MEMS beam 1230 is electrostatically attracted to the cross electrode 1220B in each instance. As the MEMS beams 1230 flex then the tips orientate with respect to each other through the first stop 1260 and second stop 1270.

Optionally, within other embodiments of the invention the MEMS beams 1230 may be electrostatically charged rather than the bar electrodes 1220A or cross electrodes 1220B. Alternatively, the bar electrodes 1220A and cross electrodes 1220B may be oppositely charged relative to the MEMS beam 1230 to attract or similarly charged to repulse. Optionally, within other embodiments of the invention the MEMS arms 1230 may be directly, i.e. physically, moved through an actuator directly rather than indirectly moved via an attraction/repulsion mechanism. Such direct actuation may, for example, exploit one or more parallel plate MEMS actuators, one or more MEMS comb drive actuators, one or more MEMS circular comb drive actuators, etc.

Amongst the challenges of packaging optoelectronic circuits, photonic circuits, integrated optical circuits, IO-MEMS, etc., referred to generally as photonic integrated circuits (PICs), is the positioning of the optical fiber(s) being coupled to the PIC. This is problematic even with a single optical fiber (fiber) but even more complex where multiple optical fibers (fibers) are to be connected to the PIC, especially on the same side of the PIC die as generally optical fibers require a pitch (spacing) at the die edge that is larger than the pitch of the 3D optical waveguides on the PIC die. Within the prior art to remove handling issues of multiple fibers ribbon optical fibers were developed to provide, for example, 4, 6, 8, or 12 fibers within a single ribbon. Whilst this improves handling of multiple fibers the preparation of the fibers for optical coupling to the PIC raises an additional issue in that in order to provide the multiple fibers with a common end plane for mating to the PIC the ribbon is typically assembled into another assembly and the end polished, such as employed in ribbon fiber connectors. However, amongst the techniques for aligning optical fibers to a PIC is the use of U-shaped grooves (U-grooves) or V-shaped grooves (V-groove) formed into a substrate, this substrate may be the PIC substrate itself within or upon which the PIC is formed upon or it may be another substrate to which substrate the PIC is formed upon is attached to. However, these preclude the use of polished fiber assemblies unless the fibers can be polished and project beyond the end of the assembly they are assembled within. However, cleaving (providing a high-quality end face through inducing a crack in the optical fiber which is then propagated through the fiber) a ribbon fiber results in a variation in the end positions of each fiber within the ribbon.

Figure 13A:
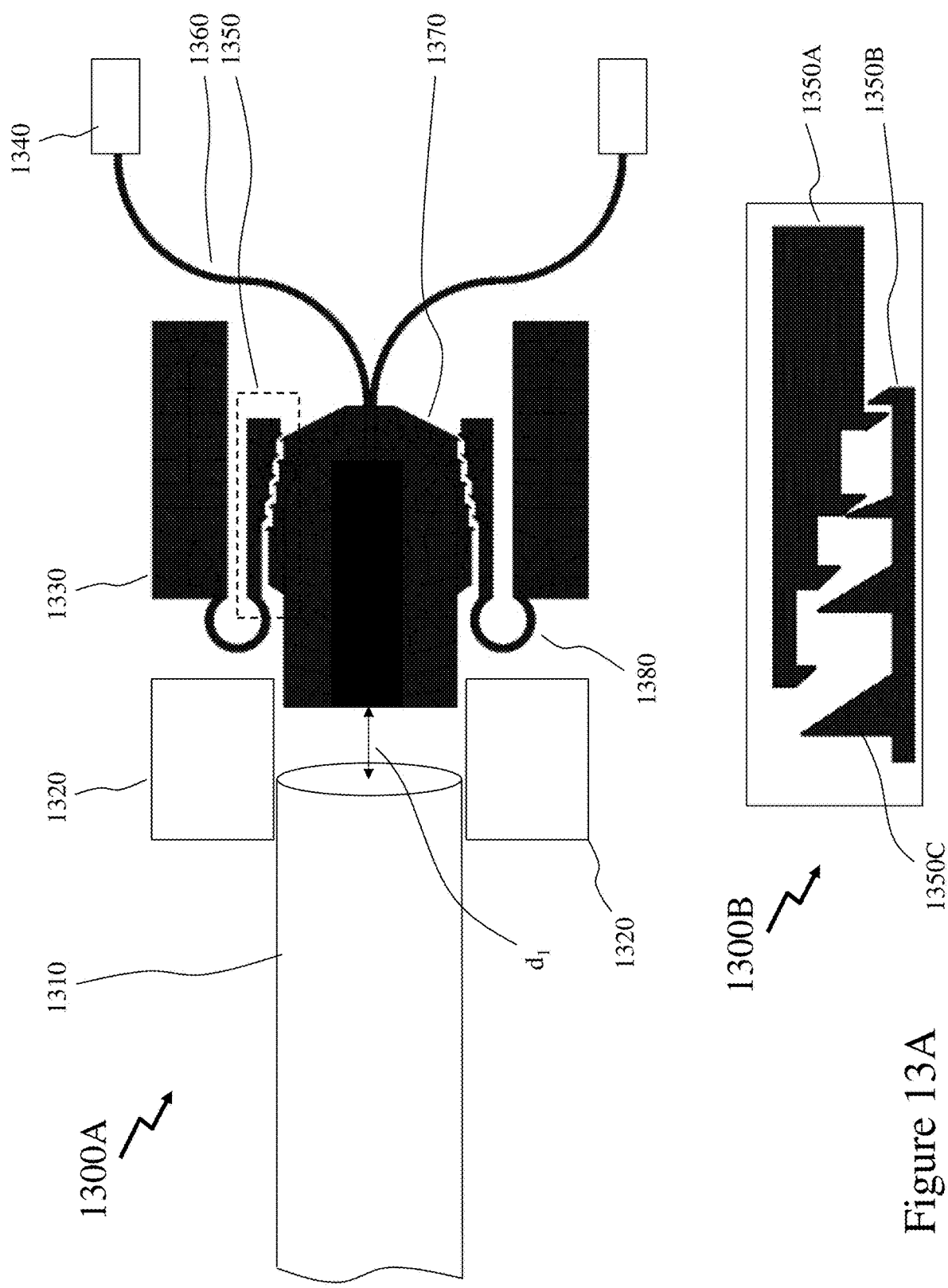
FIG. 13A depicts a deformable optical fiber-waveguide coupling interface according to an embodiment of the invention prior to optical fiber-waveguide abutment.

Accordingly, the inventors have established a PIC design approach that allows the PIC to accommodate the length variation within the cleaved fiber ribbon. Accordingly, as depicted in FIG. 13A in first image 1300A the concept, referred to as flexible edge connect (FLEC) by the inventors, comprises a suspended platform 1370 which abuts the end face of the optical fiber 1310 when the fiber is inserted into a U-groove or V-groove which is depicted simply by edge features 1320 (these being patterned portions of the PIC layer stack deposited onto the substrate within which the U-groove or V-groove is formed. In FIG. 13A the fiber end face is depicted at a separation $d_1$ from the end of the suspended platform 1370. Disposed either side of the suspended platform 1370 are ratchet structures 1350 which are coupled to mounts 1330 via hinges 1380. The suspended platform 1370 is attached to anchor portions 1340 via flexible anchors 1360. Accordingly, an optical waveguide (not depicted for clarity) can be formed upon the suspended platform 1370 and routed via one of the flexible anchors 1360 to the PIC.

In second image 1300B the ratchet 1350 structure is depicted in detail comprising first section 1350A attached to the hinge 1380 and second section 1350B forming part of the suspended platform 1370. Depicted are a series of teeth 1350C such that as the second section 1350B is moved right relative to the first section 1350A the hinge allows the second section 1350B to move relative to the first section 1350A but cannot reverse direction.

Figure 13B:
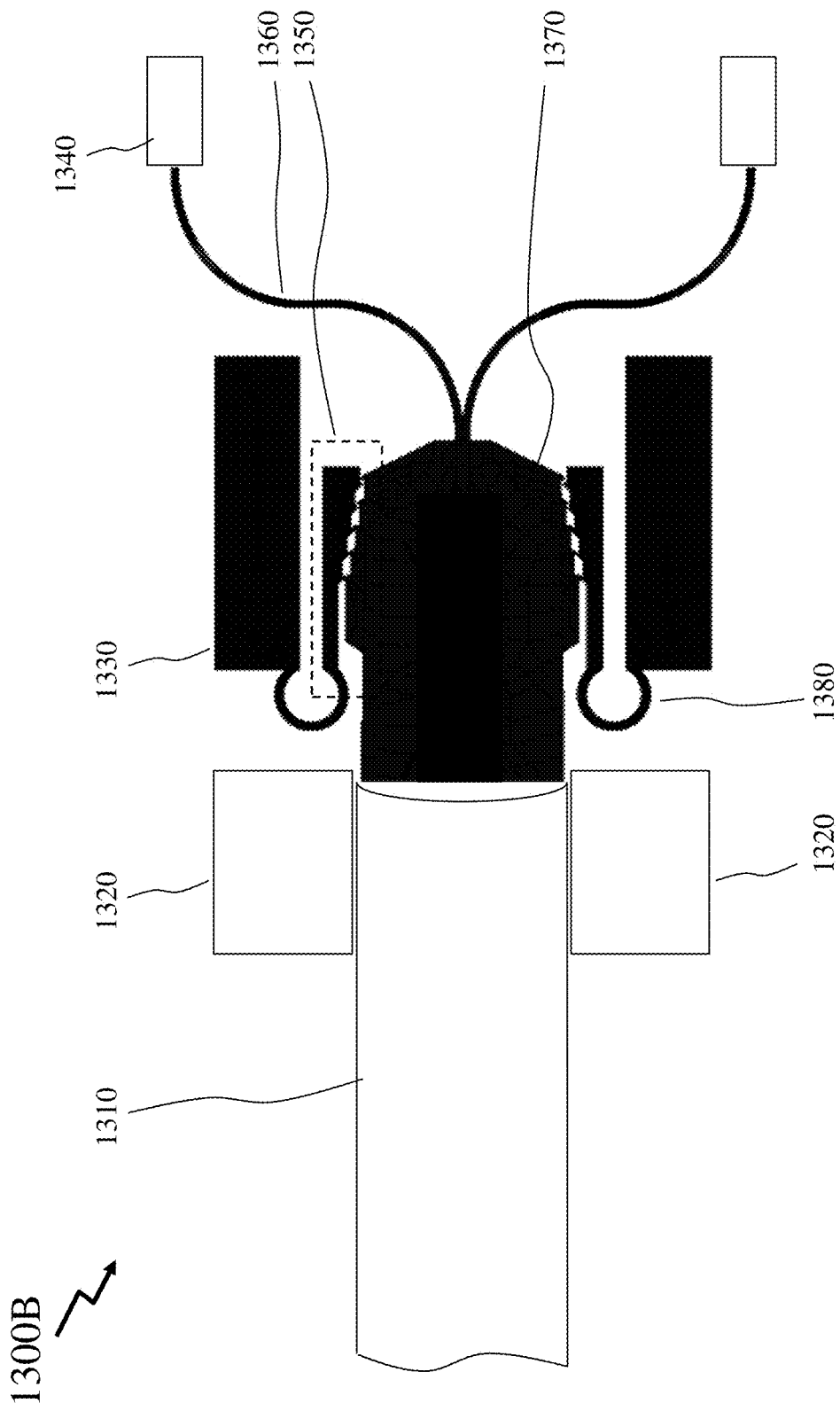
FIG. 13B depicts the deformable optical fiber-waveguide coupling interface according to an embodiment of the invention after optical fiber-waveguide abutment.

Referring to FIG. 13B the optical fiber 1310 is inserted into the U-groove or V-groove and abuts the suspended platform 1370 wherein it may be "pushed" such that the suspended platform 1370 moves, the ratchet structures 1350 allowing motion of the suspended platform forward wherein the teeth engage to restrict motion of the suspended platform 1370 backwards beyond the last tooth engaged.

Figure 14A:
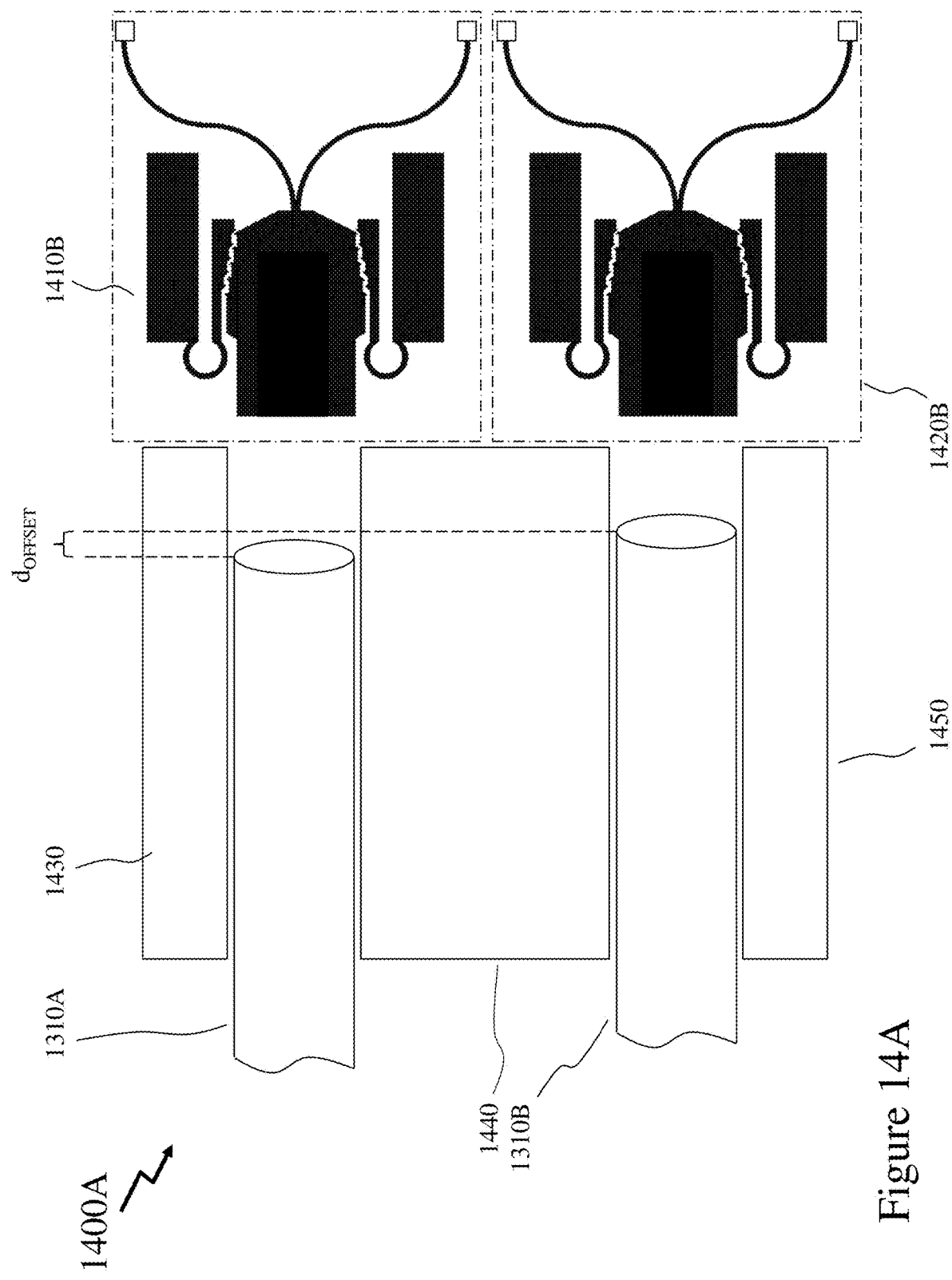
FIG. 14A depicts deformable optical fiber-waveguide coupling interface for multiple interfaces according to an embodiment of the invention prior to optical fiber-waveguide abutment.
Figure 14B:
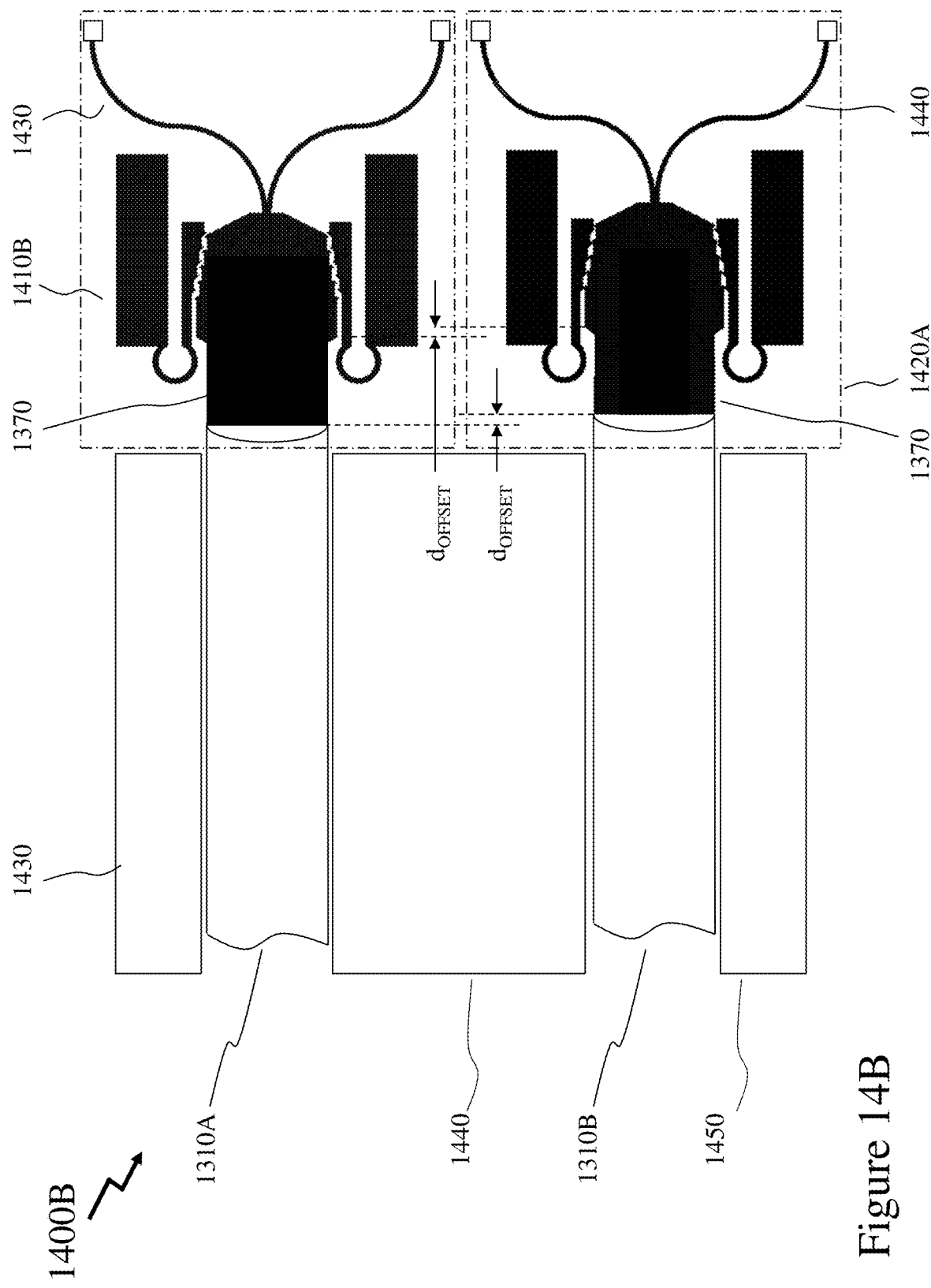
FIG. 14B depicts the deformable optical fiber-waveguide coupling interface for multiple interfaces according to an embodiment of the invention after optical fiber-waveguide abutment.

This is depicted in the instance of a pair of fibers 1310A and 1310B in FIG. 14A which are inserted into grooves, not depicted for clarity but indicated by first to third patterned regions 1430 to 1450 respectively. Also depicted are first and second FLEC structures 1410B and 1420B respectively. The pair of fibers 1310A and 1310B being within a ribbon and having an offset, $d_{OFFSET}$, between their end faces. Next, in FIG. 14B the pair of fibers 1310A and 1310B have been inserted and pushed forward so that they engage the first and second FLEC structures 1410B and 1420B respectively. Accordingly, the offset between the pair of fibers 1310A and 1310B, $d_{OFFSET}$, is reflected in the same offset in the suspended platforms 1370 within each of the first and second FLEC structures 1410B and 1420B respectively. Accordingly, the first flexible anchor 1430 in first FLEC structure 1410A is deformed by a first amount and the second flexible anchor 1440 in second FLEC structure 1410B is deformed further by a second amount as it accommodates the offset, $d_{OFFSET}$.

Figure 14C:
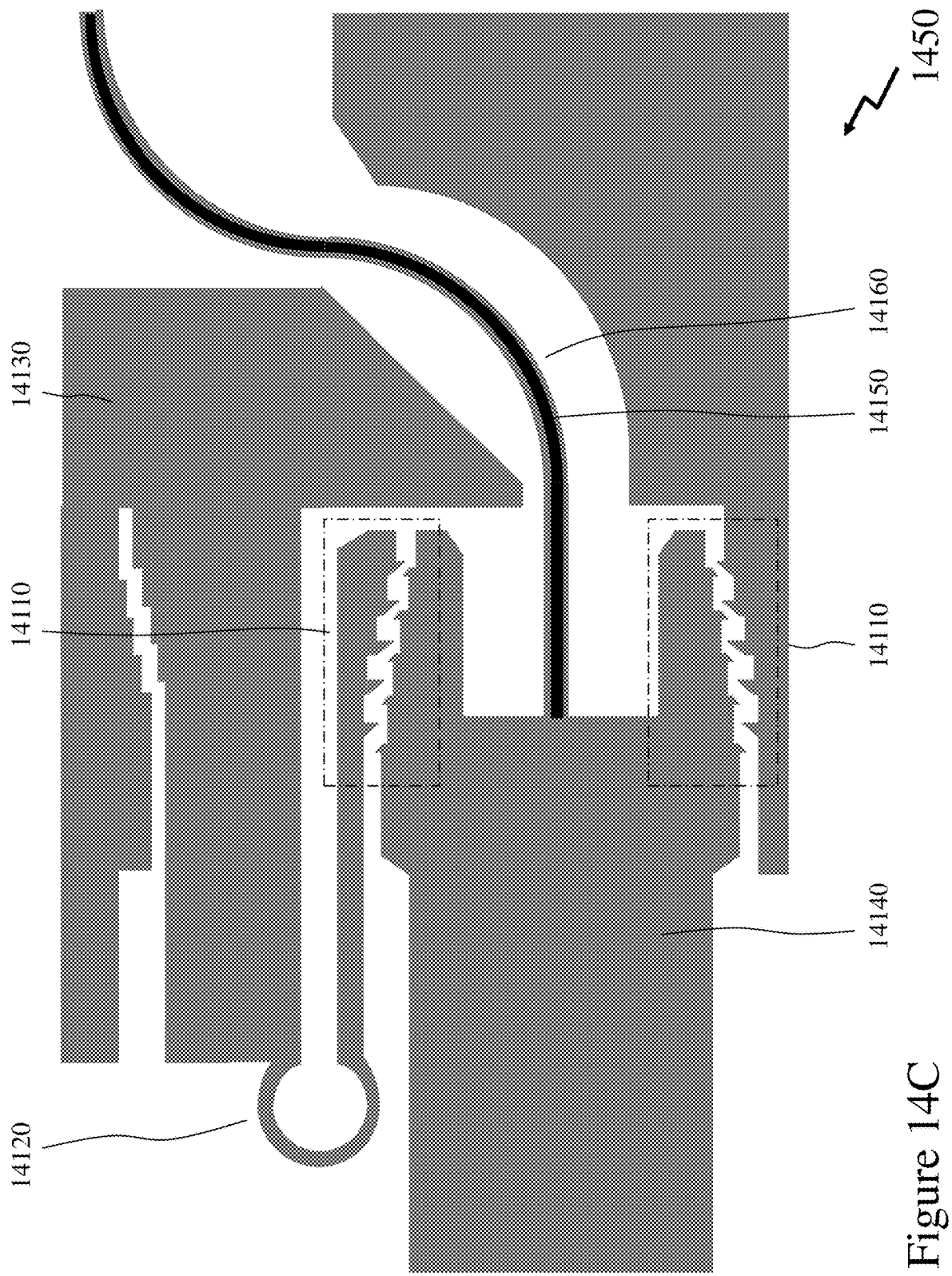
FIG. 14C depicts a deformable optical fiber-waveguide coupling interface according to an embodiment of the invention prior to optical fiber-waveguide abutment.

Optionally, array of grooves (V-grooves or U-grooves) may be defined such that the end of the most prominent fiber within the ribbon fiber array, of which first and second fibers 1310A and 1310B form part, "hits" the end of the groove it is in and pushes the suspended platform 1370 the furthest from its initial position. Accordingly, the other optical fibers do not push their respective suspended platforms as far forward as the most prominent optical fiber. This structure is depicted in FIG. 14C wherein the suspended platform 14140 is depicted together with a single flexible structure 14160 with optical waveguide 14150. Also evident are the pair of ratchet structures 14110 that allow the suspended platform to move to the right but not backwards to the left. Also depicted is hinge 14120 attached to one of the ratchet structures 14110. Accordingly, the number of teeth on each ratchet structure may be defined according to the desired tolerance of locking the ratchet once moved forward by the optical fiber.

Within embodiments of the invention described and depicted in respect of FIGS. 7A to 14 above and FIGS. 16 to 21 below, devices exploiting IO-MEMS structures have been described and depicted wherein an optical waveguide is formed atop a MEMS structure in order to support dynamic positioning of the optical waveguide on the suspended portion of the IO-MEMS relative to a plurality of fixed optical waveguides and/or other structures. As noted in respect of photonic integrated circuits (PICs), the management of stress is important as vertical deformation of the IO-MEMS beam(s) relative to the fixed waveguide portions results in increased insertion loss of the PIC. Accordingly, residual stress within the MEMS beam and/or other structures when released from the substrate will result in deformation of the MEMS beam and/or other structures. The sensitivity of the optical waveguide alignment within an IO-MEMS is such that at residual stress levels far below those necessary to impact operation of the MEMS the deformation in the MEMS beam and/or other structures will result in increased insertion loss and potentially complete misalignment. As will become evident in subsequent descriptions in respect of FIGS. 16 to 22 below residual stress also impacts suspended MEMS/IO-MEMS structures such as the beams within IO-MEMS described and depicted within FIGS. 7A to 14C above.

Figure 15:
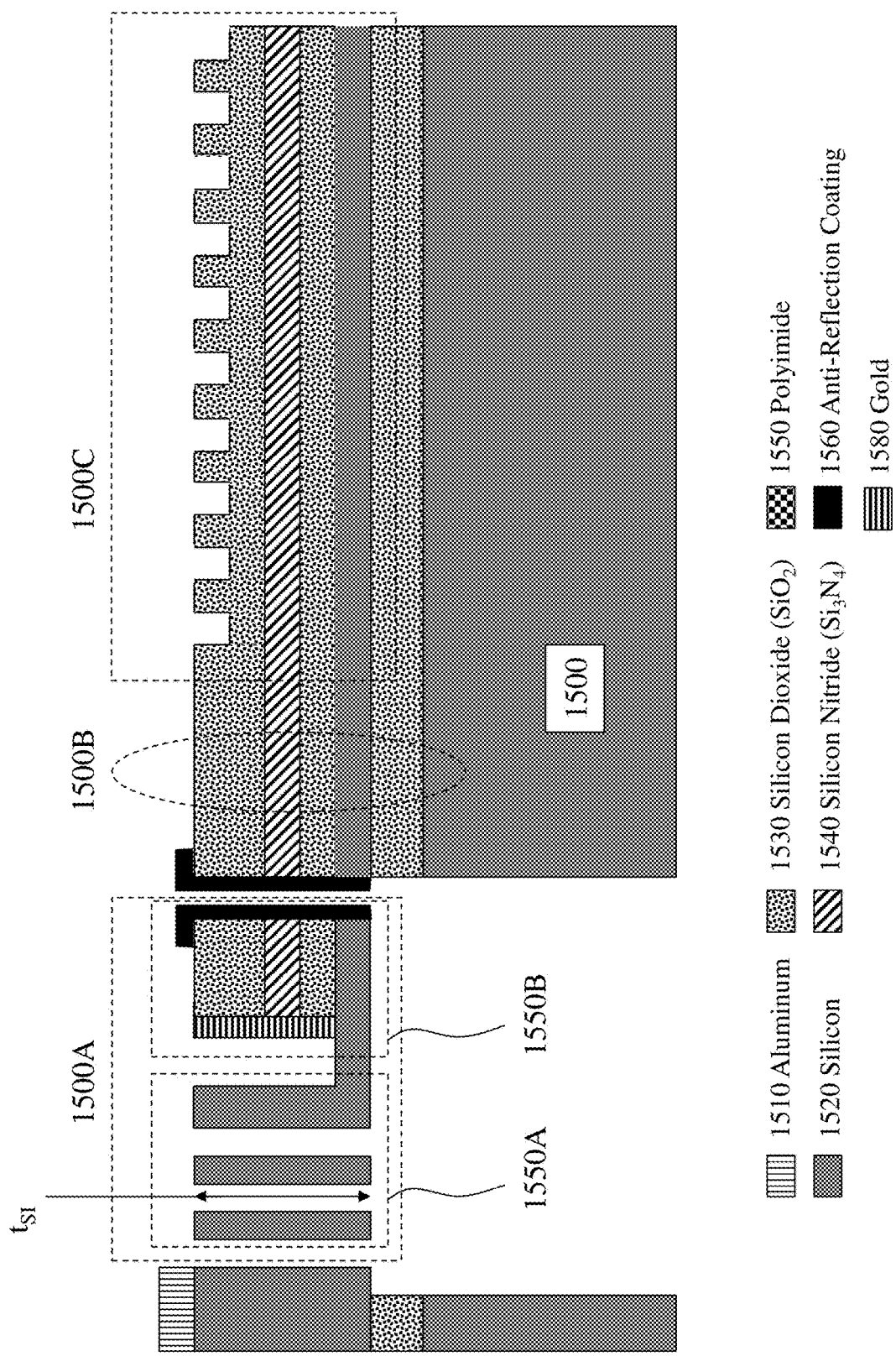
FIG. 15 depicts an exemplary cross-section of a prior art processed IO-MEMS device.

Accordingly, the inventors have established different manufacturing methodologies to address the issue. These being depicted in FIGS. 16 to 22 respectively whilst FIG. 15 depicts a prior art uncompensated waveguide design such as described and depicted within previous patent applications by the inventors including, but not limited to, PCT/CA2015/000135 entitled " " and PCT/CA2015/000136 entitled "." Accordingly, FIG. 15 depicts a cross-section of a fabricated IO-MEMS as described and depicted within PCT/CA2015/000135 and PCT/CA2015/000136 comprising:

Substrate 1500 formed from silicon 1520;
MEMS 1500A comprising first and second sections 1550A and 1550B;
Passive waveguide 1500B; and
Bragg waveguide 1500C.

The first section 1550A of the MEMS 1500A being formed solely from silicon 1520. Second section 1550B of the MEMS 1500A comprises an optical waveguide stack atop the silicon 1520. The optical waveguide stack comprising a lower cladding (silicon dioxide 1530), core (silicon nitride 1540), and upper cladding (silicon dioxide 1530). Within the passive waveguide 1500B and Bragg waveguide 1500C then optical waveguide stack is atop the silicon 1520 upper layer and substrate and the intervening buried oxide (BOX) layer of silicon dioxide 1530. The depicted design cross-section being of a rotary MEMS with planar waveguide coupling optical signals to one or more waveguides with a Bragg grating. Within exemplary implementations the thickness, $t_{Si}$, of the silicon atop the BOX is 25 µm.

Figure 16:
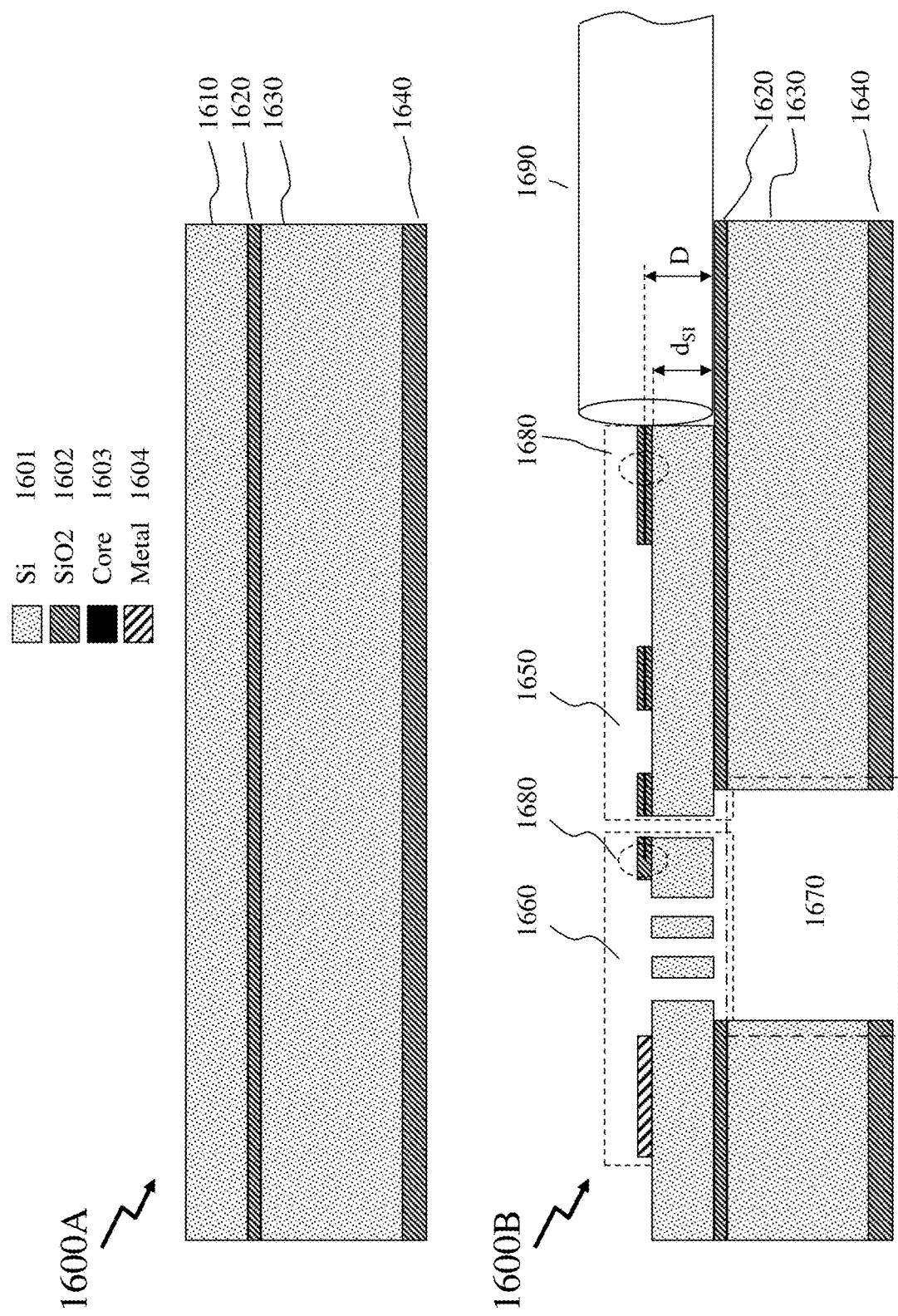
FIG. 16 depicts exemplary cross-sections of initial starting wafer and processed IO-MEMS device according to an embodiment of the invention for uncompensated mirrorless designs with optional fiber optic attachment.

Referring to FIG. 16 there are depicted exemplary first cross-section 1600A of initial starting wafer and second cross-section 1600B of a processed integrated optics microelectromechanical system (IO-MEMS) device according to an embodiment of the invention for uncompensated mirrorless designs. The inventors refer to this design concept as "Small Waveguide on Big" IO-MEMS (SWB-IO-MEMS) as a result of two mutually beneficial factors. Firstly, the removal of the optical stack where there is no need for waveguides on the suspended IO-MEMS platform 1660 formed out of the 1610 (silicon 1601) atop the BOX 1620 (SiO2 1602) and secondly the relative thickness of the device layer of the IO-MEMS substrate 1630 (silicon 1601). This device layer has a thickness established in dependence upon the Optical Fiber 1690 outside diameter thereby enabling the creation of a relatively thick suspended mechanical layer for the optical waveguides 1680 and preventing the waveguides on the suspended portion of the IO-MEMS from vertically deflecting out of alignment with the output waveguides on the fixed portion of the IO-MEMS. Furthermore, the SWB-IO-MEMS provides for optical fiber 1690 alignment to waveguides 1680 unlike the prior art geometry depicted in FIG. 15. The back of the wafer having an optional thermally grown or deposited silicon dioxide 1640 layer (SiO2 1602) for minimizing wafer bow.

In second image 1600B the processed device cross-section is depicted with MEMS region 1660 with: i) opening 1670 beneath and waveguide geometry 1650 comprising the fixed 3D optical waveguides atop the substrate 1630, ii) the waveguides atop the IO-MEMS 1660 comprising, and iii) the movable 3D optical waveguides 1680 on the suspended portion of the IO-MEMS. The waveguide geometry 1650 comprising a lower cladding (SiO2 1602), core (core 1603 such as silicon nitride), and upper cladding (SiO2 1602). Alternatively, the waveguide may comprise a silicon nitride (Si3N4)-silicon-silicon nitride stack or another material set and associated waveguide geometry enabling sufficient confinement of light to the core thus limiting the thickness amount of cladding materials to that which may be feasibly deposited on top of an IO-MEMS mechanical layer. Beneficially, the silicon device layer 1610 may be etched down to the BOX 1620 which acts as an etch stop defining a physical reference for the waveguide structures and accordingly the placement of optical fibers 1690 within U-grooves or V-grooves formed within the silicon cover 1610.

The waveguides 1680 according to the following discussions are based upon an embodiment of the invention employing an optical stack material set comprising silicon nitride & silica (SiO2-Si3N4-SiO2) with the following geometric characteristics for which it is desirable to provide for butt-coupling to standard singlemode optical fibers:

| | |
|---|---|
| a lower silica (SiO2) cladding | 3.4 µm |
| a silicon nitride ($Si_xN_y$) core | 0.435 µm |
| an upper silica SiO2 cladding | 3.4 µm |

Accordingly, in order to provide low-costs connectivity to IO-MEMS with standard size optical fibers, it is desirable to provide on-chip fiber attach and butt coupling between the IO-MEMS submicron waveguides and standard ITU G.652D and G.657A optical fibers with a cladding outer diameter (OD) of 125 µm. Therefore, this sets the radius of the cladding to be half of its OD, i.e. R=62.5 µm. Typically, ITU G.652D optical fibers are manufactured to the following tolerances: i) a clad OD tolerance of worst case 125 µm+0.7 µm, ii) a cladding non-circularity constrained to below 1% of the OD (i.e. 1% of 125 µm+0.7 µm, i.e. smaller than <1.257 µm) and iii) a core-cladding concentricity below 0.5 µm. The worst-case sum of all these optical fiber manufacturing tolerances is 125 µm+0.7 µm+1.257 µm+0.5 µm for a total of 127.457 µm, which means that the center of the optical fiber can shift by as much as half of the difference between the intended OD of 125 µm and the manufactured OD. Thus, considering the worst case manufactured OD of 127.457 µm, the center of the of the optical fiber can be up to 127.457−125=2.457/2=1.2285 µm off from the intended radius of 62.5 µm. It is therefore beneficial to use optical fibers with relatively large mode field diameters rather than high numerical aperture optical fibers and to match this optical mode with a spot size converter embedded in the waveguides 1680 at the optical fiber interface. Accordingly, the thickness of the silicon ($d_{Si}$) is given by Equation (1) below where $r_{F-CLAD}$ is the radius of the fiber cladding, $d_{L-CLAD}$ is the thickness of the lower waveguide cladding and $d_{CORE}$ is the thickness of the waveguide core.

$$d_{SI} = r_{F-CLAD} - d_{L-CLAD} - 0.5 * d_{CORE} \qquad (1)$$

Accordingly, the inventors have established that with the waveguide structure above then a IO-MEMS device layer 1610 set at (62.5−3.4−0.5*0.435)=58.8825 µm provides for optimal fiber alignment grooves as well as implementation of SWB-IO-MEMS while providing for the alignment of the center of waveguides 1680 to the center of the optical fiber within a vertical tolerance of worst case 1.2285 µm stemming from the manufacturing tolerances of the clad in standard ITU G.652D optical fibers.

However, whilst optical fiber manufacturers offer selected optical fiber to improve the overall accuracy of the core position it would be beneficial to employ an inherently higher specification optical fiber. Such an option exists in 80 µm OD 'reduced clad' optical fiber which provides for much tighter manufacturing tolerances than ITU G.652D optical fiber. Using this fiber results in r=40 µm and hence $d_{Si}$=40−0.5*0.435−3.4 µm=36.38 µm. Compared to the device layer thickness required by SMF28 optical fiber with 125 µm OSD, an IO-MEMS with a mechanical layer thickness of 36.38 µm, while thinner, is still thick-enough to prevent significant vertical deflection of the suspended portion of the IO-MEMS shuttle 740 containing the waveguide 1680 without requiring a stress compensation stack provided that the waveguide stack material set is etched away where no waveguides are needed. However, a relatively thinner MEMS mechanical layer provides significantly easier manufacturing as the MEMS may now be formed by etching through 36.38 µm of silicon rather than 58.88 µm. The inventors have established how to set the MEMS mechanical layer thickness as a function of the OD of the optical fiber chosen for fiber attach to the IO-MEMS. Within an alternative waveguide design comprising Si3N4 (2 µm):Si (0.6 µm):Si3N4 (2.0 µm) then for D=40 µm and hence $d_{SI}$=37.7 µm with a 4.6 µm waveguide atop it.

Within another embodiment of the invention rather than the BOX 1620 forming the bottom of the grooves within which the optical fibers are placed may be removed. Accordingly, the thickness of the silicon, $d_{SI}$, is reduced by the thickness of the BOX 1620, e.g. 1 µm, such that with the example of the Si3N4 (2 µm):Si (0.6 µm):Si3N4 (2.0 µm) waveguide then $d_{SI}$=37.7-1.0 µm=36.7 µm.

The inventors have fabricated exemplary PIC devices exploiting PECVD for the optical waveguide structure. However, elimination of absorption from OH— within the Si3N4 deposited by PECVD requires annealing thereby inducing stress within the optical waveguide structures such that LPCVD may offer lower stress waveguides. However, it would be evident that other embodiments of the invention may exploit PECVD, LPCVD or other waveguide deposition processes.

Whilst FIG. 16 further depicts a geometry consistent with that described and depicted in respect of FIG. 16 such that the thickness of the thick silicon device layer 1610 serving as the mechanical layer for the IO-MEMS is defined to allow U-groove formation with the bottom of the U-groove and hence lower mechanical stop for the position of the optical fibers, it would be evident that the methodology of forming the IO-MEMS 1660 or MEMS within the thick silicon cover 1610 with an opening 1670 within the substrate prior to fabrication of the IO-MEMS and/or MEMS may be employed in other PICs that do not exploit U-groove designs etc. such that the thickness of the device layer 1610 serving as the mechanical layer for the IO-MEMS 1610 is defined by other design, cost, performance tradeoffs rather than the vertical alignment of the optical fiber.

Within FIG. 16, an embodiment of the invention comprises the waveguides 1680 atop the fixed 1650 and suspended portions 1660 of the IO-MEMS comprising the movable 3D optical waveguides on the beams. The waveguide geometry 1650 comprising a lower cladding (SiO2 1602), core (core 1603 such as silicon nitride), and upper cladding (SiO2 1602) as depicted but it may comprise other waveguide designs such as Si3N4 (2 µm):Si (0.6 µm):Si3N4 (2.0 µm) waveguide in either the Si3N4 (3.4 µm):Si (0.435 µm):Si3N4 (3.4 µm) waveguide or Si3N4 (2 µm):Si (0.6 µm):Si3N4 (2.0 µm) waveguide variants described above.

Figure 17:
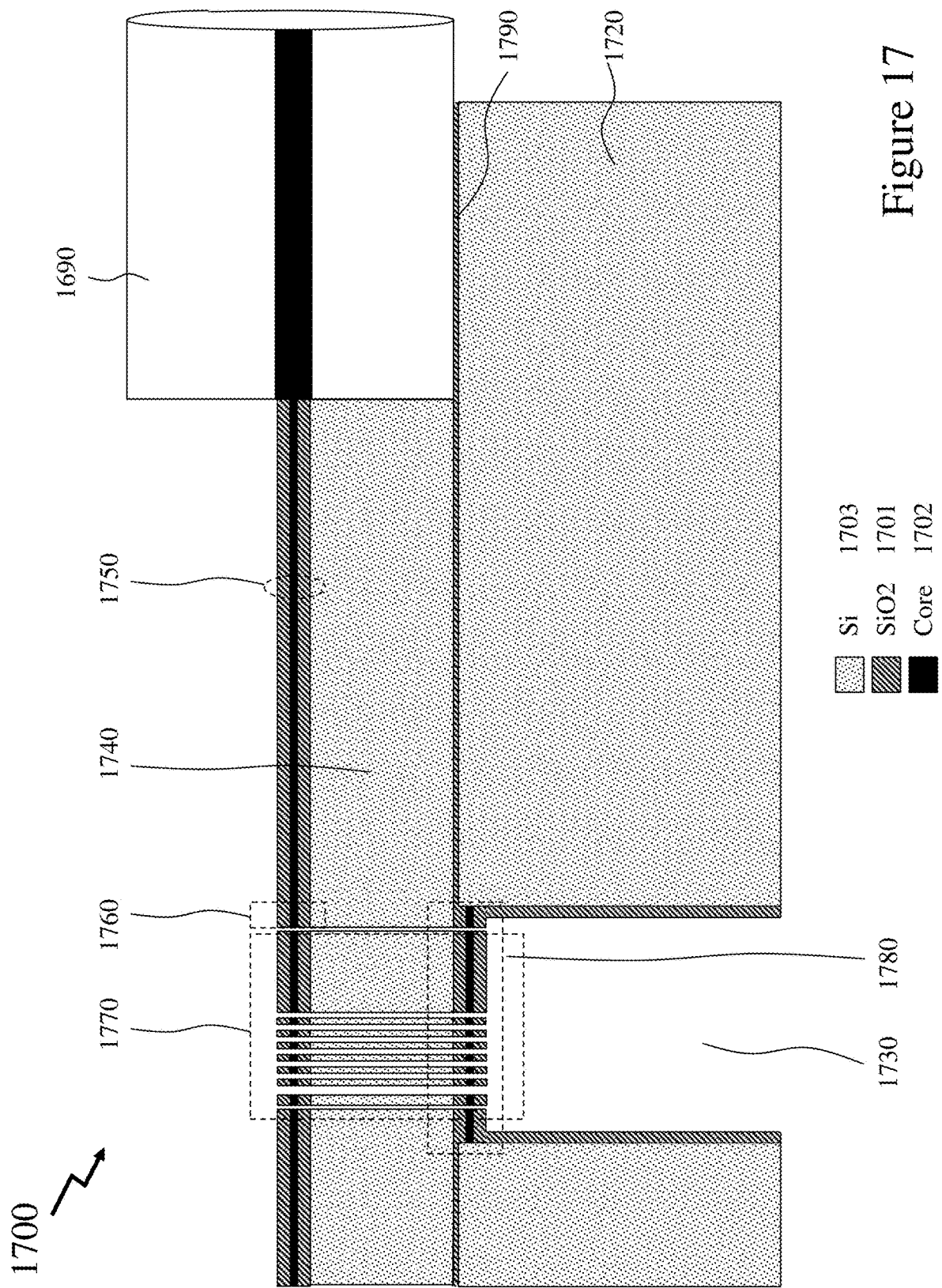
FIG. 17 depicts exemplary cross-sections of processed IO-MEMS device according to an embodiment of the invention for optical waveguides materials set stress compensated mirrorless designs with optional fiber optic attachment.

Referring to FIG. 17 there is depicted an exemplary cross-section of processed IO-MEMS device according to an embodiment of the invention exploiting a cavity compensated design with fiber interface wherein the silicon substrate has an opening 1730 within it such that a complementary waveguide stack 1780 can be formed on the lower surface of the SOI structure device layer 1740 serving as the mechanical support for the IO-MEMS, on the opposite side to the waveguide stack 1750 which is deposited on the upper surface of the SOI structure device layer 1740. The complementary waveguide stack 1780 etched in the same process step as the IO-MEMS 1770 with its suspended waveguide such that the complementary waveguide stack 1780 and waveguide stack 1750 are patterned the same. The opening 1730 being formed within the substrate 1720. Accordingly, etching through the waveguide stack 1750 and thick silicon 1740 in the region where the optical fiber 1690 is to be inserted and coupled provides for the optical core of the optical fiber 1690 to be vertically aligned to the core 1702 of the optical waveguide stack 1750. Within FIG. 17 the optical waveguide has upper and lower cladding of silicon dioxide (SiO2) 2001 whilst the substrate is silicon 1703. The optical waveguides materials on the suspended 1770 and fixed portions of the IO-MEMS 1750 set may optionally be removed in locations where there is no need for actual waveguides, enabling the mitigation of the stress imposed by these materials onto the suspended portion of the IO-MEMS and or to minimize the bow of the SOI substrate upon etching the openings 1730 from the backside of the SOI substrate 1720.

The cross-section 1700 of the IO-MEMS in FIG. 17 finally shows that the thickness of the silicon device layer of the SOI structure serving as the mechanical layer 1740 of the IO-MEMS may be defined as a function of the diameter of an optical fiber 1690 with the buried oxide layer 1790 serving as an etch stop which may or may not be removed at the bottom of the groove below the optical fiber 1690.

Accordingly, the geometry depicted in FIG. 17 is intended to provide for compensation of the stress induced from the optical waveguide by providing a complementary structure on the lower surface of the IO-MEMS mechanical layer 1740. However, it would be evident that the deposition and patterning of the structure(s) on the lower surface of the IO-MEMS mechanical layer 1740 is performed through the opening 1730 within the silicon substrate 1720. Accordingly, the structure deposited and patterned onto the lower surface of the IO-MEMS mechanical layer 1740 may, in some embodiments of the invention, not be a direct replica of that formed upon the upper surface. The design of the structure deposited and patterned onto the lower surface of IO-MEMS mechanical layer 1740 may, in some embodiments of the invention, be based upon numerical simulations/computer aided design etc. whilst in other embodiments of the invention it may be established qualitatively rather than quantitatively.

Figure 18:
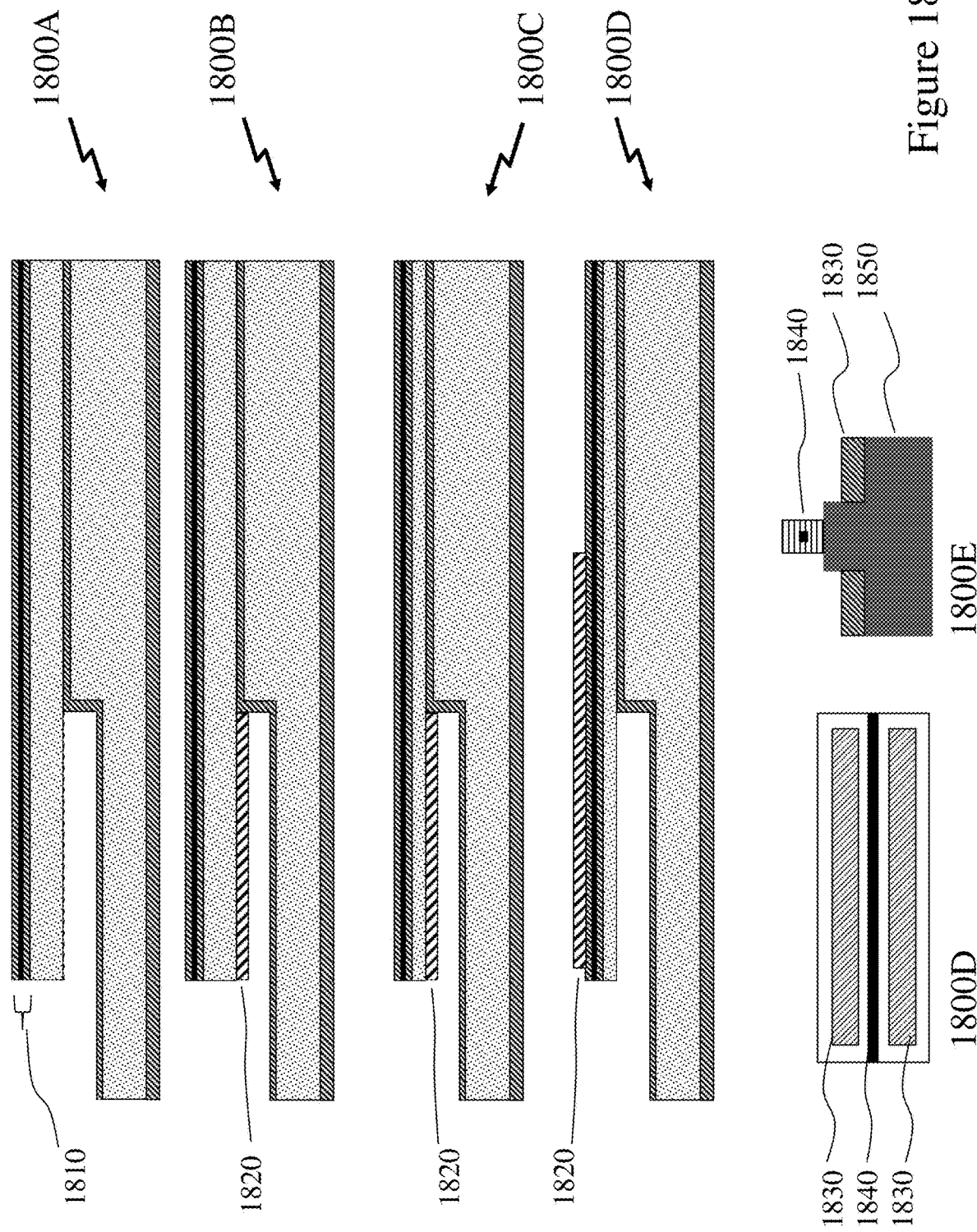
FIG. 18 depicts exemplary cross-sections of processed IO-MEMS device according to for optical waveguides materials set stress compensation alternative approaches.

In contrast, embodiments of the invention depicted in respect of FIG. 18 in first to fourth images 1800A to 1800D respectively which provide additional structures to provide post-fabrication adjustment of the IO-MEMS beam. Within first image 1800A the waveguide structure 1810 above the beam employs aluminum nitride (AlN) core with silicon dioxide upper and lower cladding layers. The core is connected to one or more electrode pads allowing electrical activation of the AlN film which is piezoelectric. Accordingly, the AlN can be employed to provide a stress to counteract any present within the IO-MEMS beam to "flatten" the IO-MEMS beam. Alternatively, as depicted in second image 1800B an AlN film 1820 is provided on the lower surface of the IO-MEMS beam, for example, by patterning on a silicon layer on a first handler wafer which is inverted and bonded to the silicon substrate such as described and depicted supra in respect of fabricating other embodiments of the invention. Within third image 1800C the AlN file 1820 is deposited upon the lower surface of a thin IO-MEMS beam rather than a thick IO-MEMS beam.

Alternatively, as depicted in fourth image 1800D AlN regions 1830 may be added laterally to the IO-MEMS beam either side of the optical waveguide 2140. Further, as evident in fifth image 1800E the IO-MEMS beam may be further processed such that the AlN regions 1830 are adjacent and on thinner silicon 1850 than the optical waveguide 1840. Optionally, the geometries of fourth and fifth images 1800D and 1800E may be augmented with AlN film 1820 beneath as well as employ a waveguide with AlN core. Within other embodiments of the invention variants of second to fifth images 1800B to 1800E respectively may employ conductive films that provide resistive heating of the IO-MEMS beam in order to induce asymmetric stress to counter stress within the IO-MEMS beam to "flatten" the IO-MEMS beam(s).

Coming back to FIG. 16, whilst IO-MEMS 1660 was released by etching through BOX 1620 and the entire substrate 1630 thereby yielding opening 1670, the presence of many of such openings may result in increased packaging complexity for IO-MEMS to the need to bottom cap the openings to prevent glue or solder from entering into the openings below the IO-MEMS. Furthermore, given that a typical SOI substrate is 735 μm thick, the fabrication of the openings 1670 results in a long etch process through this 735 μm of silicon 1630.

Consequently, the inventors have established a variant of the silicon-on-insulator (SOI) design depicted in FIG. 19 which exploits the SWB-IO-MEMS concept but exploits an initial silicon substrate 1930 with recesses 1950 formed within it, serving as cavities beneath the IO-MEMS 1960 and allowing the IO-MEMS to become suspended upon being etched from the top without any need for removing material below the IO-MEMS in order to suspend the IO-MEMS. Accordingly, the inventors refer to this as Cavity SOI (CSOI). CSOI enables a much simpler packaging of IO-MEMS as there is no need to bottom cap the IO-MEMS as there are no longer a need for vias etched from the backside of the SOI substrate 1930 in order to suspend the IO-MEMS 1960.

Figure 19:
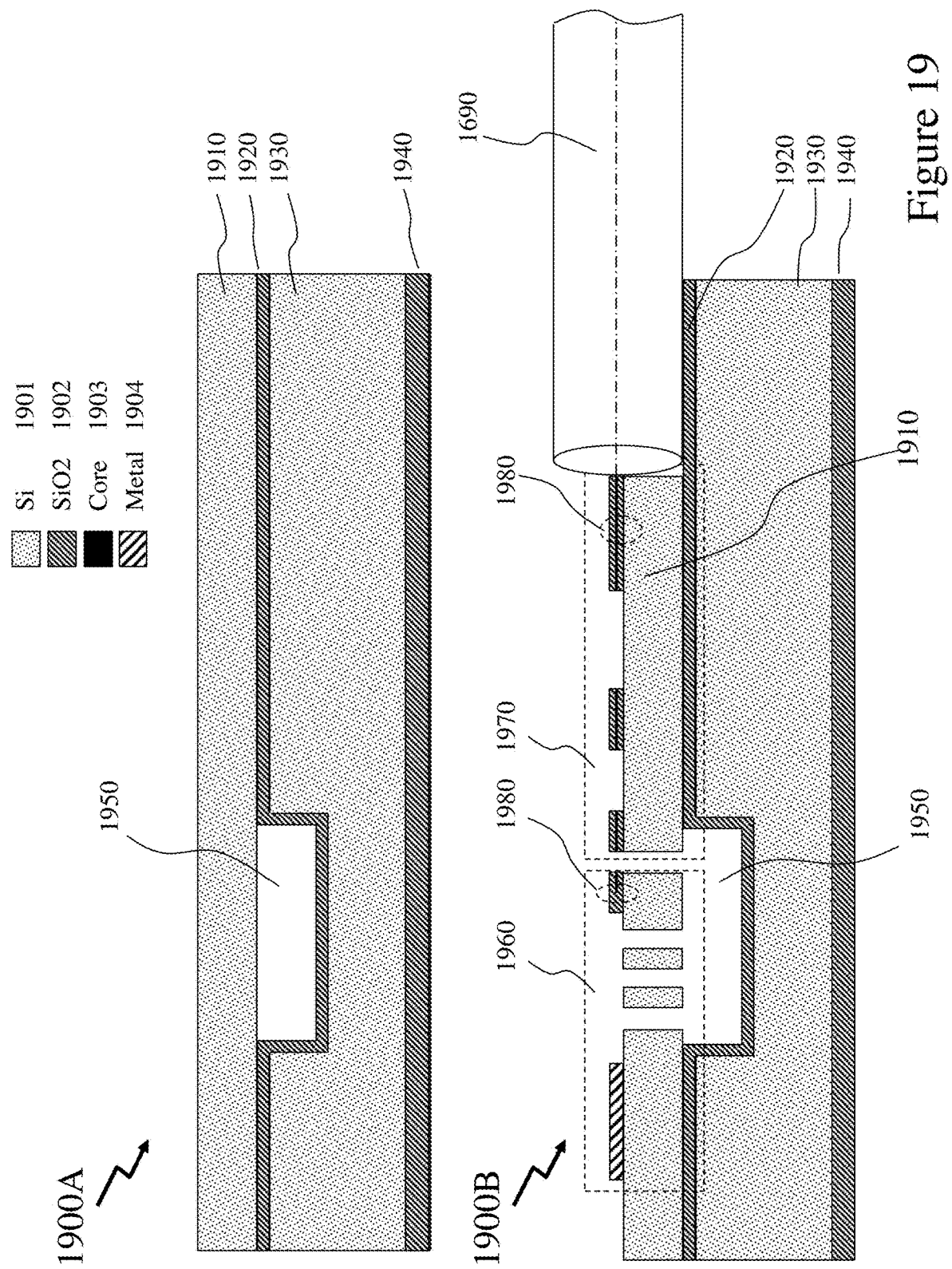
FIG. 19 depicts exemplary cross-sections of initial starting wafer and processed IO-MEMS device according to an embodiment of the invention for cavity based uncompensated designs.

Accordingly, referring to FIG. 19 there are depicted exemplary first cross-section 1900A of initial starting wafer and second cross-section 1900B of a processed integrated optics microelectromechanical system (IO-MEMS) device according to an embodiment of the invention for uncompensated mirrorless designs. The inventors refer to this design concept as CSOI small waveguides on big IO-MEMS (SWB-IO-MEMS) due to the thick mechanical layer 1910 (silicon 1901) atop the BOX 1920 (SiO2 1602) and substrate 1930 (silicon 1901). Beneficially the SWB-IO-MEMS provides for optical fiber 1690 alignment in common with the geometry depicted in FIG. 16. The back of the wafer having an optional thermally grown or deposited oxide 1940 (SiO2 1602) to minimize wafer bow. In first image 1900A, the BOX 1920 is formed after the substrate 1930 has been etched to provide the recess 1950. A sacrificial material (not depicted) for clarity may be deposited within the openings 1950 prior to the formation of the silicon device layer 1910.

In second image 1900B the processed device cross-section is depicted with IO-MEMS region 1960 with opening 1970 beneath and waveguide geometry 1950 comprising the fixed 3D optical waveguides atop the substrate 1930. Upon patterning the MEMS in the silicon device layer 1910, the IO-MEMS 1960 is thereby released and becomes suspended by its anchors (not shown) over the cavity 1950. The removal of the optical stack material set where there is no need for waveguides 1980 on the suspended portion of the IO-MEMS 1960 and the fixed portion of the IO-MEMS 1990 provides for a mechanism to minimize the upon the SOI substrate stemming from the material set of the optical stack deposited upon the IO-MEMS device layer 1910. The thickness of the device layer 1910 serving as the mechanical layer for the IO-MEMS has direct impact on the ability to maintain the waveguides 1980 on the suspended portion of the IO-MEMS 1960 optically aligned with those on the fixed portion 1970 of the IO-MEMS. Further, second image 1900B, the optical fiber 1690 is depicted and optically aligned with the optical waveguides 1980 in the same manner as previously described in FIG. 16, that is by a cavity formed in the device layer of the SOI wafer serving as the mechanical support for the IO-MEMS 1960 and resting on the top of the buried oxide 1920 or on the top of the SOI substrate silicon 1930 should the buried oxide be removed deliberately.

Figure 20:
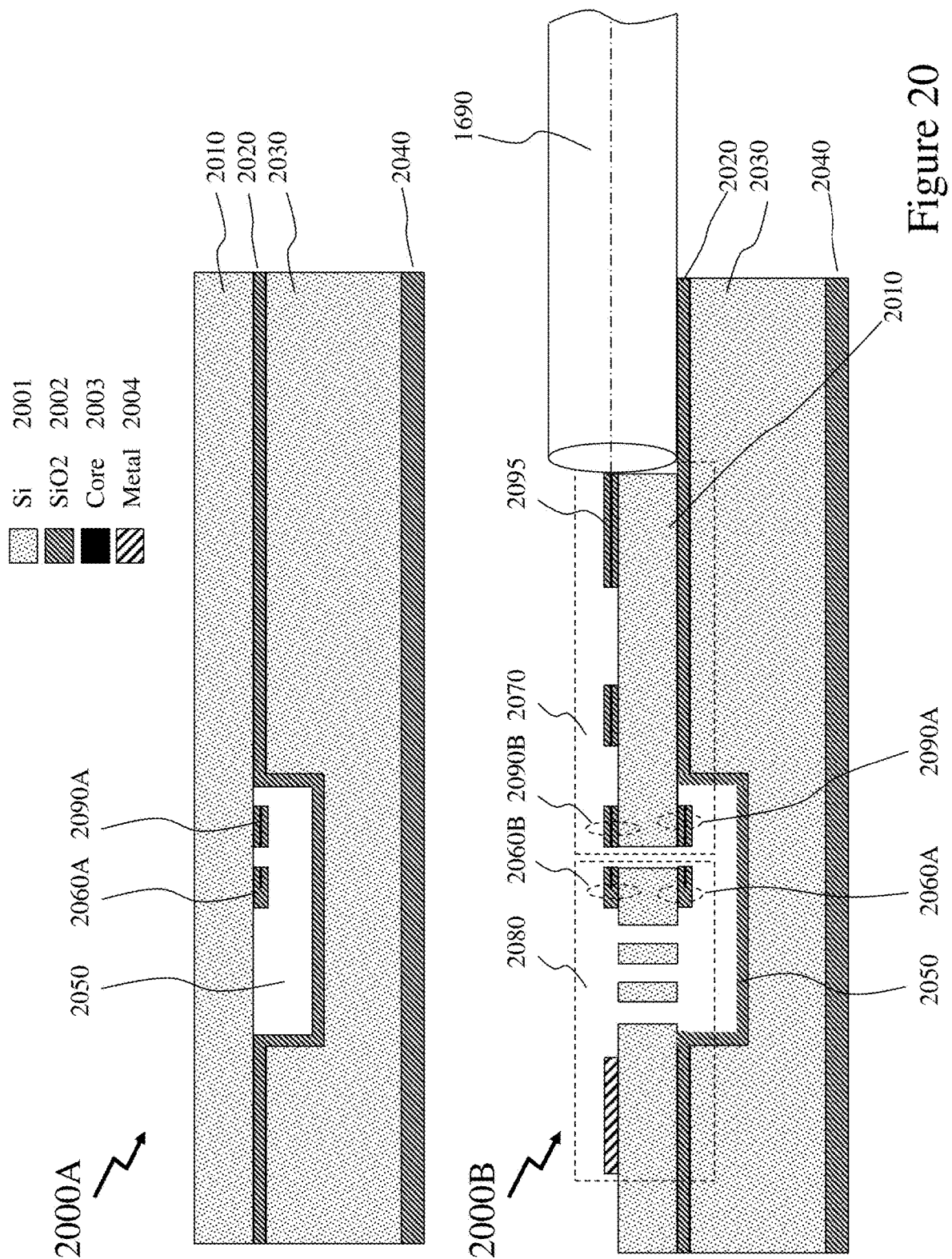
FIG. 20 depicts exemplary cross-sections of initial starting wafer and processed IO-MEMS device according to an embodiment of the invention for cavity based compensated designs with a fiber-optic interface.

Within the embodiments of the invention depicted in FIG. 20 and variants that do or do not exploit thick SOI device layer 2010 serving as the mechanical layer of IO-MEMS and dimensioned for vertical alignment of the optical fiber, the target performance of the optical elements within the IO-MEMS portions of the PIC may require additional processing and design to achieve the desired performance. This may arise from pattern dependent stress of the optical waveguide portion of the IO-MEMS such that, for example, deflection of the IO-MEMS suspended portion 2080 varies according to the design of the optical waveguide(s) atop it, be they 3D or two-dimensional (2D or planer) waveguides or combinations thereof. Accordingly, the inventors have established what they refer to as Compensated Cavity Silicon-on-Insulator (C-CSOI). This being depicted in FIG. 20 via first and second images 2000A and 2000B respectively which are cross-sections of the initial starting wafer and processed integrated optics microelectromechanical system (IO-MEMS) device according to embodiments of the invention. Considering first image 2000A then the starting wafer comprises substrate 2030, lower thermal oxide 2040, BOX 2020, and thick silicon 2010 with opening 2050 in common with the opening 1950 in the CSOI design depicted in FIG. 19. However, the bottom surface of the thick silicon 2010 has first and second regions 2060A and 2090A deposited with the same waveguide structures as are deposited in the upper surface of the thick silicon 2010 as depicted in second image 2000B within the IO-MEMS region 2080 and fixed waveguide region 2070. The fixed waveguide region 2070 also comprising waveguides 2095 in regions with underlying BOX 2020 and substrate 2030. Optionally, within alternate embodiments of the C-CSOI process the first and second regions 2060A and 2090A respectively on the lower side of the SOI structure device layer silicon 2010 serving as the mechanical support of the IO-MEMS 2080 may also be formed with a variant of the design depicted in FIG. 16 albeit with the processing limitations and complexities of forming the required layer structures with or without either low resolution or high resolution patterning at the bottom of a deep recess formed by the etched substrate.

Accordingly, the C-CSOI design methodology exploits providing a back surface layer structure which is the mirrored structure deposited atop the top surface such that the first and second regions 2060A and 2090A respectively on the lower side of the IO-MEMS SOI structure device layer 2010 provide a compensation for the corresponding third and fourth regions 2060B and 2090B on the upper side of the thick silicon 2010. Accordingly, the opening 2050 during processed is filled with a filler and then processed to deposit the layer stack and pattern the first and second regions 2060A and 2090A prior to patterning and the IO-MEMS SOI structure device layer 2010. Then the upper surface processed to form the third and fourth regions 2060B and 2090B as part of forming the IO-MEMS region 2080 and fixed waveguide region 2070. Subsequently when the thick silicon 2010 is etched to form the IO-MEMS (and/or MEMS) then the filler can be removed thereby releasing the IO-MEMS (and/or MEMS) which have the first and second regions 2060A and 2090A respectively on the lower side of the IO-MEMS SOI structure device layer 2010 in the IO-MEMS region 2000 and fixed waveguide region 2070.

Within the descriptions in respect of FIG. 20, the process flow described considers the first and second regions respectively formed on the lower side of the thick silicon to have been formed through a process exploiting a sacrificial filler within the opening.

Figure 21:
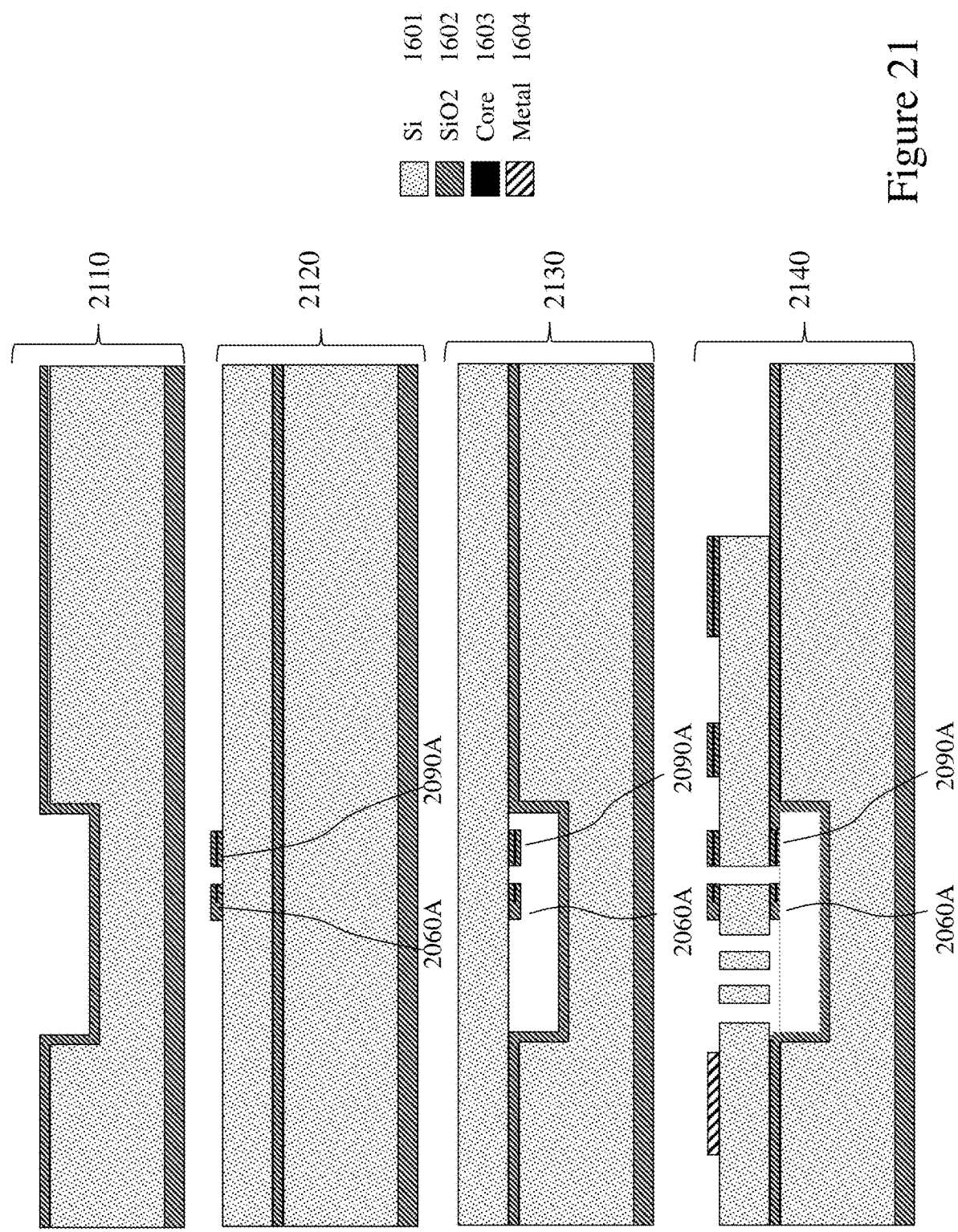
FIG. 21 depicts an exemplary cross-section of processed IO-MEMS device according to an embodiment of the invention for cavity based compensated designs with fiber interface.

Referring to FIG. 21 there is depicted an alternate process exploiting multiple silicon handling wafers to form the base Cavity SOI substrate. Accordingly, in first image 2110 a first handling wafer comprising the silicon substrate with lower thermal oxide, processed openings, and upper BOX is manufactured. Next a second handling wafer is processed as depicted in second image 2120 comprising a silicon substrate, sacrificial layer and thick silicon layer onto which are deposited the stress compensation structures 2060A and 2090A that will subsequently be within the recess. Accordingly, in third image 2130 the second handling wafer is flipped onto the first handling wafer, bonded to it, and then the substrate of the second handling wafer removed to leave the thick silicon. This is then processed to provide the top waveguide structures, silicon etched to form IO-MEMS and/or MEMS, U-grooves etc. as depicted in fourth image 2140.

There remains an opportunity to implement a pattern-independent naturally balanced suspended portion of the IO-MEMS, which may not need to be stress-compensated. Now referring to FIGS. 22-25 there are depicted vertically symmetric structures for compensated IO-MEMS designs according to embodiments of the invention such as that depicted in FIG. 22 wherein the optical waveguide stack 2290 is embedded between first and second device layers 2295A and 2095B to form structure 2200.

Figure 22:
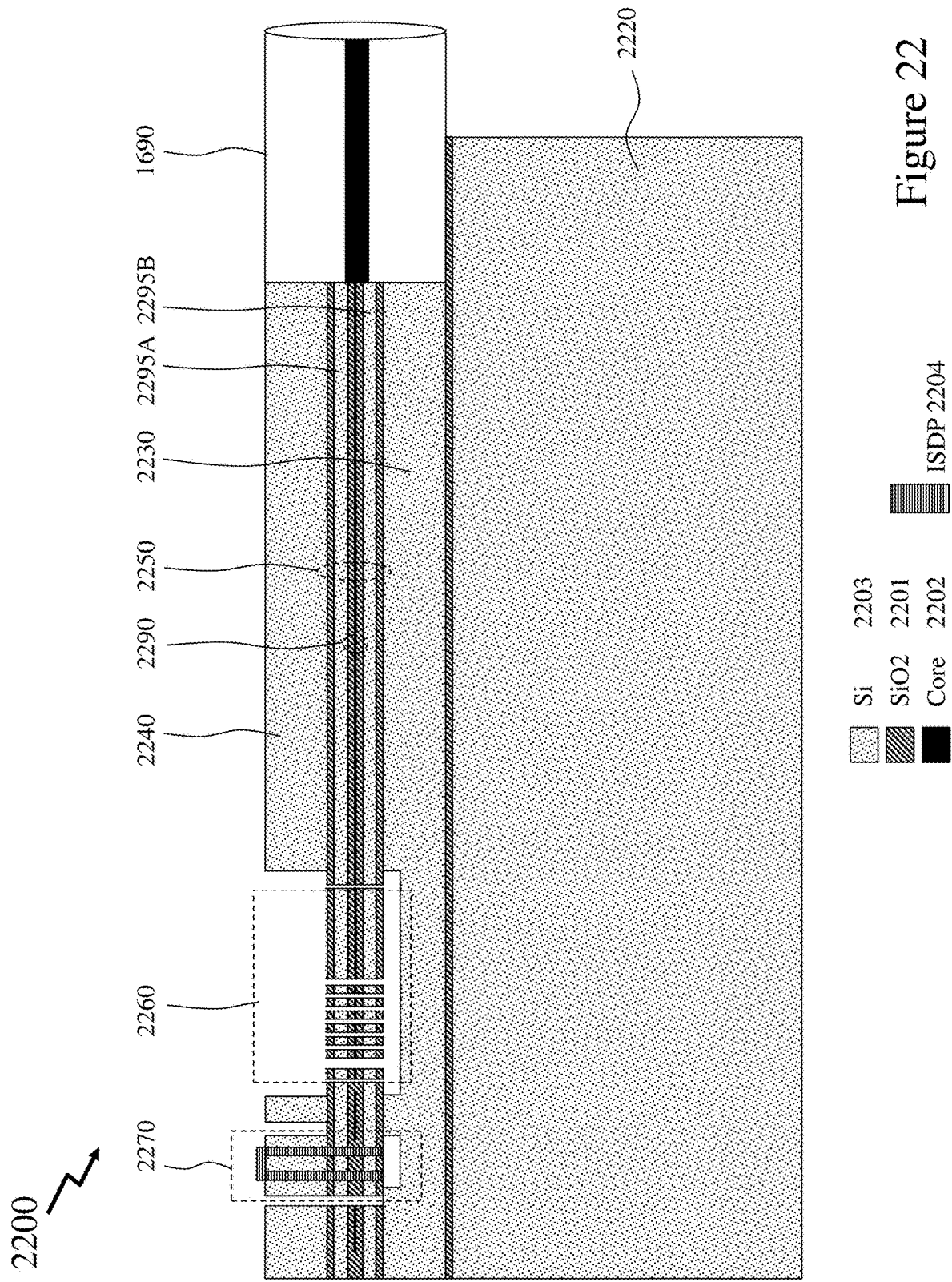
FIG. 22 depicts exemplary cross-sections of initial starting wafers according an embodiment of the invention exploiting vertically symmetric structures for compensated design.

Now referring to FIG. 22 there is depicted an exemplary cross-section of processed integrated optics microelectromechanical system (IO-MEMS) device according to an embodiment of the invention exploiting vertically symmetric structure for compensated design with fiber optic interface wherein the optical waveguide stack 2290 lower cladding-core-upper cladding is embedded between two device layers 2295A and 2295B to form the structure 2250. Either side of the structure 2250 are two thick silicon layers 2230 and 2240 respectively with intervening BOX layers. The structure 2250 forming the mechanical layers within which the IO-MEMS/MEMS suspended structures such as beam 2260 are fabricated. The electrical control signals for the IO-MEMS being routed through vias in via region 2270 electrically joining the device layers 2295A and 2295B of the IO-MEMS. Also depicted in FIG. 22 are the optical fiber 1690 and substrate 2220.

Figure 23:
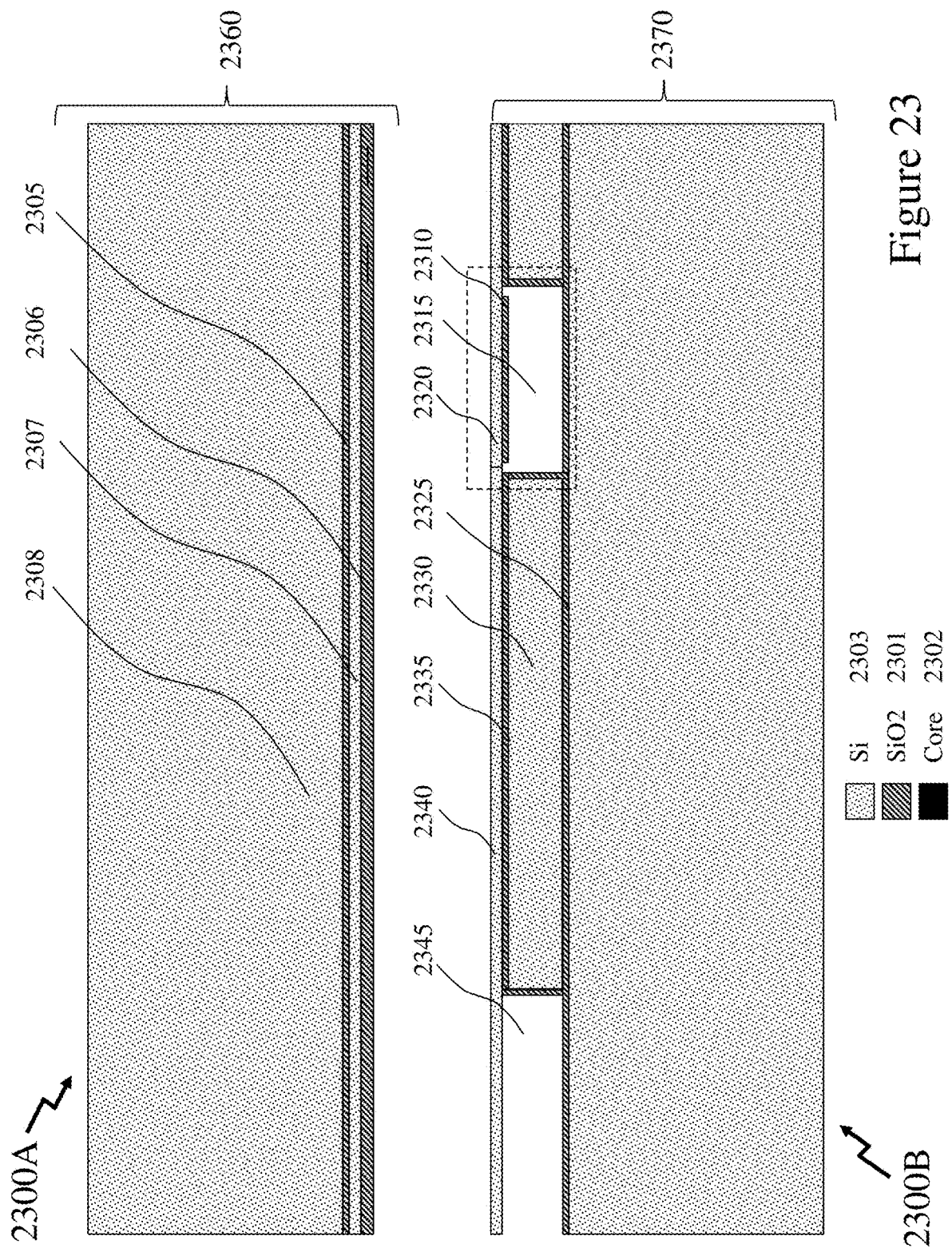
FIG. 23 depicts exemplary cross-sections of initial starting wafers according an embodiment of the invention exploiting vertically symmetric structures for compensated design formed by combining an SOI structure and a double SOI structure with pre-existing cavity incorporating stress compensation material below the top device layer inside the cavity.

In accordance with an embodiment of the invention in FIG. 23, it may also be possible to obtain an equivalent layered structure as illustrated in FIG. 22, by way of either bonding an SOI structure 2360 having received an optical stack material set serving for the patterning of optical waveguides, composed of a bottom clad 2301, a core 2302 and top clad 2301 to a double SOI with cavity structure 2370 having two buried oxide layers 2325 & 2335, a cavity 2315 wherein while forming the cavity in the double SOI structure, a stress compensation layer 2310 is pre-applied matching the stress of the buried oxide layer 2305 from SOI structure 2360. The Double SOI structure with cavity 2370 having a device layer 2320 of the same thickness as the device layer 2307 of SOI structure 2360 such as that upon bonding SOI structure 2360 onto Double SOI structure with Cavity 2370, the structural stack for an IO-MEMS comprises the stress compensation material 2310 below the $2^{nd}$ device layer 2320, the device layer 2320, the optical stack material set 2306, the device layer 2307 of the SOI structure 2360 and the buried oxide 2305 of SOI structure 2360. Further, it is desirable to omit placing the stress compensation stack 2310 in areas of the Double SOI with Cavity 2370 for cavities 2345 which may be used for purposes such as optical fiber attach (not shown) instead of for IO-MEMS. After the bonding is performed, the handle portion of SOI structure 2360 is subsequently removed such that the buried oxide 2305 forms the top surface of the IO-MEMS.

Figure 24:
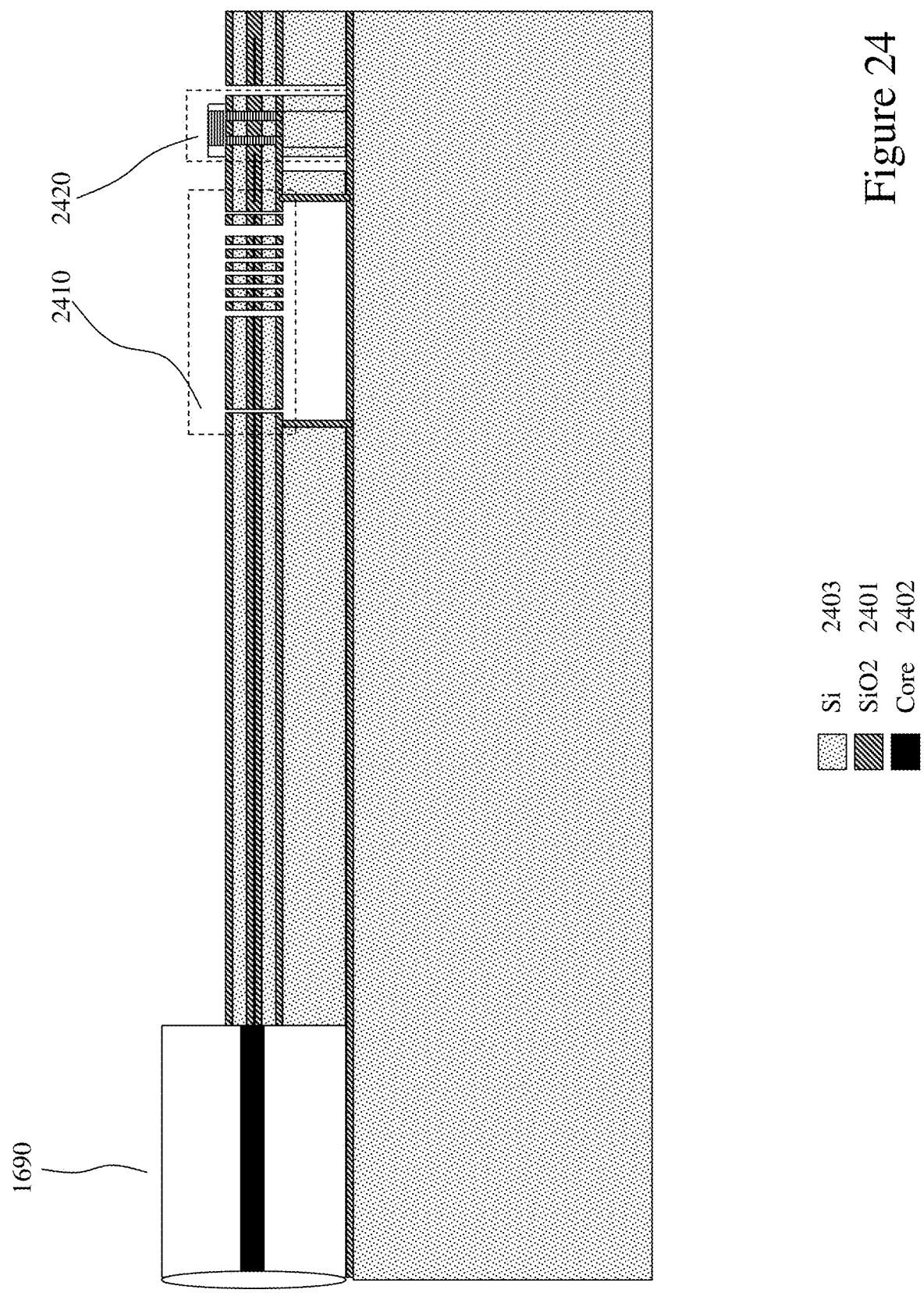
FIG. 24 depicts exemplary cross-sections of processed IO-MEMS device exploiting vertically symmetric structure for compensated design based on use of cavity SOI substrates with two device layers separated by two buried oxide layers without an optional cap.

FIG. 24 illustrates a cross-section of an IO-MEMS formed from the bonding of SOI structure 2360 and Double SOI structure with Cavity 2370 upon having removed the handle portion of SOI structure 2360 showing optical fiber 1690 resting in cavity 2345 of FIG. 23 and IO-MEMS 2410 resting over cavity 2315 of FIG. 23. FIG. 24 also illustrates the electrically conductive via 2420 connecting the two device layers 2307 of SOI Structure 2360 and 2340 of Double SOI structure with Cavity 2370 of FIG. 23. Beneficially, the design depicted in FIG. 24 maintains a symmetric vertical structure around the optical waveguide throughout the entire waveguide of the IO-MEMS 2410 which is functionally equivalent to that of IO-MEMS 2260 of FIG. 22.

Figure 25:
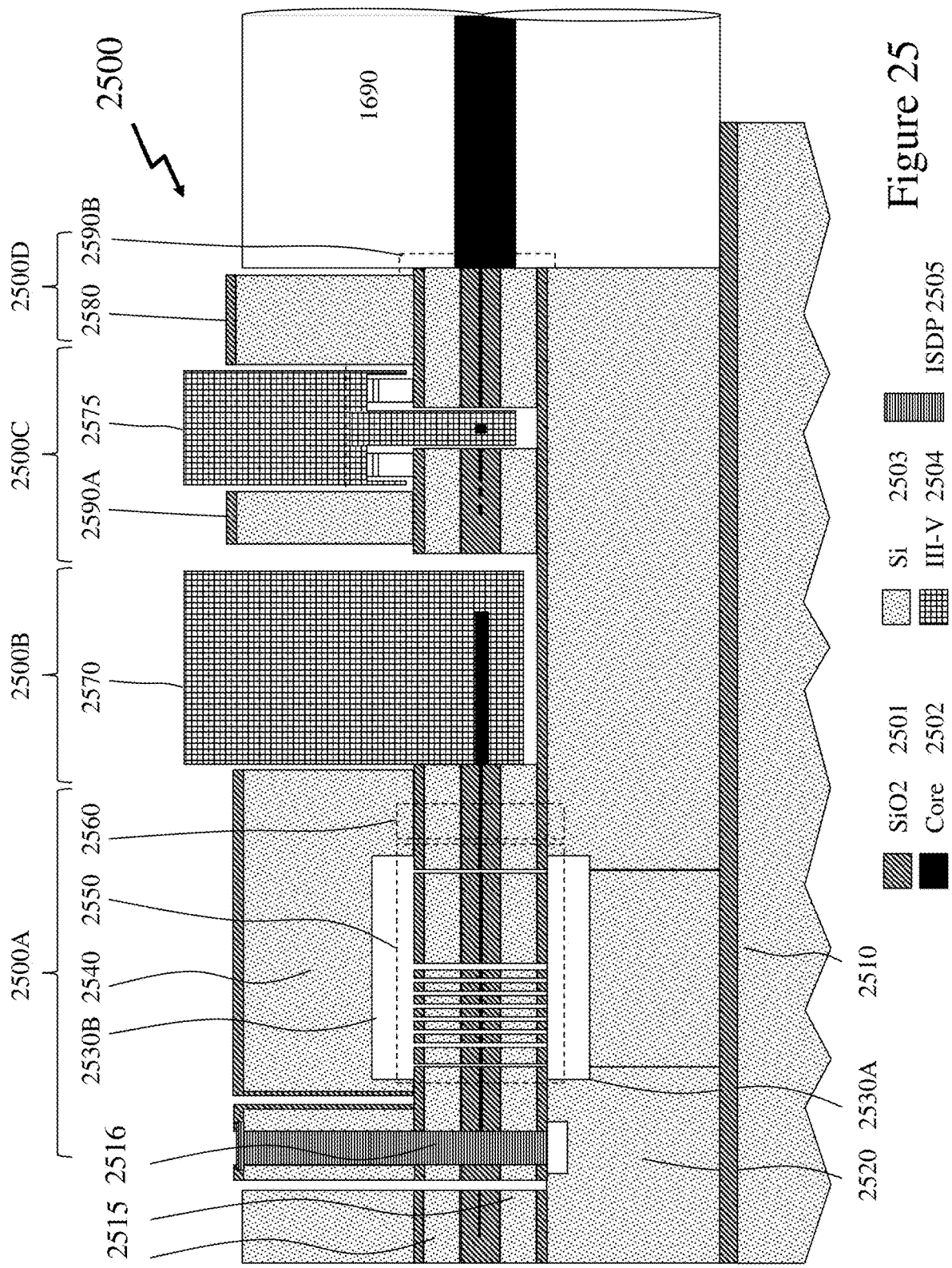
FIG. 25 depicts exemplary cross-section of processed IO-MEMS device exploiting vertically symmetric structure for compensated design with a fiber optic interface and active semiconductor device integration according to an embodiment of the invention.

Referring to FIG. 25 there is depicted an exemplary cross-section of processed IO-MEMS device according to an embodiment of the invention exploiting vertically symmetric structure for compensated design with fiber optic interface and active semiconductor device integration. The underlying concept of the design being that depicted in FIG. 22 but extended to include active semiconductor device integration. Accordingly, the PIC 2500 depicted comprises an IO-MEMS 2300A, waveguide photodetector 2500B, semiconductor optical amplifier 2500C and fiber interface 2500D wherein the PIC is coupled to an optical fiber 1690. Accordingly, the PIC comprises in vertical sequence:

Substrate 2510
Lower thick silicon 2520 within which first recess 2530A is formed;
Symmetric optical structure 2590A comprising waveguide stack 2580 disposed between upper and lower silicon layers; and
Upper thick silicon 2540 within which second recess 2530B is formed
Electrically conductive material such as ISDP 2505 in the via 2516 to connect the two silicon layers 2515 A and 2515B of IO-MEMS 2550.

The PIC comprising multiple regions of the waveguide. These being, IO-MEMS 2550; suspended waveguide 2560, e.g. a beam of an actuator; and fiber interface region 2590B. Due to the symmetric structure of the lower and upper thick silicon 2520 and 2540 respectively the first and second recesses 2530A and 2530B provide encapsulation of the IO-MEMS 2550.

Figure 26:
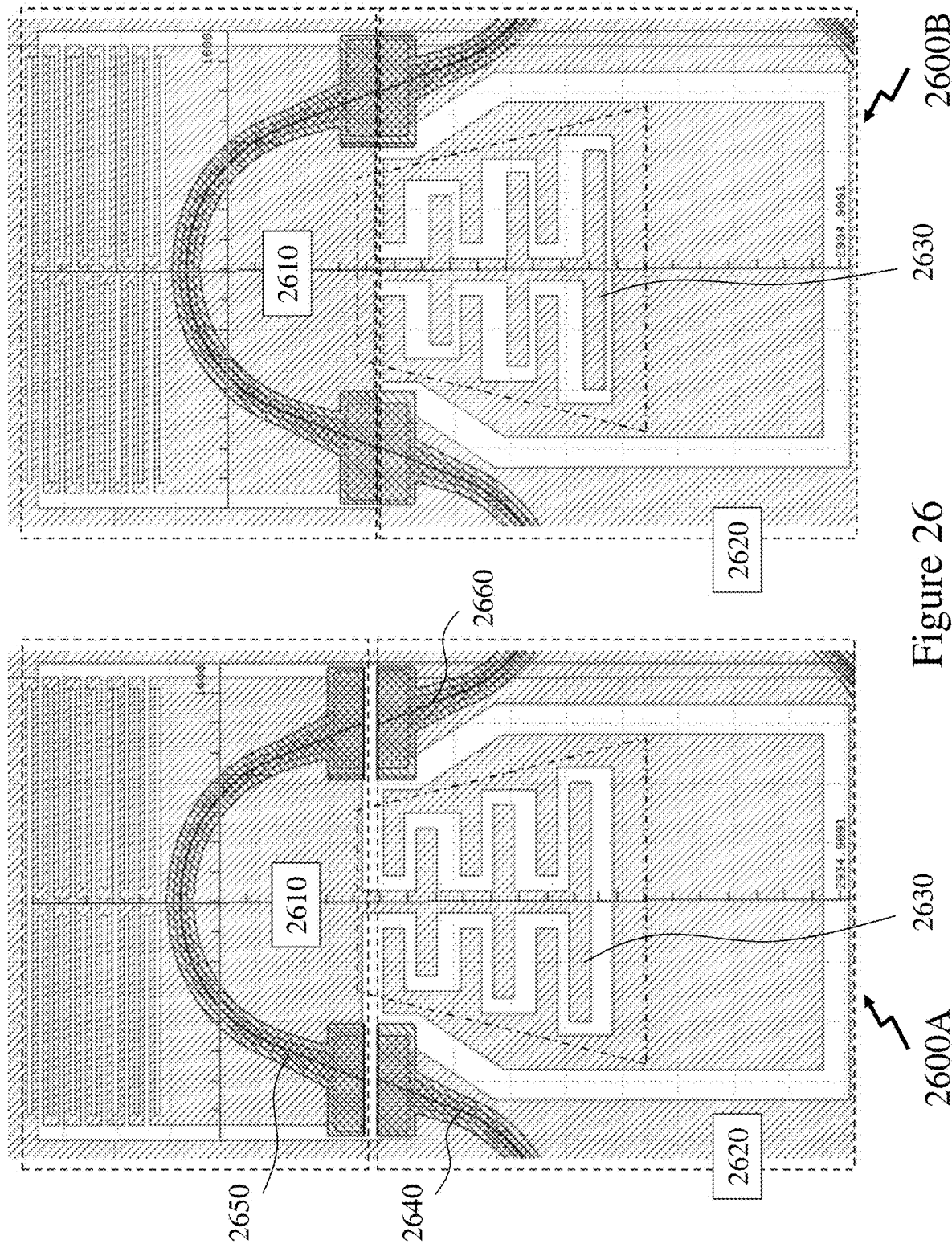
FIG. 26 depicts schematics of a 1xi on/off IO-MEMS optical switch (optical gate) according to an embodiment of the invention in closed and open configurations.

Now referring to FIG. 26 there are depicted first and second schematics 2600A and 2600B of a 1xi on/off IO-MEMS optical switch (fully reconfigurable optical gate or FROG) according to an embodiment of the invention in closed and open configurations respectively. As depicted in first schematic 2600A the first movable portion 2610 of the FROG is in a first position relative to the second non-movable portion 2620 such that the optical waveguide portions on each are not optically coupled to each other such that the FROG is "open" and the on-off switch is thus in "off" state where light doesn't come across the FROG. Motion of the first movable portion 2610 relative to the second non-movable portion 2620 being controlled by the MEMS actuator 2630. Accordingly, optical signals do not propagate from the input waveguide 2640 upon the second non-movable portion 2610 to the waveguide 2650 upon the first movable portion 2610. Any residual optical signals which do couple through the now misaligned coupling interface between the input waveguide 2640 and waveguide 2650 are similarly attenuated further by the now misaligned coupling interface between the waveguide 2650 and the output waveguide 2660.

As depicted in first schematic 2600B the first movable portion 2610 of the FROG is in a second position relative to the second non-movable portion 2620 such that the optical waveguide portions on each are optically coupled to each other such that the FROG is "closed." Motion of the first movable portion 2610 relative to the second non-movable portion 2620 being controlled by a MEMS actuator 2630. Accordingly, optical signals propagate from an input waveguide 2640 upon the second non-movable portion 2610 to a waveguide 2650 upon the first movable portion 2610 and therein back to an output waveguide 2660 upon the second non-movable portion 2620.

Accordingly, the FROG provides for an optical gate when the MEMS actuator 2630 is driven from a first position (such that the first movable portion 2620 and second non-movable portion 2610 are not in contact with another under action of the MEMS actuator 2630 in one direction) where optical signals do not pass through the optical gate to a second position (such that the first movable portion 2620 and second non-movable portion 2610 are now in contact with another under action of the MEMS actuator 2630 in an opposite second direction) where optical signals pass through the optical gate. It would be apparent to one of skill in the art that at intermediate positions between contact and furthest motion of the MEMS actuator 2630 moving the first movable portion 2610 to its furthest point away from the second non-movable portion 2620 optical signals may pass through the optical gate albeit attenuated. Accordingly, as it would be also evident to one skilled in the art, the FROG structure may also within embodiments of the invention provide for a variable optical attenuator, which may be further enhanced as a variable optical attenuator by replacing the MEMS actuator from one which works in pull-in to one which is linear.

Referring to the first and second schematics 2600A and 2600B of FIG. 26, the authors refer to the angle of incidence as that measured between a normal to the facet and the routing of the waveguide on the first movable portion 2610. However, in instances where only an optical gate (on-off switch) functionality is required then the inventors have further extended the FROG concept by establishing that the angle at which the optical waveguides are aligned to the facets of the first movable portion and the second non-movable portion should meet a predetermined condition as outlined below.

Figure 27:
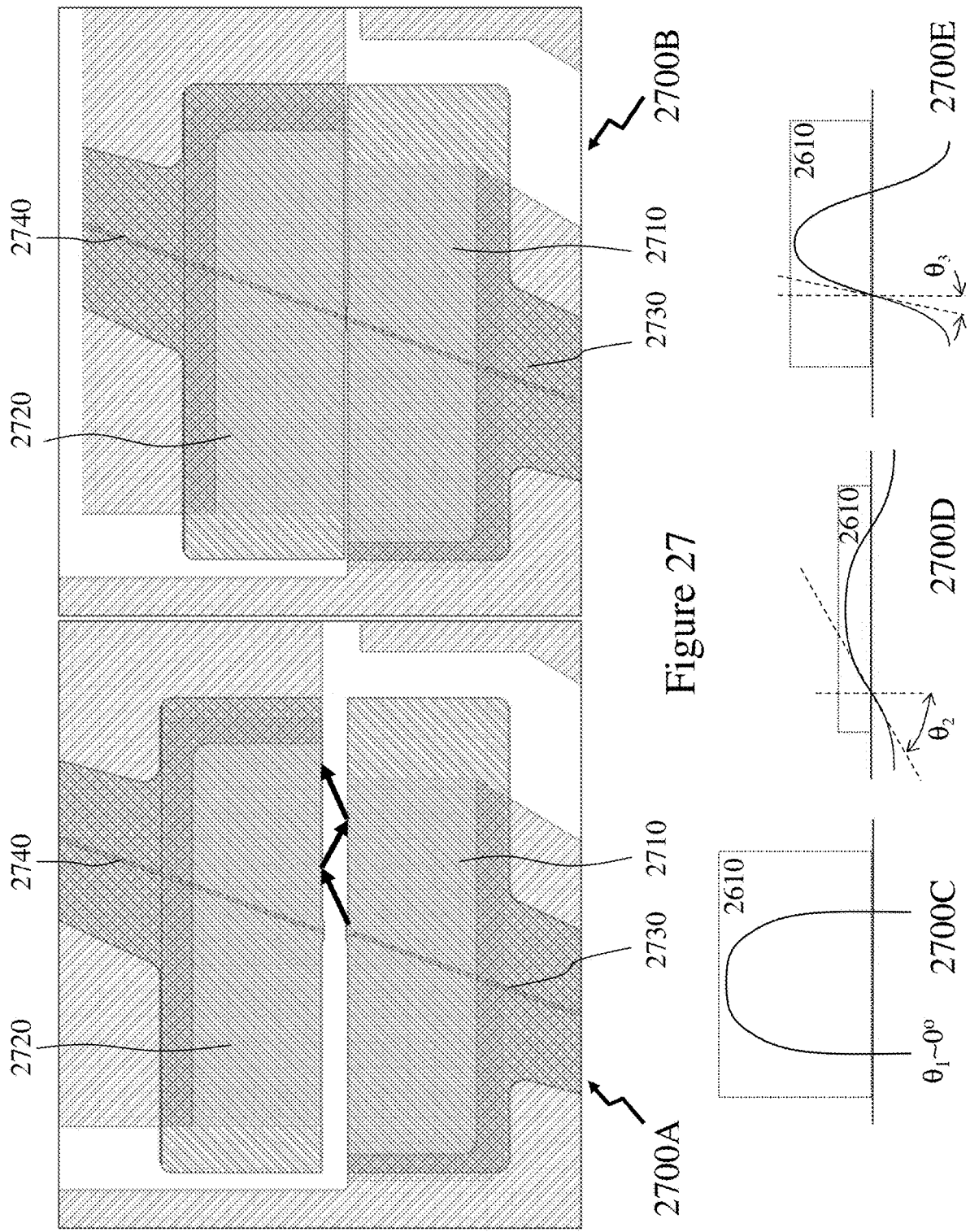
FIG. 27 depicts expanded schematics of the waveguide interfaces at the edges of the moving and non-moving portions of the IO-MEMS optical gate as depicted in FIG. 26 in open and closed configurations.

Now referring to FIG. 27 there are depicted expanded first and second schematics 2700A and 2700B of the waveguide interfaces at the edges of the moving and non-moving portions of the IO-MEMS optical gate as depicted in FIG. 26 in open and closed configurations respectively. Accordingly, as depicted in first schematic 2700A for the "open" configuration optical signals propagating from a first waveguide 2730 upon a first non-movable portion 2710 of the FROG may be prevented from coupling to a second waveguide 2740 upon the second movable portion 2720 of the FROG at an angle exceeding the total reflection angle of the air-waveguide interface such that the optical signals from the first waveguide 2730 naturally diverge in the open gap and either do not couple into waveguide 2740 or couple with a large degree of attenuation. However, as depicted in second schematic 2700B when the first non-movable portion 2710 and second movable portion 2720 are brought into physical contact the optical signals propagate from the first waveguide 2730 to the second waveguide 2740.

Referring to FIG. 27, in the "open" configuration as depicted in first schematic 2700A then as the angle of incidence is increased from $\theta_1 \sim 0°$ in third schematic 2700C to $\theta_1 > 0°$ in fourth schematic 2700D, then the input and output waveguides 2640 and 2660 respectively are increasingly parallel to the facet which results in the waveguide on the suspended platform 2650 having to turn through a reduced angle. This increasingly results in divergence of optical signals propagating in the air gap in the "open" state as well reflection of these optical signals from opposite facets of the opposite platform, e.g. the moving portion 2720 when the optical signals are coupled from the non-moving portion 2710 or the non-moving portion 2710 when the optical signals are coupled from the moving portion 2720. However, as depicted in the third schematic 2700C, where this angle is close to zero, undesirable reflections at the facets result in optical signals coupling back. For example, from first waveguide 2730 back into first waveguide 2730 may occur given either the air gap in "open" state, or any residual air gap in the "closed" state, as may arise for example from the etch profile of the optical facets of the second waveguide 2740 on the moving portion 2720 despite it making contact with the optical waveguide 2710 on the non-moving portion 2720. Alternatively, to suppress such back-reflections, it would be evident to one skilled in the art that the application of anti-reflective coatings on the facets may achieve a similar objective albeit at the expense of additional processing steps.

Referring to FIG. 27, when the FROG is an 'off' state, in the presence of an open air gap, the selection of an increased angle of incidence of the waveguides relative to the facets may reduce the overall extent of the waveguide 2650 on the first movable portion 2610 as demonstrated by the large size of the first movable portion 2610 in third image 2700C which is further reduced to the greatest extent in fourth schematic 2700D as the angle $\theta_2$ is increased to or beyond the critical angle of refraction, which is approximately 42° when the effective refractive index of the facet is 1.5. As the angle of incidence approaches 42 degrees when the effective index is 1.5, this reduces or prevents the divergence of optical signals launched from the waveguide 2730 in the open air gap and would cause back reflections from first waveguide 2730 back into the first waveguide 2730 or unwanted coupling from first waveguide 2730 into second waveguide 2740.

Therefore, the inventors have established a predetermined angle $\theta_3$ as depicted in fifth schematic 2700E which balances tradeoffs between several design objectives. A first design objective being minimizing the overall extent of the optical waveguide on the movable portion of the FROG. A second design objective being to maximize the optical loss of optical signals launched from the first waveguide 2730 to the second waveguide 2740 in the "open" or "off" state i.e. to have these optical signals terminate in the open gap and thus minimally couple into the second waveguide 2740. A third design objective being minimizing the return loss of optical signals incoming on first waveguide 2730 returning into first waveguide 2730. A fourth design objective may be of avoiding use of anti-reflective coatings on the optical facets of the non-movable portion 2710 and movable portion 2720 facing the air gap. A fifth design objective may be to remove the requirement for anti-reflective coatings on the facets in the presence of a possible residual air gaps stemming from the etching profile of the optical facets of non-movable portion 2710 and movable portion 2720. In fourth schematic 2700D the waveguides have a large angle of incidence, $\theta_2$, above the critical angle of refraction. The predetermined angle, $\theta_3$, for achieving the requisite tradeoffs between the design objectives is depicted in fifth schematic 2700E in FIG. 27 such that $\theta_3$<critical angle of refraction. The exact value of $\theta_3$ being established in dependence upon the subset of the design objectives being optimized.

It would also be evident, referring to FIG. 26, that the angle of the input and output waveguides 2640 and 2660 could also be different, such as to allow for, for example, a large angle of incidence to be employed from the input waveguide to the waveguide on the movable portion and a small angle of incidence from the waveguide on the movable portion to the output waveguide. Alternatively, the reverse configuration may be employed.

Figure 28:
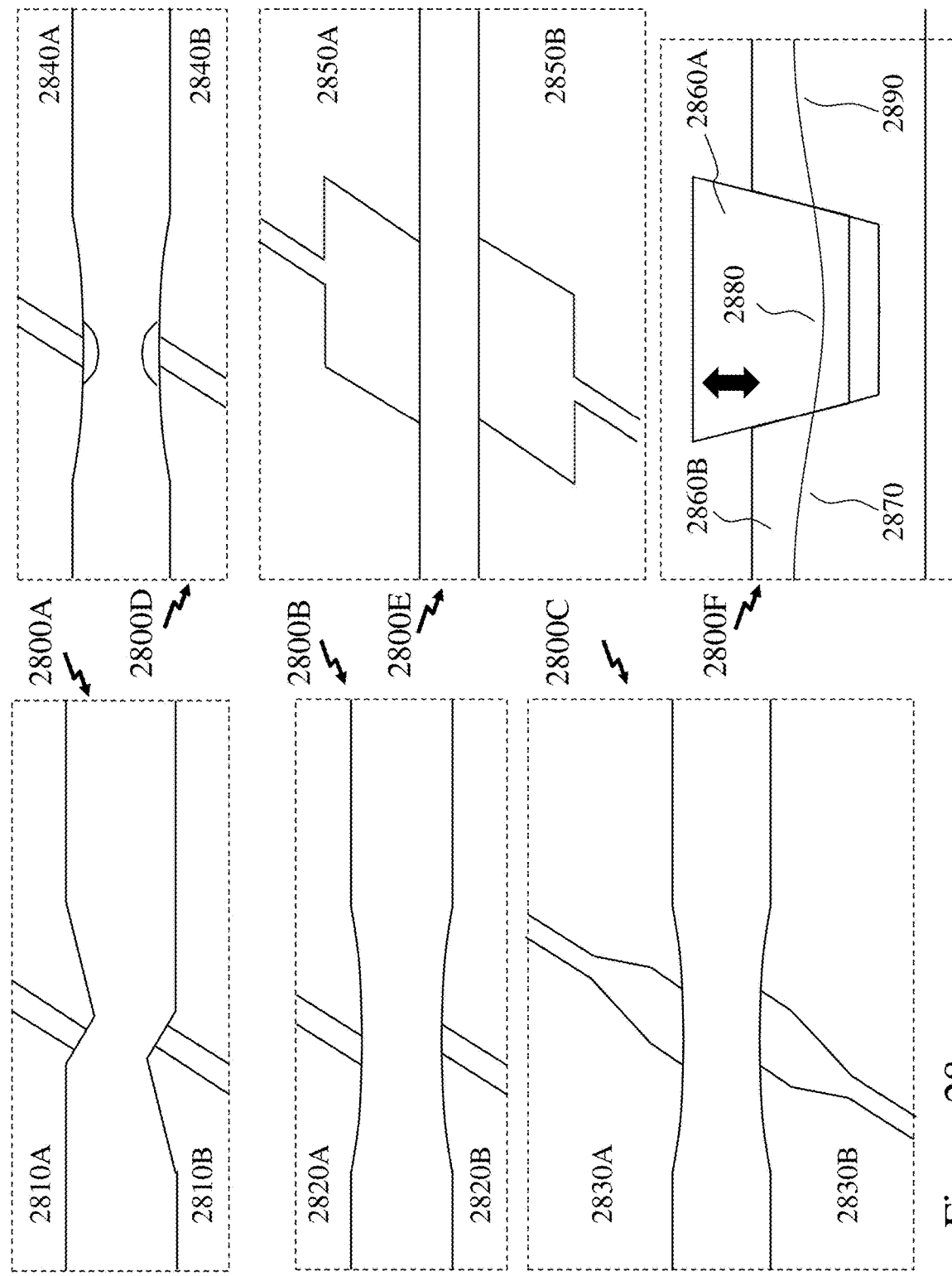
FIG. 28 depicts expanded schematics of the waveguide interface variants at the edges of the moving and non-moving portions of the IO-MEMS optical gate as depicted in FIG. 26 in open and closed configurations together with an alternate waveguide and MEMS platform configuration.

Now referring to FIG. 28 there are depicted expanded schematics of the waveguide interface variants at the edges of the moving and non-moving portions of the IO-MEMS optical gate as depicted in FIGS. 26 and 27 respectively in open configurations. Accordingly, there are depicted:

First schematic 2800A with facets 2810A and 2810B respectively each having an angled projecting portion with linear waveguide-facet intersection with a constant width optical waveguide either side;

Second schematic 2800B with facets 2820A and 2820B respectively having a curved waveguide-facet intersection with a constant width optical waveguide either side;

Third schematic 2800C with facets 2830A and 2830B respectively having a curved waveguide-facet intersection with a constant width optical waveguide either side but employing spot size converters in the shape of tapers (expanding the waveguide core width) or inverse tapers (reducing the waveguide core width) to improve the coupling performance by increasing the optical mode size, near the interface;

Fourth schematic 2800D with facets 2840A and 2840B respectively having a curved waveguide-facet intersection with a constant width optical waveguide either side but employing micro-lenses formed upon the facets;

Fifth schematic 2800E with facets 2850A and 2850B respectively having a straight waveguide-facet intersection wherein the optical waveguides either side are coupled via a multimode interference (MMI) coupler split across the coupling interface and formed upon gap closing, allowing for increased coupling performance across the interface.

Also depicted in FIG. 28 in sixth schematic 2800F is an alternate geometry for an optical gate such as the FROG described and depicted above in respect of FIGS. 26 and 27 respectively. As depicted an input waveguide 2870 is formed upon the non-moving portion 2860B of the structure as is an output waveguide 2890. A gate waveguide 2880 is formed upon the moving portion 2860A of the structure. Accordingly, movement of the moving platform 2860A translates the gate waveguide 2880 into or out of alignment with the input waveguide 2870 and output waveguide 2890. Such an optical gate may be typically manufactured in the "open" state wherein actuation of a MEMS actuator coupled to the moving platform 2860A translates the gate waveguide 2880 into alignment such that the gate is "closed" and optical signals pass through. Beneficially, this configuration allows for the input waveguide 2870, gate waveguide 2880, and output waveguide 2890 to be straight or have low angular offsets as the angle of incidence of the optical waveguides with the facets are now defined by the angles placed upon the facets within the structure relative to the optical waveguides rather than requiring the optical waveguides to bend to the required angle of incidence. Whilst the configuration depicted in sixth schematic 2800F in FIG. 28 depicts curved waveguides these may be straight within other embodiments of the invention.

It would be evident that other coupling structures may be employed including directional couplers, zero gap directional couplers, meta lenses formed within the waveguide core etching profile, meta-material couplers, suspended spot size converters whereas the optical mode would be large enough to couple into the substrate below the bottom clad for the substrate not removed below the bottom clad under the spot size converter, etc. all without departing from the scope of the invention. Within embodiments of the invention an optical gate such as described and depicted within FIGS. 26 to 28 may be designed to be "open" such that actuation of the MEMS actuator is required to close the optical gate. Within other embodiments of the invention an optical gate such as described and depicted within FIGS. 26 to 28 may be designed to be "closed" such that actuation of the MEMS actuator is required to open the optical gate. Within other embodiments of the invention the optical gate such as described and depicted within FIGS. 26 to 28 may be designed to be "open", but not full open such that actuation of the MEMS actuator is required to either close the optical gate or open the optical gate fully.

Figure 29:
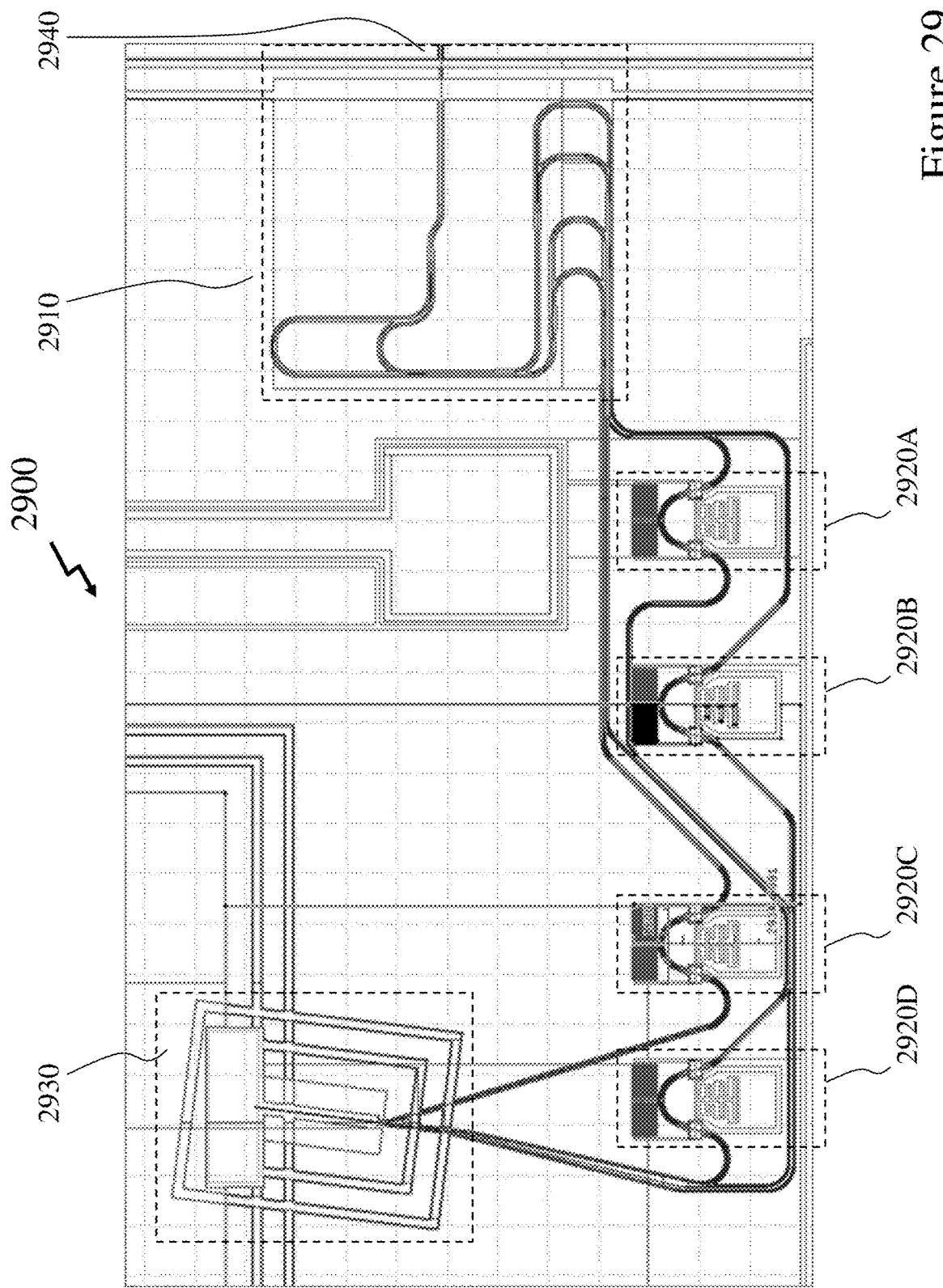
FIG. 29 depicts a 4 channel wavelength selective IO-MEMS optical receiver according to an embodiment of the invention employing IO-MEMS optical gates upon the outputs of a 4 channel wavelength demultiplexer.

Now referring to FIG. 29 there is depicted a 4-channel wavelength selective IO-MEMS optical receiver 2900 according to an embodiment of the invention employing IO-MEMS optical gates upon the outputs of a 4-channel wavelength demultiplexer (DMUX) 2910. As depicted an input waveguide 2940 is coupled to a 4-channel DMUX 2910 which provides 4 wavelength demultiplexed outputs which are each coupled to a single photodetector 2930 via first to fourth MEMS actuated optical gates 2920A to 2920D respectively. Accordingly, where the optical gates are designed to be normally open then closing only one of the first to fourth MEMS actuated optical gates 2920A to 2920D respectively through actuation of its actuator results in the associated wavelength from the 4-channel DMUX 2910 being coupled to the photodetector 2930. Alternatively, if the optical gates are normally closed then opening all of the other gates other than the one desired is undertaken.

Figure 30:
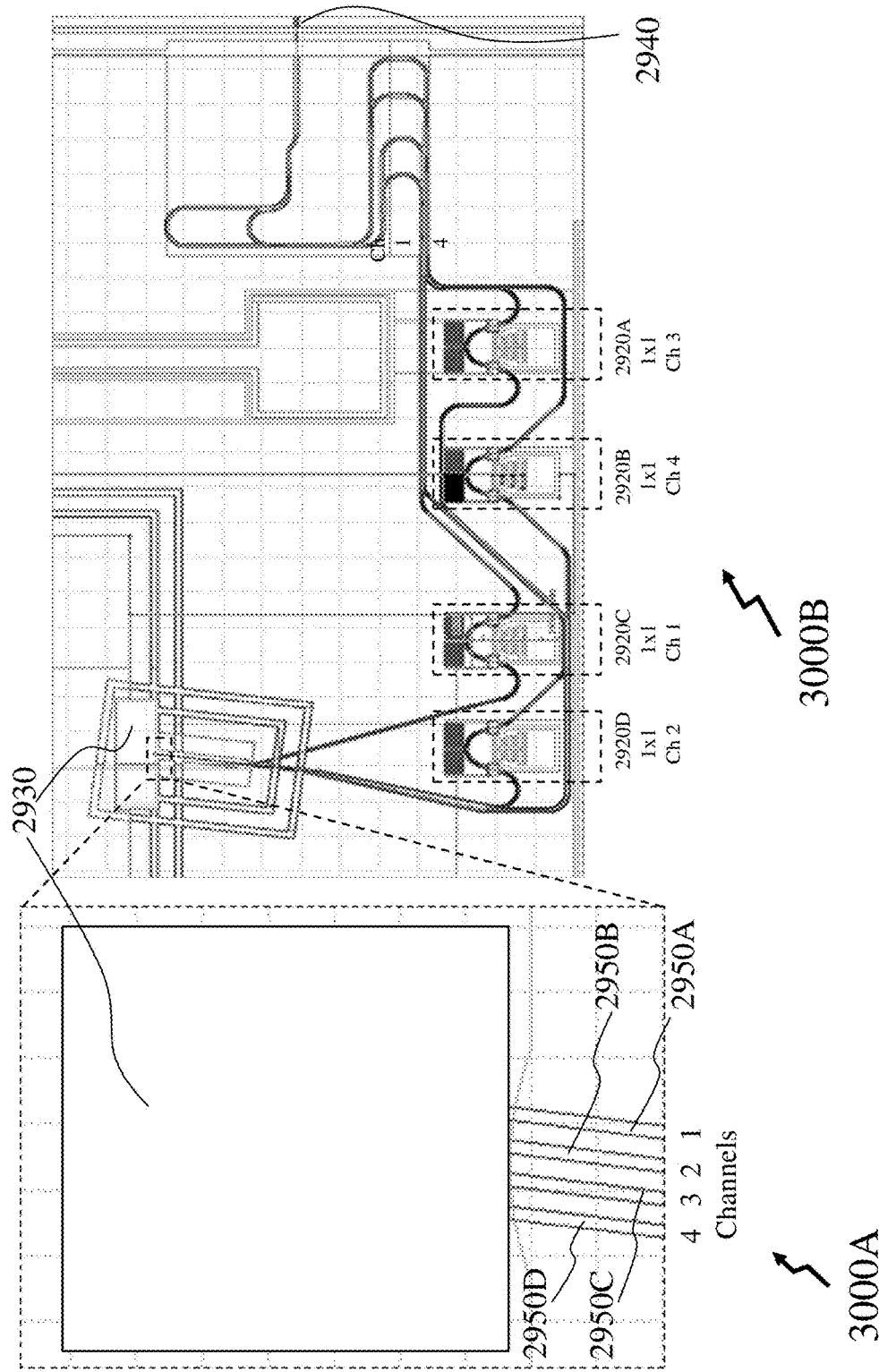
FIG. 30 depicts an expanded view of the 4 channel wavelength selective IO-MEMS optical receiver as depicted in FIG. 29 according to an embodiment of the invention with a single photodetector coupled to the outputs of the IO-MEMS optical gates upon the outputs of the 4 channel wavelength demultiplexer.

Referring to FIG. 30 there is depicted in first image 3000A an expanded view of the photodetector portion of the 4-channel DMUX of which a portion is depicted within the schematic in second image 3000B. As depicted within second image 3000B:

the first MEMS actuated optical gate 2920A is coupled to channel 3 of the DMUX;

the second MEMS actuated optical gate 2920B is coupled to channel 4 of the DMUX;

the third MEMS actuated optical gate 2920C is coupled to channel 1 of the DMUX; and the fourth MEMS actuated optical gate 2920D is coupled to channel 2 of the DMUX.

As depicted in first image 3000A first to fourth channel waveguides 2950A to 2950D respectively couple to the single p-i-n photodetector 2940 which are coupled to channels 4, 3, 2, and 1 respectively of the 4-channel DMUX. Optionally, each of the first to fourth channel waveguides 2950A to 2950D could be coupled to a discrete photodetector, e.g. 4 photodiodes for the 4 channels of the 4-channel wavelength selective IO-MEMS optical receiver or these may be paired to a pair of photodiodes, e.g. 2 photodiodes for the 4 channels of the 4-channel wavelength selective IO-MEMS optical receiver.

It would be evident within other embodiments of the invention the number of channels within the DMUX may be varied, for example 8, 16, 20, 24, 40 and 48 etc. whilst one or more photodetectors may be employed where with multiple photodetectors each photodetector is coupled to a predetermined subset of the outputs of the DMUX. Optionally, an optical gate may be disposed upon the input of the DMUX disabling the circuit optically. Within other embodiments of the invention the optical gates may be employed in conjunction with a wavelength multiplexer (MUX) in order to block inputs of the MUX and/or the output of the MUX.

Within embodiments of the invention described above in respect of FIGS. 1 to 30 optical waveguides have been described with respect to guiding, routing etc. optical signals within integrated optical (photonic integrated) circuits (IO circuits or PICs). Within FIG. 15 the optical waveguides are described and depicted as comprising a silicon nitride ($Si_xN_y$, $Si_3N_4$ or SiN) core with silicon dioxide (silica) cladding (shown as upper and lower cladding in the cross-section of FIG. 15). Within FIGS. 16 to 25 the waveguides are described and depicted as comprising a core, e.g. silicon nitride, with silica cladding. Accordingly, a typical manufacturing sequence for such $SiO_2$—$Si_3N_4$—$SiO_2$ waveguides according to the prior art may comprise depositing an initial lower SiO2 cladding, depositing and patterning the $Si_3N_4$ core, and then depositing the upper $SiO_2$ cladding. Accordingly, etching of the silicon nitride core using processes such as wet etching (e.g. phosphoric acid, orthophosphoric acid or ethylene glycol ($HOCH_2CH_2OH$)-acetic acid ($CH_3COOH$)-nitric acid ($HNO_3$)-ammonium fluoride ($NH_4F$) mixture) or plasma etching (e.g. $CF_4/H_2$, $CF_4/O_2/N_2$, $SF_6/O_2/N_2$, $SF_6/CH_4/N_2$, $SF_6/CH_4/N_2/O_2$ for example) is undertaken to define the three-dimensional (3D) optical waveguides (also known as channel waveguides). The resulting 3D waveguides have a side-wall roughness and a surface roughness which due to the high index contrast of the silicon nitride ($n_{\lambda=1550\ nm}$~2.463) to the silicon dioxide ($n_{\lambda=1550\ nm}$~1.443) results in significant optical scattering from the sidewalls resulting in increased propagation loss.

Within the prior art approaches to reducing the surface roughness of the silicon nitride cores have included:
- a modified Damascene reflow process, see for example Pfeiffer et al. "Ultra-Smooth Silicon Nitride Waveguides based on the Damascene Reflow Process: Fabrication and Loss Origins" (Optics, Vol. 5, No. 7, pp 884-892, July 2018);
- multi-step high temperature (1150° C.) extended duration annealing processes for lower cladding, core and upper cladding, see for example Dupont "Low loss Silicon Nitride Waveguides for Photonic Integrated Circuits" (Master Thesis, Ecole Polytechnique Federale de Lausanne, March 2019); and
- a chemical-physical annealing process employing a hydrogen anneal for morphological modification, an oxygen anneal to reduce surface states and a nitrogen anneal to break excess N—H bonds and drive out excess hydrogen, see El Dirani et al. "Ultralow-Loss Tightly Confining Si3N4 Waveguides and High-Q Microresonators" (Optics Express, Vol. 27, No. 14, 30726, October 2019).

Figure 31:
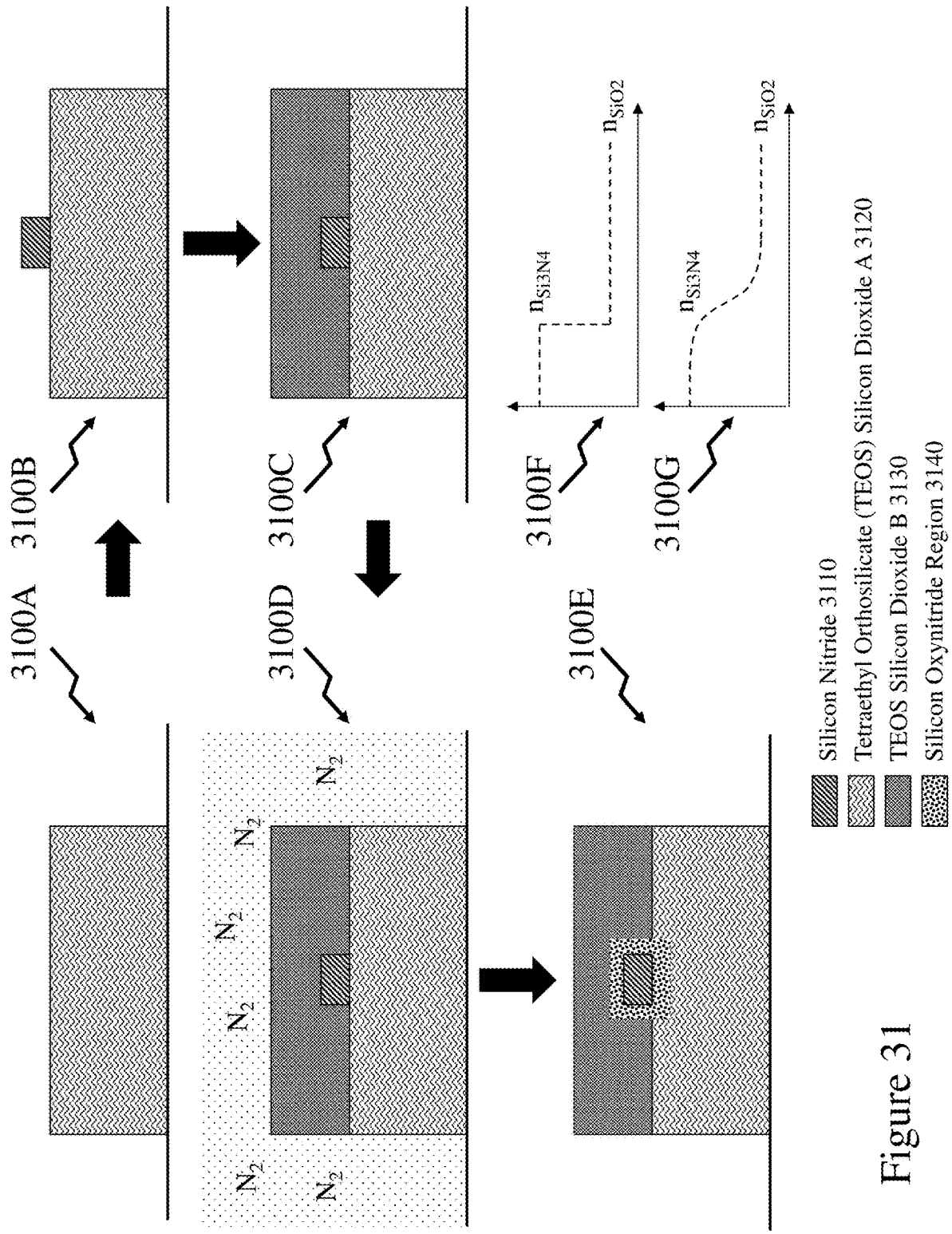
FIG. 31 depicts an exemplary process flow according to an embodiment of the invention with nitrogen annealing of the cladding silicon dioxide of a silicon dioxide-silicon nitride-silicon dioxide waveguide structure.

However, the inventors have established an alternate manufacturing process which removes the complications of these prior art techniques which aim to directly induce morphological changes in the silicon nitride core as deposited, patterned, and etched. Referring to FIG. 31 there is depicted an exemplary process flow according to an embodiment of the invention exploiting nitrogen annealing of the upper cladding silicon dioxide of a silicon dioxide-silicon nitride-silicon dioxide waveguide structure. As depicted the exemplary process flow comprises first to fifth images 3100A to 3100E respectively comprising:
- First image 3100A wherein a lower silicon dioxide cladding is deposited, such as tetraethyl orthosilicate (TEOS) based Silicon Dioxide A 3120, upon a substrate (omitted for clarity but depicted by the single line under the Silicon Dioxide A 3120);
- Second image 3100B wherein a silicon nitride layer, silicon nitride 3110, is deposited and patterned;
- Third image 3100C wherein an upper cladding is deposited, TEOS based silicon dioxide B 3130 encapsulating the silicon nitride core;
- Fourth image 3100D wherein the structure is exposed to a nitrogen annealing process; and
- Fifth image 3100E which depicts the final waveguide structure.

The nitrogen annealing process results in a silicon oxynitride ($SiO_xN_{1-x}$) region 3140 between the silicon nitride core and the upper cladding, formed from TEOS Silicon Dioxide B 3130, and lower cladding, formed from TEOS Silicon Dioxide A 3120. Whilst the exemplary process depicted in FIG. 31 employs TEOS silicon dioxide it would be evident that other silicon dioxide precursors other than TEOS may be employed including, but not limited to, silane ($SiH_4$) and dichlorosilane ($SiCl_2H_2$) through deposition techniques including, but not limited to, chemical vapour deposition (CVD), plasma enhanced CVD (PECVD), low pressure CVD (LPCVD), metalorganic chemical vapor deposition (MOCVD), photochemical vapor deposition etc. Alternatively, silicon dioxide may be deposited through other techniques such as spin-on glasses (SOG) for example.

Accordingly, referring to sixth image 300F there is depicted the refractive index profile of the $SiO_2$—$Si_3N_4$—$SiO_2$ waveguide at third step 3100C which is equivalent to a prior art $SiO_2$—$Si_3N_4$—$SiO_2$ waveguide which has a step index profile between the refractive index of $Si_3N_4$ in the core and the refractive index of $SiO_2$ in the cladding. In contrast, seventh image 3100G depicts the refractive index profile of the optical waveguide as fabricated according to the exemplary process as depicted in first to fifth images 3100A to 3100E respectively wherein rather than a step index the refractive index profile from the core of the optical waveguide to the cladding exhibits a graded index profile as the material composition varies from silicon nitride, $Si_3N_4$—through silicon oxynitride $SiO_xN_{1-X}$ to silicon dioxide, $SiO_2$. As depicted in fifth image 3100E the silicon oxynitride region 3140 is formed all around the waveguide core. It would be evident that the thickness and composition variation of the silicon oxynitride region around the waveguide core is dependent upon the temperature, time, and environment of the annealing together with aspects of the silicon nitride and silicon dioxide layers including, but not limited to, their composition, impurities, densification, density, porosity and morphology.

Figure 32:
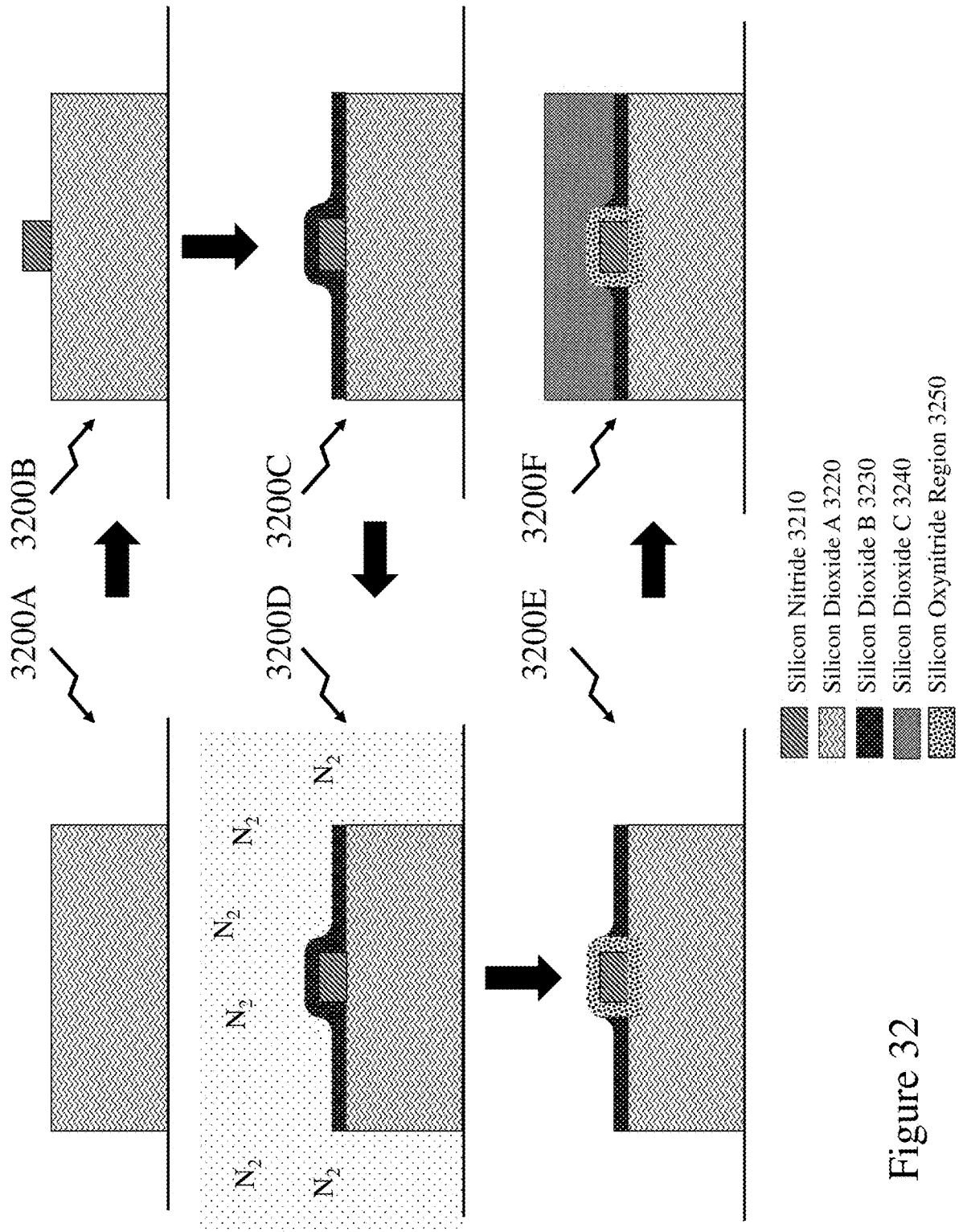
FIG. 32 depicts an exemplary process flow according to an embodiment of the invention with nitrogen annealing of a thin initial silicon dioxide cladding upon the silicon nitride waveguide core during formation of a silicon dioxide-silicon nitride-silicon dioxide waveguide structure.

Now referring to FIG. 32 there is depicted an exemplary process flow according to an embodiment of the invention with nitrogen annealing of a thin initial silicon dioxide cladding upon the silicon nitride waveguide core during formation of a silicon dioxide-silicon nitride-silicon dioxide waveguide structure. As depicted the exemplary process flow comprises first to sixth images 3200A to 3200F respectively, comprising:

First image 3200A wherein a lower silicon dioxide cladding is deposited, such as TEOS based Silicon Dioxide A 3220, upon a substrate (omitted for clarity);

Second image 3200B wherein a silicon nitride layer, silicon nitride 3210, is deposited and patterned;

Third image 3200C wherein a thin first upper cladding is deposited, TEOS based silicon dioxide B 3230 encapsulating the silicon nitride core;

Fourth image 3200D wherein the structure is exposed to a nitrogen annealing process;

Fifth image 3200E which depicts the resulting intermediate waveguide structure; and Sixth image 3200F wherein a second thick upper cladding is deposited, TEOS based silicon dioxide C 3240.

As depicted in fifth and sixth images 3100E and 3100F the silicon oxynitride region 3250 is formed all around the waveguide core. It would be evident that the thickness and composition variation of the silicon oxynitride region around the waveguide core is dependent upon the temperature, time, and environment of the annealing together with aspects of the silicon nitride and silicon dioxide layers including, but not limited to, their composition, impurities, densification, density, porosity and morphology.

Figure 33:
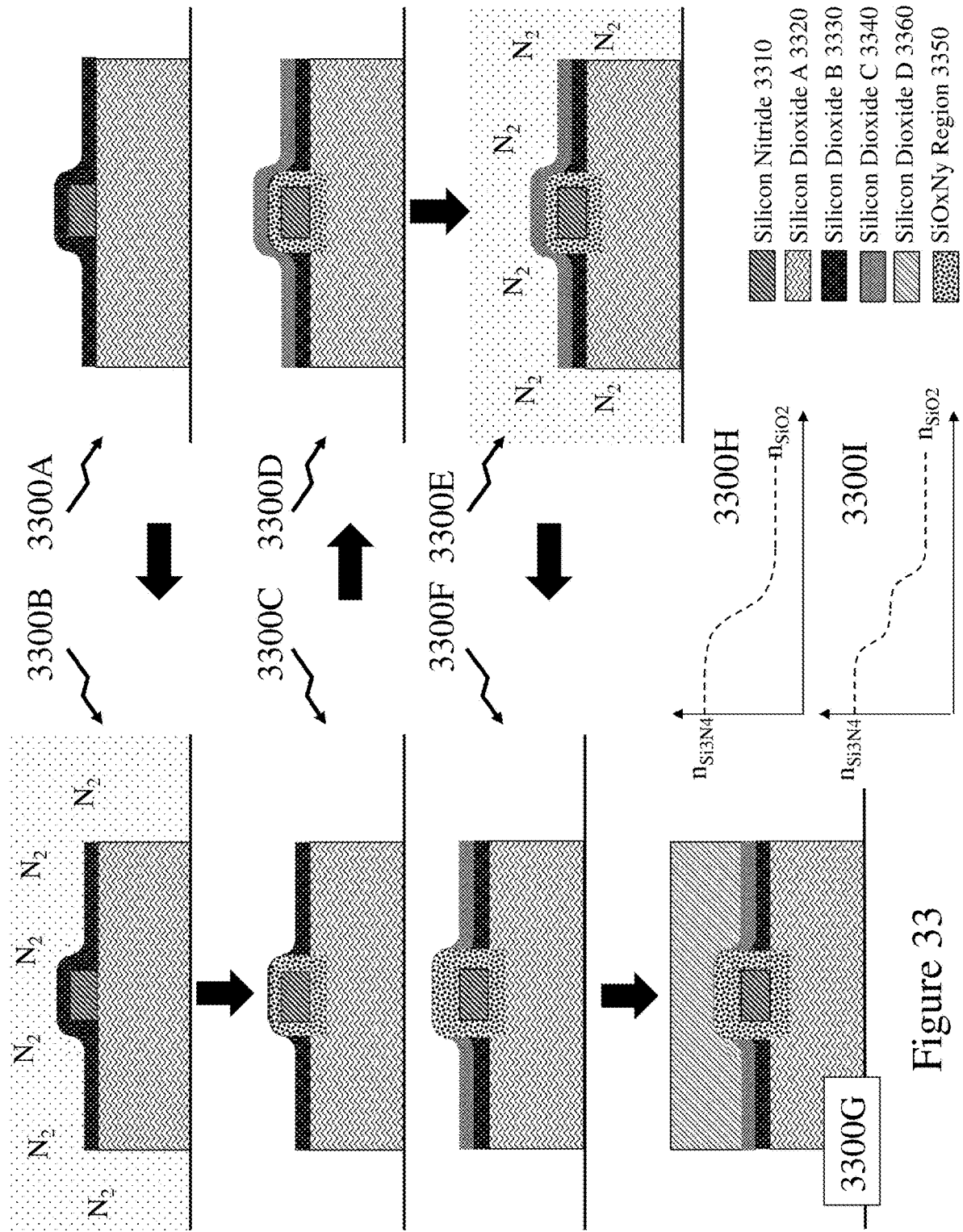
FIG. 33 depicts an exemplary process flow according to an embodiment of the invention with nitrogen annealing of a thin initial silicon dioxide cladding upon the silicon nitride waveguide core and a second silicon dioxide cladding during formation of a silicon dioxide-silicon nitride-silicon dioxide waveguide structure.

Referring to FIG. 33 there is depicted an exemplary process flow according to an embodiment of the invention with nitrogen annealing of a thin initial silicon dioxide cladding upon the silicon nitride waveguide core and a second silicon dioxide cladding during formation of a silicon dioxide-silicon nitride-silicon dioxide waveguide structure. As depicted the exemplary process flow comprises first to seventh images 3300A to 3300G respectively, comprising:

First image 3300A wherein a lower silicon dioxide cladding has been deposited, such as TEOS based Silicon Dioxide A 3320, upon a substrate (omitted for clarity) followed by deposition and patterning of a silicon nitride layer, silicon nitride 3310, and an initial thin first upper cladding, TEOS based silicon dioxide B 3330 encapsulating the silicon nitride core;

Second image 3300B wherein the structure is exposed to a first nitrogen annealing process;

Third image 3300C wherein a first intermediate waveguide structure is depicted resulting from the first nitrogen anneal such that an initial silicon oxynitride region 3350 is formed around the silicon nitride core;

Fourth image 3300D wherein a thin second upper cladding, TEOS based silicon dioxide C 3340 is deposited;

Fifth image 3300E wherein the structure is exposed to a second nitrogen annealing process;

Sixth image 3300F wherein a second intermediate waveguide structure is depicted resulting from the first and second nitrogen anneals upon the thin first and second upper cladding such that an extended silicon oxynitride region 3350 is formed around the silicon nitride core; and Seventh image 3300G wherein a thick third upper cladding, TEOS silicon dioxide D 3360 is deposited.

Referring to eighth and ninth images 3300H and 3300I respectively it would be evident that by adjustments in the thickness of the first and second upper cladding layers and/or the first and second nitrogen annealing processes that the refractive index profile from the silicon nitride core to the silicon oxide cladding may exhibit a range of profiles including an essentially Gaussian profile region between the core and cladding such as depicted in eighth image 3300H which is similar to the profile depicted in seventh image 3100G in FIG. 31 or that depicted in ninth image 3300I which is a combination of multiple profiles from the first and second nitrogen annealing steps.

It would be evident that the vertical refractive index profile may according to the films employed, annealing conditions etc. have a similar refractive index profile to that laterally or within other embodiments of the invention it may be different.

It would be evident that within other process flows the final thick third upper cladding may not be required depending upon the total thickness and refractive index profile of the silicon oxynitride region around the silicon nitride core. It would be evident that within other embodiments of the invention three or more deposition/anneal stages may be employed. It would also be evident that considering the process flow depicted in FIG. 33 that according to the thicknesses of the first and second silicon dioxide cladding layers that the third silicon dioxide, Silicon Dioxide D 3360, may be eliminated. Alternatively, this layer may be replaced with a spin-on planarization layer, such as a spin-on glass, a photoresist, polyimide, etc. rather than a deposited film, e.g. a TEOS based silicon dioxide, in order to planarize the structure for subsequent processing steps such as formation of electrodes, photolithography etc.

Figure 34A:
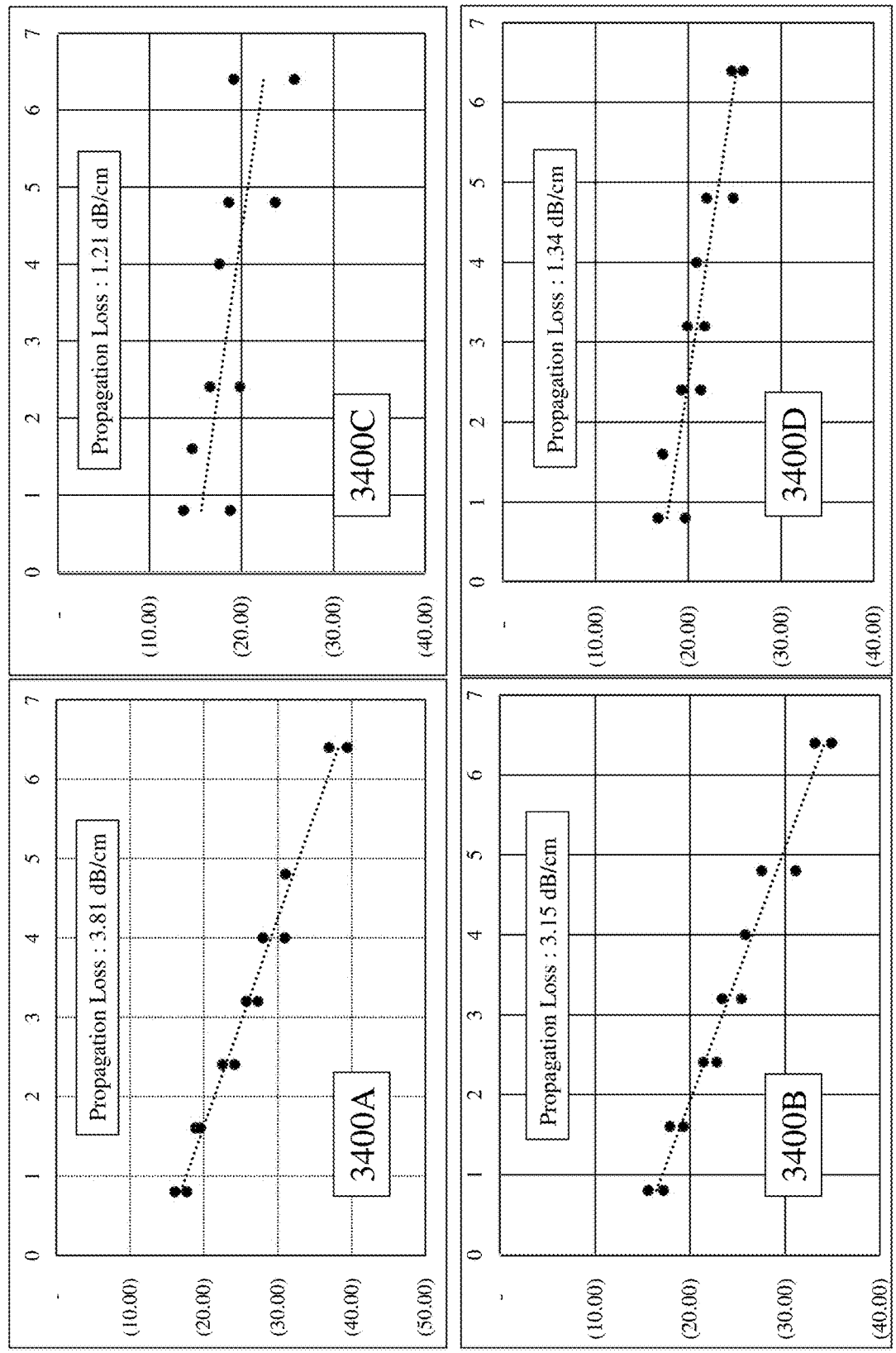
FIGS. 34A and 34B depict experimental results for a conventional prior art silicon dioxide-silicon nitride-silicon dioxide waveguide structure with a nitrogen annealed silicon dioxide-silicon nitride-silicon dioxide waveguide structure according to the process depicted in FIG. 31.

Now referring to FIGS. 34A and 3400B there are depicted experimental results for an exemplary nitrogen based annealing process such as described and depicted in respect of FIG. 31 with a single thick silicon dioxide cladding with respect to a prior art as deposited silicon oxide-silicon nitride-silicon oxide waveguide. The as fabricated optical waveguides comprised:

Lower silicon dioxide cladding of nominal thickness 3.3 µm;

Silicon nitride core thickness 450 nm;

Silicon nitride core width 575 nm; and

Upper silicon dioxide cladding of nominal thickness 3.35 µm.

The initial annealing conditions employed with these waveguides comprised:

| | |
|---|---|
| Atmosphere | Dry nitrogen flowing at 250 sscm; |
| Annealing Temperature | 1000°; |
| Dwell at Annealing Temperature | 60-75 mins; and |
| Total Processing Cycle | 14-15 hrs. |

Referring to FIG. 34A there are depicted first to fourth graphs 3400A to 3400D respectively with respect to the prior art as fabricated waveguide and the same waveguide structure annealed according to an exemplary embodiment of the invention. These depict respectively:

First graph 3400A depicts optical loss measurements versus waveguide length for the as fabricated $SiO_2$—$Si_3N_4$—$SiO_2$ waveguide in TE polarization with the C-band (1530 nm-1565 nm) with a propagation loss of approximately 3.8 dB/cm;

Second graph 3400B depicts optical loss measurements versus waveguide length for as fabricated $SiO_2$—$Si_3N_4$—$SiO_2$ waveguide according to an embodiment of the invention in TE polarization in the L-band (1565 nm-1625 nm); with a propagation loss of approximately 3.15 dB/cm;

Third graph 3400C depicts optical loss measurements versus waveguide length for an annealed $SiO_2$—$Si_3N_4$—$SiO_2$ waveguide according to an embodiment of the invention in TE polarization with the C-band (1530 nm-1565 nm) with a propagation loss of approximately 1.2 dB/cm;

Fourth graph 3400D depicts optical loss measurements versus waveguide length for an annealed $SiO_2$—$Si_3N_4$—$SiO_2$ waveguide according to an embodiment of the invention in TE polarization in the L-band (1565 nm-1625 nm); with a propagation loss of approximately 1.35 dB/cm.

Figure 34B:
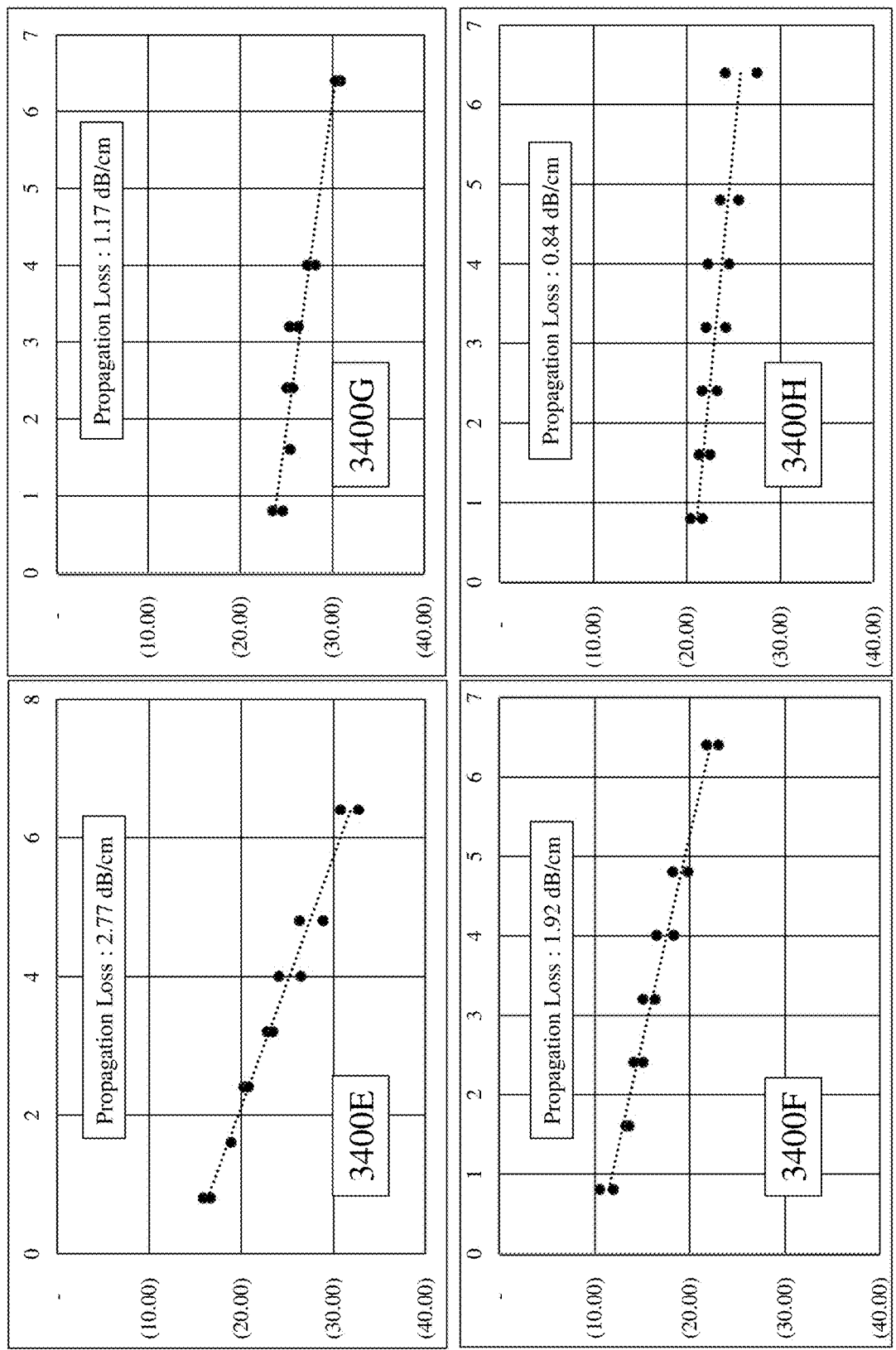

Referring to FIG. 34B there are depicted first to fourth graphs 3400E to 3400H respectively with respect to the prior art as fabricated waveguide and the same waveguide structure annealed according to an exemplary embodiment of the invention. These depict respectively:

First graph 3400E depicts optical loss measurements versus waveguide length for the as fabricated $SiO_2$—$Si_3N_4$—$SiO_2$ waveguide in TM polarization with the C-band (1530 nm-1565 nm) with a propagation loss of approximately 2.8 dB/cm;

Second graph 3400F depicts optical loss measurements versus waveguide length for as fabricated $SiO_2$—$Si_3N_4$—$SiO_2$ waveguide according to an embodiment of the invention in TM polarization in the L-band (1565 nm-1625 nm); with a propagation loss of approximately 1.9 dB/cm;

Third graph 3400G depicts optical loss measurements versus waveguide length for an annealed $SiO_2$—$Si_3N_4$—$SiO_2$ waveguide according to an embodiment of the invention in TM polarization with the C-band (1530 nm-1565 nm) with a propagation loss of approximately 1.2 dB/cm;

Fourth graph 3400H depicts optical loss measurements versus waveguide length for an annealed $SiO_2$—$Si_3N_4$—$SiO_2$ waveguide according to an embodiment of the invention in TM polarization in the L-band (1565 nm-1625 nm); with a propagation loss of approximately 0.85 dB/cm.

Accordingly, it is evident from comparing these results that the exemplary nitrogen annealing process according to embodiments of the invention results in a significant reduction in the propagation loss of the $SiO_2$—$Si_3N_4$—$SiO_2$ waveguides in both polarisations wherein in the C-band the optical propagation loss for TE and TM polarisations is reduced by approximately 2.6 dB/cm and 1.6 dB/cm respectively. For the L-band the optical propagation loss for TE and TM polarisations is reduced by approximately 1.8 dB/cm and 0.95 dB/cm respectively. As the annealing process impacts both the lateral sidewalls and the surfaces at the upper and lower boundaries of the silicon nitride core with the upper and lower claddings then improvements are observed for both polarisations.

Accordingly, significant improvements from initial experimental results are evident from FIGS. 34A and 34B respectively. Further improvements are projected as the annealing process for this configuration, depicted in FIG. 31, is further optimized. Improvements are also expected from the configurations of FIGS. 32 and 33.

Within the embodiments of the invention described supra in respect of embodiments of the invention optical waveguides exploiting a silicon nitride core with silicon oxide upper and lower cladding, a $SiO_2$—$Si_3N_4$—$SiO_2$ waveguide structure has been described and depicted together with a silicon core and silicon nitride upper and lower claddings, a $Si_3N_4$—Si—$Si_3N_4$ waveguide structure. However, it would be evident that other waveguide structures may be employed including, but not limited to, silica-on-silicon, with doped (e.g. germanium, Ge) silica core relative to undoped cladding, silicon oxynitride, polymer-on-silicon, doped silicon waveguides. Additionally, other waveguide structures may be employed including vertical and/or lateral waveguide tapers and forming microball lenses on the ends of the waveguides via laser and/or arc melting of the waveguide tip. Further, embodiments of the invention have been described primarily with respect to the optical alignment of silicon-on-insulator (SOI) waveguides, e.g. $SiO_2$—$Si_3N_4$—$SiO_2$; $SiO_2$—Ge:$SiO_2$—$SiO_2$; or Si—$SiO_2$, but it would be evident embodiments of the invention may be employed to coupled passive waveguides to active semiconductor waveguides, such as indium phosphide (InP) or gallium arsenide (GaS), e.g. a semiconductor optical amplifier (SOA), laser diode, etc. Optionally, an active semiconductor structure may be epitaxially grown onto a silicon IO-MEMS structure, epitaxially lifted off from a wafer and bonded to a silicon IO-MEMS structure, etc. However, it would be evident to one skilled in the art that the embodiments of the invention may be employed in a variety of waveguide coupling structures coupling onto and/or from waveguides employing material systems that include, but not limited to, $SiO_2$—$Si_3N_4$—$SiO_2$; $SiO_2$—Ge:$SiO_2$—$SiO_2$; Si—$SiO_2$; ion exchanged glass, ion implanted glass, polymeric waveguides, InGaAsP, GaAs, III-V materials, II-VI materials, Si, SiGe, and optical fiber. Whilst primarily waveguide-waveguide systems have been described it would be evident to one skilled in the art that embodiments of the invention may be employed in aligning intermediate coupling optics, e.g. ball lenses, spherical lenses, graded refractive index (GRIN) lenses, etc. for free-space coupling into and/or from a waveguide device.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;
   depositing an upper cladding comprising a second silicon dioxide layer of a third predetermined thickness atop the core and lower cladding; and
   annealing the resulting structure within a nitrogen environment under first predetermined conditions; wherein
   the annealing results in a reduction of propagation losses of the optical channel waveguide for both TE and TM polarisations.

2. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;
   depositing an upper cladding comprising a second silicon dioxide layer of a third predetermined thickness atop the core and lower cladding; and
   annealing the resulting structure within a nitrogen environment under first predetermined conditions; wherein
   the annealing results in a refractive index of the optical channel waveguide varying in a non-step wise manner from the silicon nitride core to the silicon dioxide cladding in both vertical and horizontal directions relative to the substrate.

3. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;
   depositing an upper cladding comprising a second silicon dioxide layer of a third predetermined thickness atop the core and lower cladding;
   annealing the resulting structure within a nitrogen environment under first predetermined conditions; and
   performing one or more further sequences, each further sequence comprising:
      depositing a further upper cladding comprising a third silicon dioxide layer of a fourth predetermined thickness atop the core and lower cladding; and
      annealing the resulting structure within a nitrogen environment under second predetermined conditions.

4. The method according to claim 3, further comprising
   depositing a final upper cladding comprising a fourth silicon dioxide layer of a fifth predetermined thickness.

5. The method according to claim 3, wherein either:
      the multiple deposition and annealing steps result in a layer of varying silicon oxynitride surrounding a predetermined portion of the core of the optical channel waveguide;
   or:
      the multiple deposition and annealing steps result in a refractive index of the optical channel waveguide varying in a non-step wise manner from the silicon nitride core to the silicon dioxide cladding in both vertical and horizontal directions relative to the substrate.

6. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;
   depositing an upper cladding comprising a second silicon dioxide layer of a third predetermined thickness atop the core and lower cladding;
   annealing the resulting structure within a nitrogen environment under first predetermined conditions; and
   depositing a further upper cladding comprising a third silicon dioxide layer of a fourth predetermined thickness atop the core and lower cladding; wherein
   the annealing step results in a layer of varying silicon oxynitride surrounding a predetermined portion of the core of the optical channel waveguide;
   the upper cladding deposited prior to the annealing step is a thin layer; and
   the further upper cladding is a thick layer.

7. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;
   depositing an upper cladding comprising a second silicon dioxide layer of a third predetermined thickness atop the core and lower cladding;
   annealing the resulting structure within a nitrogen environment under first predetermined conditions; and
   performing one or more additional processing sequences, each additional processing sequence comprising:
      depositing a further upper cladding comprising a further silicon dioxide layer of a predetermined thickness atop structure resulting from the previous processing; and
      annealing the resulting structure within a nitrogen environment under another set of predetermined conditions.

8. A method of fabricating an optical channel waveguide comprising:
   depositing a lower cladding comprising a first silicon dioxide layer of a first predetermined thickness upon a substrate;
   depositing and patterning a core of the optical channel waveguide comprising silicon nitride of a second predetermined thickness and a first predetermined width upon the lower cladding;

depositing an upper cladding comprising a second silicon dioxide layer of a third predetermined thickness atop the core and lower cladding;

annealing the resulting structure within a nitrogen environment under first predetermined conditions; and performing one or more additional processing sequences prior to depositing a final upper cladding layer, each additional processing sequence comprising:

depositing a further upper cladding comprising a further silicon dioxide layer of a predetermined thickness atop structure resulting from the previous processing; and annealing the resulting structure within a nitrogen environment under another set of predetermined conditions; and depositing the final upper cladding layer.

9. A method of fabricating an optical channel waveguide comprising:

depositing a lower cladding comprising a first silicon dioxide layer of a first predetermined thickness upon a substrate;

depositing and patterning a core of the optical channel waveguide comprising silicon nitride of a second predetermined thickness and a first predetermined width upon the lower cladding;

depositing an upper cladding comprising a second silicon dioxide layer of a third predetermined thickness atop the core and lower cladding;

annealing the resulting structure within a nitrogen environment under first predetermined conditions; and performing one or more additional processing sequences prior to depositing a final layer, each additional processing sequence comprising:

depositing a further upper cladding comprising a further silicon dioxide layer of a predetermined thickness atop structure resulting from the previous processing; and annealing the resulting structure within a nitrogen environment under another set of predetermined conditions; and applying the final layer with a spin-on planarization process.

10. A method of fabricating an optical channel waveguide comprising:

depositing a lower cladding comprising a first silicon dioxide layer of a first predetermined thickness upon a substrate;

depositing and patterning a core of the optical channel waveguide comprising silicon nitride of a second predetermined thickness and a first predetermined width upon the lower cladding;

depositing an upper cladding comprising a second silicon dioxide layer of a third predetermined thickness atop the core and lower cladding; and annealing the resulting structure within a nitrogen environment under first predetermined conditions; wherein the annealing impacts:

each lateral sidewall of the core with the upper cladding;

a lower surface of the core with the lower cladding; and an upper surface of the core with the upper cladding;

such that the propagation loss of the resulting optical waveguide is reduced for both TE and TM polarisations.

* * * * *